US010244097B2

(12) United States Patent
Logan

(10) Patent No.: US 10,244,097 B2
(45) Date of Patent: Mar. 26, 2019

(54) METHOD AND DEVICE TO SET HOUSEHOLD PARAMETERS BASED ON THE MOVEMENT OF ITEMS

(71) Applicant: Pairable, Inc., Boston, MA (US)

(72) Inventor: James D Logan, Candia, NH (US)

( * ) Notice: Subject to any disclaimer, the term of this patent is extended or adjusted under 35 U.S.C. 154(b) by 129 days.

(21) Appl. No.: 15/336,959

(22) Filed: Oct. 28, 2016

(65) Prior Publication Data

US 2017/0048376 A1 Feb. 16, 2017

Related U.S. Application Data

(63) Continuation-in-part of application No. 14/816,024, filed on Aug. 2, 2015, which is a continuation-in-part
(Continued)

(51) Int. Cl.
*H04L 12/28* (2006.01)
*H04M 1/725* (2006.01)
(Continued)

(52) U.S. Cl.
CPC ........ *H04M 1/72533* (2013.01); *G05B 15/02* (2013.01); *H04L 12/2827* (2013.01);
(Continued)

(58) Field of Classification Search
CPC .............. G05B 15/02; H04L 12/2827; H04M 1/72533; H04W 4/001; H04W 4/008; H04W 4/50; H04W 4/80
See application file for complete search history.

(56) References Cited

U.S. PATENT DOCUMENTS 4,671,111 A 6/1987 Lemelson
5,732,401 A 3/1998 Conway
(Continued)

OTHER PUBLICATIONS

"Pixie—Location of Things, Platform Introduction", white paper found at https://www.getpixie.com/wp-content/uploads/2015/02/Pixie-Location-of-Things-Platform.pdf, 2015.
(Continued)

*Primary Examiner* — Yuhui R Pan

(57) ABSTRACT

A system, method and device to interrogate for the presence of objects, to prevent the inadvertent separation of the objects from their owner. An owner is alerted when they are separated from the objects by determining when a trigger event occurs, such as a person leaving and/or entering a particular monitored area or location. These monitored areas can be retrofitted with an electronic interrogation device that monitors local conditions to determine whether a user is entering or leaving the monitored area to trigger an interrogation of the personal items. The interrogation device is constructed and arranged to communicate with the objects to determine whether the objects are with the owner. The interrogation device automatically determines the presence of a particular object at the monitored environment and automatically generates a notification when needed. The system further controls functionality of the objects, according to illustrative embodiments, when the object is present.

9 Claims, 25 Drawing Sheets

Related U.S. Application Data of application No. 14/066,638, filed on Oct. 29, 2013, now Pat. No. 9,716,972, which is a continuation of application No. 12/900,471, filed on Oct. 7, 2010, now Pat. No. 8,570,168.

(60) Provisional application No. 61/357,521, filed on Jun. 22, 2010, provisional application No. 62/034,747, filed on Aug. 7, 2014, provisional application No. 62/032,541, filed on Aug. 2, 2014, provisional application No. 61/334,561, filed on May 13, 2010, provisional application No. 61/292,848, filed on Jan. 6, 2010, provisional application No. 61/278,415, filed on Oct. 8, 2009.

(51) Int. Cl.
*H04W 4/00* (2018.01)
*G05B 15/02* (2006.01)
*H04W 4/50* (2018.01)
*H04W 4/80* (2018.01)

(52) U.S. Cl.
CPC ............... *H04W 4/50* (2018.02); *H04W 4/80* (2018.02); *G05B 2219/2642* (2013.01)

(56) References Cited

U.S. PATENT DOCUMENTS

| | | | |
|---|---|---|---|
| 5,757,270 A | 5/1998 | Mori | |
| 5,781,109 A | 7/1998 | Nakajima | |
| 5,949,216 A | 9/1999 | Miller | |
| 6,015,090 A | 1/2000 | Swartz et al. | |
| 6,265,974 B1 | 7/2001 | D'Angelo et al. | |
| 6,304,186 B1 | 10/2001 | Rabanne et al. | |
| 6,331,817 B1 | 12/2001 | Goldberg | |
| 6,407,667 B1 | 6/2002 | Jackson et al. | |
| 6,570,504 B2 | 5/2003 | Rabanne et al. | |
| 6,611,556 B1 | 8/2003 | Koerner | |
| 6,631,271 B1 | 10/2003 | Logan ...................... G06F 3/002 340/539.13 |
| 6,640,189 B2 | 10/2003 | Perlmutter et al. | |
| 6,700,533 B1 | 3/2004 | Werb ...................... G01S 5/0018 342/357.48 |
| 6,967,576 B2 | 11/2005 | Hayes et al. | |
| 6,996,402 B2 | 2/2006 | Logan et al. | |
| 7,002,473 B2 | 2/2006 | Glick et al. | |
| 7,009,512 B2 | 3/2006 | Cordoba | |
| 7,034,684 B2 | 4/2006 | Boman et al. | |
| 7,061,378 B2 | 6/2006 | Lawrenson et al. | |
| 7,092,794 B1 | 8/2006 | Hill ......................... G08C 17/02 700/108 |
| 7,176,801 B2 | 2/2007 | Matsukawa | |
| 7,205,894 B1 | 4/2007 | Savage | |
| 7,271,715 B2 | 9/2007 | Aupperle | |
| 7,274,292 B2 | 9/2007 | Velhal et al. | |
| 7,323,988 B2 | 1/2008 | Krstulich | |
| 7,535,357 B2 | 5/2009 | Enitan et al. | |
| 8,091,795 B1 | 1/2012 | McLellan ........... G05D 23/1923 236/51 |
| 8,144,015 B2 | 3/2012 | Burket | |
| 8,159,342 B1 | 4/2012 | Medina | |
| 8,711,737 B2 | 4/2014 | Kandekar | |
| 8,810,392 B1 | 8/2014 | Teller | |
| 8,931,952 B2 | 1/2015 | Langdoc | |
| 2002/0133705 A1 | 9/2002 | Tagashira et al. | |
| 2004/0121645 A1 | 6/2004 | Postrel | |
| 2004/0164860 A1 | 8/2004 | Hosny | |
| 2004/0212479 A1 | 10/2004 | Gilbert et al. | |
| 2005/0025289 A1 | 2/2005 | Hogdahl et al. | |
| 2005/0068168 A1 | 3/2005 | Aupperle | |
| 2005/0068170 A1 | 3/2005 | Aupperle | |
| 2005/0094610 A1 | 5/2005 | de Clerq ................ G05B 15/02 370/338 |
| 2005/0258961 A1 | 11/2005 | Kimball et al. ........... 340/572.1 |
| 2006/0001542 A1 | 1/2006 | Waris | |
| 2006/0052144 A1 | 3/2006 | Seil et al. | |
| 2006/0109116 A1 | 5/2006 | Keays | |
| 2006/0180647 A1 | 8/2006 | Hansen .................... B60S 3/00 235/375 |
| 2006/0279427 A1 | 12/2006 | Becker et al. ............. 340/573.4 |
| 2007/0008120 A1 | 1/2007 | Smith | |
| 2007/0037614 A1 | 2/2007 | Rosenberg | |
| 2007/0061052 A1 | 3/2007 | Wong ................................. 701/1 |
| 2007/0130279 A1 | 6/2007 | Thacher ................ G01C 21/26 709/208 |
| 2007/0136585 A1 | 6/2007 | Diorio .................... G06F 21/35 713/168 |
| 2007/0152058 A1 | 7/2007 | Yeakley et al. .......... 235/462.01 |
| 2007/0174888 A1 | 7/2007 | Rubinstein .................... 725/115 |
| 2007/0222592 A1 | 9/2007 | Zelman | |
| 2007/0273446 A1 | 11/2007 | Kim et al. ..................... 330/284 |
| 2008/0174425 A1 | 7/2008 | Torning | |
| 2008/0174451 A1 | 7/2008 | Harrington et al. .......... 340/905 |
| 2008/0246613 A1 | 10/2008 | Linstrom ......... G08B 13/19695 340/572.4 |
| 2009/0005975 A1 | 1/2009 | Forstall et al. ................ 701/209 |
| 2010/0164715 A1 | 7/2010 | Buller | |
| 2010/0198367 A1* | 8/2010 | Petricoin, Jr. .......... G01S 5/0018 700/17 |
| 2010/0271187 A1 | 10/2010 | Uysal | |
| 2010/0289646 A1 | 11/2010 | Raniere | |
| 2011/0046792 A1* | 2/2011 | Imes ...................... F24F 11/006 700/278 |
| 2011/0148625 A1 | 6/2011 | Velusamy | |
| 2014/0145828 A1 | 5/2014 | Bassan-Eskenazi | |
| 2014/0145829 A1 | 5/2014 | Bassan-Eskenazi | |
| 2014/0145831 A1 | 5/2014 | Bassan-Eskenazi | |
| 2014/0145881 A1 | 5/2014 | Bassan-Eskenazi | |
| 2014/0148196 A1 | 5/2014 | Bassan-Eskenazi | |
| 2016/0006577 A1 | 1/2016 | Logan ................ H04L 12/2827 700/276 |

OTHER PUBLICATIONS

Oikawa, Yoshinori. "Tag Movement Direction Estimation Methods in an RFID Gate System, Current Trends and Challenges in RFID", Prof. Cornel Turcu (Ed.), 2011, ISBN: 978-953-307-356-9, InTech, Available from: http://www.intechopen.com/books/current-trends-and-challenges-in-rfid/tag-movement-direction-estimationmethods-in-an-rfid-gate-system.

Coxworth, Ben. "StickNFind system uses your phone and coin-like tags to find lost items", GizMag, Nov. 29, 2012, Found at: http://www.gizmag.com/sticknfind-finding-system/25238/.

Lin, Chi-yau, Chia-nan Ke, Shao-you Cheng, Jane Yung-jen Hsu, and Hao-hua Chu. "Object Reminder and Safety Alarm", EUC Workshops 2005, LNCS 3823, pp. 499-508, 2005. Found at: http://mll.csie.ntu.edu.tw/papers/uisw2005.pdf.

Thing Magic Inc., "ThingMagic RFID Drives Tool Tracking Application for Ford Trucks", 2009.

\* cited by examiner

Figure 27. Each S refers to the signal pool associated with the respective circle segment.

METHOD AND DEVICE TO SET HOUSEHOLD PARAMETERS BASED ON THE MOVEMENT OF ITEMS

RELATED APPLICATIONS

This application is a continuation-in-part of co-pending U.S. patent application Ser. No. 14/816,024, filed Aug. 2, 2015, entitled METHOD AND DEVICE TO SET HOUSEHOLD PARAMETERS BASED ON THE MOVEMENT OF ITEMS, the entire application of which is herein incorporated by reference. Application Ser. No. 14/816,024 is a continuation-in-part of U.S. patent application Ser. No. 14/066,638, filed Oct. 29, 2013, entitled SYSTEM, METHOD AND DEVICE TO INTERROGATE FOR THE PRESENCE OF OBJECTS, the entire application of which is herein incorporated by reference, which is a continuation of U.S. patent application Ser. No. 12/900,471, filed Oct. 7, 2010, entitled SYSTEM, METHOD AND DEVICE TO INTERROGATE FOR THE PRESENCE OF OBJECTS, which issued as U.S. Pat. No. 8,570,168 on Oct. 29, 2013, the entire application of which is herein incorporated by reference, which claims the benefit of U.S. Provisional Application Ser. No. 61/278,415, filed Oct. 8, 2009, entitled SYSTEM FOR AUTOMATICALLY VERIFYING THE PRESENCE OF SELECTED OBJECTS, the entire disclosure of which is herein incorporated by reference; U.S. Provisional Application Ser. No. 61/292,848, filed Jan. 6, 2010, entitled CONTEXT AWARE TETHERING TECHNOLOGY AND DEVICE, the entire disclosure of which is herein incorporated by reference; U.S. Provisional Application Ser. No. 61/334,561, filed May 13, 2010, entitled SYSTEM, METHOD AND DEVICE TO INTERROGATE FOR THE PRESENCE OF SELECTED ITEMS, the entire disclosure of which is herein incorporated by reference; and U.S. Provisional Application Ser. No. 61/357,521, filed Jun. 22, 2010, entitled SYSTEM, METHOD AND DEVICE TO INTERROGATE FOR THE PRESENCE OF SELECTED ITEMS, the entire disclosure of which is herein incorporated by reference.

In addition, some material in this application base their priority on U.S. Provisional Patent Application 62/032,541, filed on Aug. 2, 2014, entitled SYSTEM, METHOD AND DEVICE TO INTERROGATE FOR THE PRESENCE OF OBJECTS, the entire application which is herein incorporated by reference, and on U.S. Provisional Patent Application 62/034,747, filed on Aug. 10, 2014, entitled FINDING DEVICES USING CELL PHONE SWEEPING, the entire application which is herein incorporated by reference.

FIELD OF THE INVENTION

The present invention relates to determining the presence of objects, and more particularly to performing certain functions based upon whether or not an object is within a monitored area or location.

BACKGROUND OF THE INVENTION

The majority of Americans own a cell phone. According to an association representing the wireless telecommunication industry, in 2007, 82.4% of Americans owned at least one portable electronic communication device, such as a cell phone or a personal digital assistant (PDA). As cellphones become more prevalent, and with these devices becoming integrated into everyday life, the chances of leaving or losing them increases. Similarly, other personal objects such as wallets and purses are even more ubiquitous, and are also prone to disadvantageously being left behind or lost.

There are many situations in which a person wants to be sure to have all their important personal items with them when entering or leaving an area or location. Usually these locations are those most often frequented by the owners of such personal items. Other times a person would like to plan in advance to make sure all desired items are available when leaving an area or location. If people could be assured of having their personal items when entering or leaving their house, office, or vehicle, the likelihood of forgetting or losing such an item becomes much less likely.

Products are in the market currently to help people find items that have been misplaced. The product FIND ONE FIND ALL® by Melbourne Designs, LLC, of Arlington, Tex., for instance, exemplifies systems using tracking devices that can be put on a cellular phone, wallet, or keys. Such systems, which include avalanche rescue modules, can track other devices or themselves be tracked by other devices. They are typically equipped with RF-emitting and perhaps RF-detecting attachments. When an object needs to be found, the user indicates such by putting one of the devices into "find" mode and using the RF-detecting means to locate the lost article that is emitting an RF signal or sound by which it can be found.

Other products in the market also try to prevent separation in the first place. They often operate by linking devices together to prevent a user from inadvertently leaving one behind. Such linked devices output an alarm when one of the paired objects is out of proximity of one another. U.S. Pat. No. 7,002,473 refers to a monitoring device, such as a cellular phone with included RFID reader that monitors objects equipped with RFID tags. The cellular phone outputs an alarm when any of the objects is not within proximity to the reader. This prior art system disadvantageously requires that the user of the system carry the interrogation device with him or herself.

Attempts have been made that pair objects to track one another, or a master device tracking a slave device. For instance, U.S. Pat. No. 6,265,974 refers to monitoring the spatial relationship between two communication devices for the purposes of preventing a child from becoming lost. The system works by producing alarm when the child is a certain distance from the parent when the device is in motion. Similarly, U.S. Pat. No. 5,781,109 relates to a paired alarm system, which would output an audible alarm when one unit is separated from one another. There is a need for a system that interrogates for a plurality of items and performs certain functions in response to whether or not the items are within range.

Other attempts, such as U.S. Pat. No. 6,967,576, relates to general location tracking with alarm output using a tracking device that communicates with objects to be tracked via electronic beacons. Alerts are sounded if the distance between the tracking device and the object to be tracked increase past a threshold and if the location of the tracking device is outside a defined area such as a house. U.S. Pat. No. 7,009,512 also relates to two devices monitoring distances between one another. In both cases, such prior art uses tracking devices for a user to carry as opposed to in a particular location or area. Many of these tracking systems can be complicated to use and are generally not designed to be suitable for everyday user interaction when trying to make sure an item is properly associated with the right location or usage scenario.

SUMMARY OF THE INVENTION

The present invention overcomes several disadvantages of the prior art by providing a system that interrogates for the presence of objects and generates a notification for an undetected personal item at a monitored area or location or in advance of a specific time or event. The system for interrogating for objects at a monitored location to generate a notification of undetected personal items comprises an interrogator device and a communication module on the personal item. The interrogator device has a range within which the interrogator device interrogates for and can detect a tracked object. The sensing device on the tracked object receives an interrogation request from the interrogator device and, when in the detectable range of the interrogator device, transmits tracked object data to the interrogator device. The tracked object can be identified as an object to be tracked by simple gestures detected by motion detectors the sensing device. The sensing device will send a specific signal to the interrogator device based on specific detected gestures. The interrogator device has stored therein tracked object data for a plurality of tracked objects, identified by one or more means, such as these gestures, and generates a notification when a tracked object is not within the detectable range of the interrogator device.

The method for interrogating a tracked object initially stores data for a plurality of tracked objects on the interrogator device such that the interrogator device has a list of tracked objects that should be within the detectable range of the device. Then, the procedure determines whether the tracked objects are within the detectable range of the interrogator device when a trigger event occurs and triggers the interrogation of the tracked objects. The trigger event can be a person entering or leaving a particular area. The trigger event can also be an event in the interrogator's internal electronic calendar to which certain tracked objects have been associated. If a tracked object is not within the detectable range at a predetermined time, a notification is generated to the owner of the tracked object. This can be generated on the interrogator device or on the tracked object itself.

The interrogator device includes a communication module, such as Bluetooth circuit or a conventional sensor that, upon the trigger event, interrogates the tracked objects to determine if they are within the detectable range of the interrogator device. The interrogator device includes a system controller that determines whether a notification is generated based upon the input from the communication module, and also includes an output means to generate the notification of undetected tracked objects.

The interrogator device can have one or more "car-in-motion sensors" (CIMS) to detect when a car is about to be, or is put into motion. Such CIMS can include the illustrative approach of a voltage meter circuit that can discern when the car has started, an accelerometer that can sense an idling engine or moving vehicle, or circuitry that detected car engine noise coming through the cigarette lighter.

When a CIMS indicates motion or engine activity the interrogator device can establish a Bluetooth connection with the previously mated phone. If no phone is present, an alarm can be sounded in the traditional manner and in that manner, the interrogator device functions as a conventional interrogator device as described herein.

An interrogator device that is already paired with a phone, and which already contains Bluetooth technology, can readily perform the function of a hands-free unit by building in a speaker and appropriate interface buttons and software. As such, an interrogator device hands-free unit, working in conjunction with application software on the paired phone, can be used to reduce the frequency with which a phone can need to be retrieved from a pocket or purse. Such software on the handset, working in conjunction with an interrogator device or other hands-free unit, can be called a phone in place (PIP) implementation.

BRIEF DESCRIPTION OF THE DRAWINGS

The invention description below refers to the accompanying drawings, of which.

DETAILED DESCRIPTION

Figure 1:
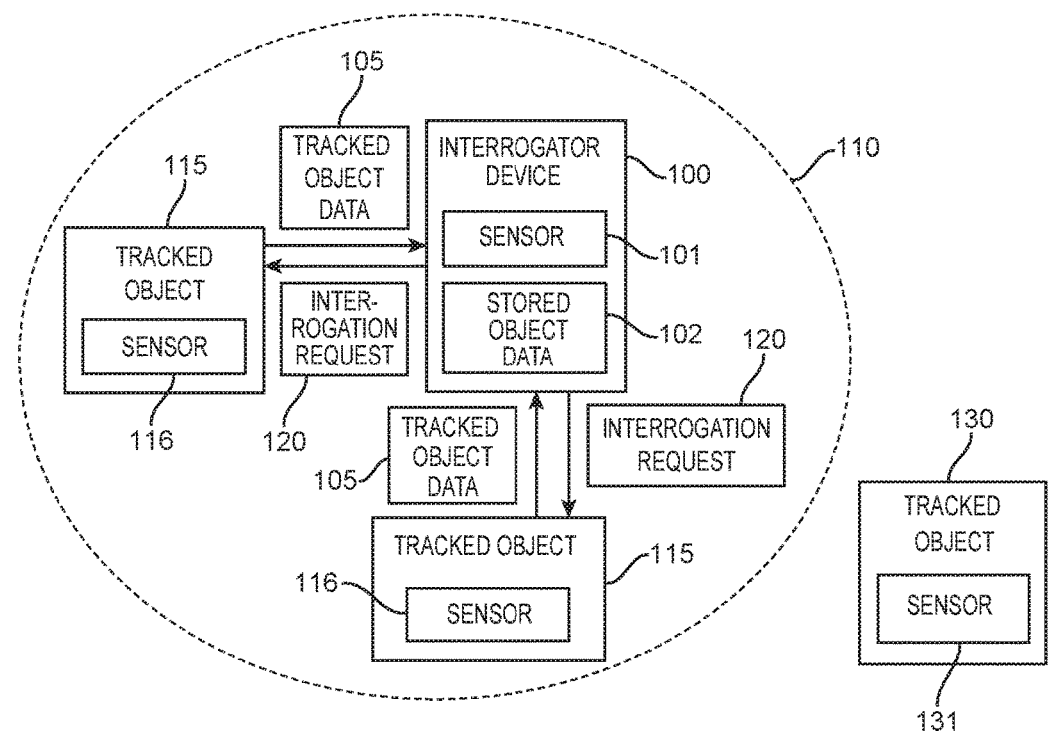
FIG. 1 is an overview block diagram for an interrogation system according to an illustrative embodiment.

A system, method and device for interrogating for the presence of certain personal items allows a user to be notified when an item is absent, has lost power, or is lacking a communications means that it previously had. When an item is present, the system, method and device can control certain functionalities of an item. FIG. 1 shows a block diagram representing an illustrative embodiment of the interrogation system as it is generally used. Interrogator device 100 can be equipped with a communication module 101 or other appropriate element constructed and arranged to communicate with personal items and objects, and more particularly communication modules 116 on, attached to, or placed in these objects in an illustrative embodiment. These sensing devices may have interface elements integrated into them to detect motion and provide audio feedback. These can be used as methods of direct input to and feedback from the communication modules.

The interrogator device 100 can also include stored object data 102 that includes data relating to a plurality of selected or tracked objects 115. These items can include personal belongings, such as a cell phone, wallet, laptop computer, computer bag, or other item a person/user desires to keep track of or keep with them. The dotted line 110 around the interrogator device 100 represents the detectable range of the communication module 101 of the interrogator device 100. The detectable range 110 of the interrogator device 100 is highly variable depending on the particular monitored location and/or area for which selected objects are interrogated. For example, a larger area, for example up to 30 feet away from the interrogator device can be selected when in a house or large building, while a smaller area, for example up to 8 feet, can be chosen for an office space, vehicle or smaller location of interest. The detectable range is generally an area having a radius of detection a specified distance, such as a few feet and up to 30 feet or even further, from the interrogator device. The signal strength generated by any tracked object declines over distance and thus the detectable range can be adjusted by the interrogator by looking for signal strengths above specific thresholds. The signal strength and sensitivity can be set by the manufacturer of the interrogator device to come from the factory with a predetermined detectable range. In further embodiments, an interface can be provided to allow a user to specify the detectable range using conventional circuitry and RF filtering to achieve the desired range of the interrogator device.

Refer to U.S. Pat. No. 6,631,271, filed Aug. 29, 2000, entitled RULES BASED METHODS AND APPARATUS, which is herein incorporated by reference, and U.S. Pat. No. 6,996,402, filed Oct. 7, 2003, entitled RULES BASED METHODS AND APPARATUS FOR GENERATING NOTIFICATION MESSAGES BASED ON THE PROXIMITY OF ELECTRONIC DEVICES TO ONE ANOTHER, which is herein incorporated by reference, for exemplary rule based method and apparatus for relative tracking of objects.

When a trigger event occurs at the particular location equipped with the interrogator device, the event triggers the interrogation of the tracked objects 115. The triggering event can be a person entering a monitored area, or leaving a monitored area, as indicated by detecting that a car has been started or is put into motion, as described in greater detail hereinbelow. The interrogation occurs between interrogation device 100 and tracked object 115 when within the detectable range 110 via datastream 105. Tracked object 115 may also sense a trigger event through communication module 116. Tracked object 115 then transmits, via datastream 120, the tracked object data to interrogation device 100, which uses the data to trigger an interrogation of the tracked objects. The interrogation of tracked object 115 under the condition of trigger event generates a reminder from the interrogator device 100. Further, interrogator device 100 can prompt tracked object 115 for information from communication module 116 of the object 115. The interrogator device 100 can receive information available on tracked object 115 to generate a reminder. Reminders can be generated at interrogator device 100, as well as at the tracked object 115 when initialized by communication from the interrogator device 100.

As shown in FIG. 1, a tracked object 130 that is outside of the detectable range 110 of the interrogator device 100 is not detected by the interrogator device 100. The communication module 131 is thus not able to communicate with the communication module 101 of the interrogator device 100 or the signal strength is not above the threshold as mentioned above, and thus a notification is generated to alert the user that they do not have all of their objects and personal items. The notification can be a textual notification to the user or an audible or visual alarm generated by the interrogator device or a selected object that is within the detectable range. Data pertaining to the tracked objects 115 are stored in the interrogator device as stored object data 102, thereby creating a list of tracked objects within the interrogator device such that once a tracked object is recognized by the interrogator device, it need not be input again to the interrogator device. The interrogator device 100 automatically interrogates for personal items stored therein to prevent the user from leaving behind his or her personal items when such interrogator is positioned in a vehicle, or forgetting to bring them if the case where the interrogator is located in a stationary position such as a room. Once a personal item is detected, the interrogator device 100 can also be employed to control functionality of detected items, as described in greater detail herein below. The system is readily applicable for tracking a single object, such as a cell phone, or a plurality of objects, as so desired. An item can be added to the stored object data list 102 by one or more methods. This can include manual entry into the interrogator device 100 or by interactions with the sensing device via predefined gestures or motions [refer to FIG. 19]. Another method can include the addition to a time-based calendar event [refer to FIG. 16] stored in the interrogator device 100.

I. Vehicle Embodiment

Figure 2A:
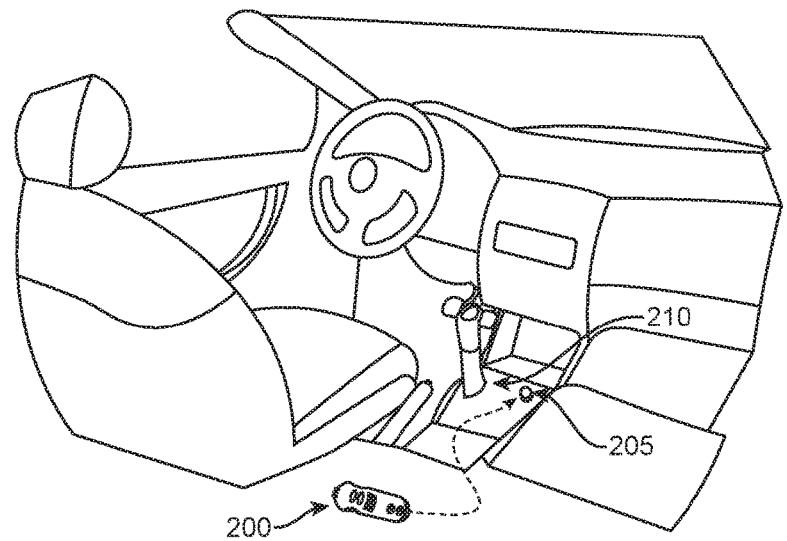
FIG. 2A is a perspective front view of an interrogation device constructed and arranged to be inserted into a vehicle power port, according to a vehicle implementation of the illustrative embodiment.

FIG. 2A shows the general system diagram of FIG. 1 in a vehicle scenario according to the illustrative embodiment, wherein the interrogator device 200 is a pluggable device for use with the power port 205 of a vehicle. The vehicle can be a car, truck, van, boat, ATV or any other automobile or appropriate mobile device having a power output. The interrogator device can be manually inserted into the car power port 205, such as a cigarette lighter or any other similar power port of a vehicle. In addition, the interrogator device can be plugged into the car's OBD (On-Board Diagnostics) port, which can supply both power to the device, as well as data indicating when the car has started.

Figure 2B:
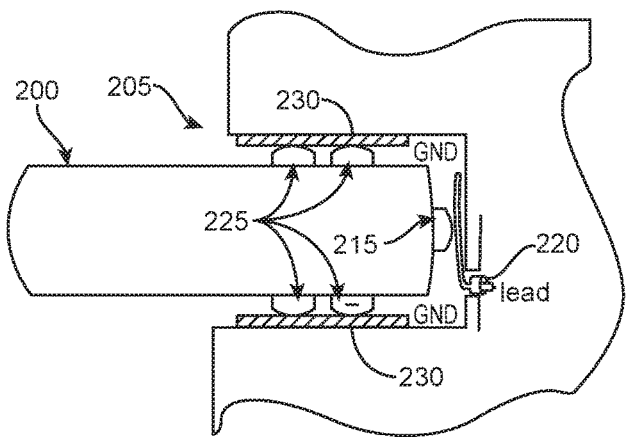
FIG. 2B is a cross sectional view of the interrogation device of FIG. 2A when inserted into the vehicle power port, according to the illustrative embodiment.

FIG. 2B shows a cross-sectional view of the interrogator device of FIG. 2A when it is inserted into a vehicle power port 205. In its inserted state, interrogator device power lead 215 is in contact with vehicle power port power connection 220 and interrogator device ground lead 225 is in contact with the vehicle ground 230. Ground lead 225 is spring loaded from within interrogator device 200, providing a pressure fit when interrogator device 200 is inserted into vehicle port 205.

Figure 2C:
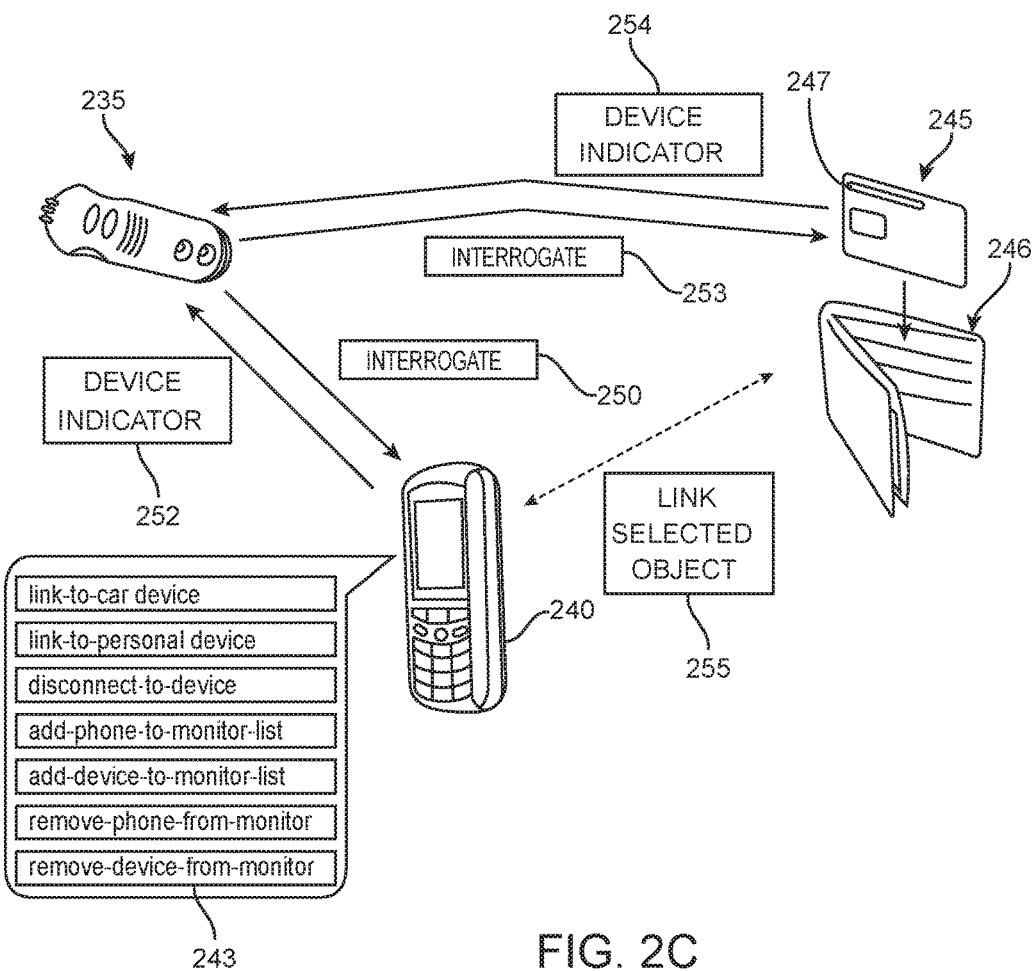
FIG. 2C is an overview flow diagram for establishing communication between the interrogation device and objects according to the illustrative embodiment.

FIG. 2C shows the elements of the vehicle implementation for interrogating for personal items. The interrogator device 235 communicates with the personal item, electronic device 240, by interrogating the object via datastream 250 and receiving a device indicator (detected or undetected) and other communication data via datastream 252. Electronic device 240 can be a cellular phone, a smartphone, a personal digital assistant, or any device equipped with local and/or wide area communication capabilities. Communication between the electronic device 240 and the interrogator device 235 can be any communications channel, such as Bluetooth, Wi-Fi, infrared, or other radio frequency means of communication such as RFID or Zigbee. In one embodiment, when the electronic device 240 is a cell phone, the means of communication can be the periodic signal sent by such cell phone to a nearby cell phone tower, with such signal able to be received by the interrogator device. Function list 243 shows functions that reside on the electronic device 240 to control the interrogator device. These include a link-to-car device function, a link-to-personal device function, a disconnect-to-device function, an add-phone-to-monitor-list function, an add-device-to-monitor-list function, remove-phone-from-monitor-function and a remove-device-from-monitor-function, to control functionality of the overall system. This is likewise transmitted to the interrogator device via datastream 252.

The interrogator device 235 also interrogates for the selected object 245 via datastream 253, and a device indicator and other communication data is transmitted via datastream 254 back to the interrogator device. Tracked object 245 can be inserted within personal object 246, for this example, a card 245 inserted in the wallet 246. The personal object 246 can be a wallet, a purse, a bag, a keychain, or any object that the person wants to track and the tracked object 245 can include a communication module 247 or other appropriate element communicatively connected to the interrogator device. The electronic device 240 and tracked object 245 can also communicate with each other via datastream 255 as a link is established between the tracked objects via any appropriate communication channel.

Functions 243 on electronic device 240 consist of functions that electronic devices 240 performs to manage the list of devices tracked by interrogator device 235. The user can select different functions from the user interface on electronic device 240. Such functions include being able to link electronic device 240 to interrogator device 235 and unlink said devices, via datastream 255. Electronic device 240 can establish a link between itself and tracked object 245 through function list 243 and also add tracked object 245 to the list of objects being tracked by interrogator device 235. Conversely, mobile device 240 and tracked object 245 can be removed from the tracking list on interrogator device 235 through the function list 243.

The communication established between the interrogation device and the tracked objects allows the user to determine if any personal items are present or, more importantly, if any are not present. As shown, the interrogator device interrogates the tracked object via datastreams 250 and 253, for the electronic device 240 and tracked object 245, respectively. Then an indication of the state of the device, as well as additional communication data if desired, is transmitted to interrogator device 235 via datastreams 252 and 254, such that the interrogator device 235 can determine whether one of the objects under inquiry is not present. The connection between the devices also allows the electronic device 240 and objects 245 to communicate information from their on-board communication module to the interrogator device as device indicator signals via datastreams 252 and 254, respectively. In one embodiment, electronic device 240 and tracked object 245 are equipped with on-board accelerometers. In such embodiments, electronic device 240 and tracked object 245 relay movement readings sensed from their on-board accelerometers to interrogator device 235 through datastreams 252 and 254, respectively.

Figures 3A, 3B:
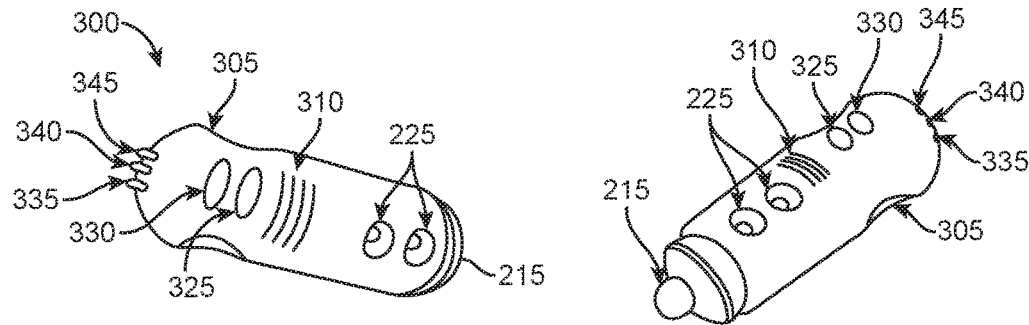
FIG. 3A is a front perspective view of the interrogator device of FIG. 2A according to the illustrative embodiment.
FIG. 3B is a back perspective view of the interrogator device of FIG. 2A according to the illustrative embodiment.

FIGS. 3A and 3B, respectively, show front and back views of the interrogator device according to the illustrative embodiment. The interrogator device 300 is a pluggable device that is inserted into the car power port. Device 300 has a speaker output 310 located on its side. A notch 305 is placed in the casing to provide leverage for the operator's finger allowing for easy insertion and extraction of device 300 from the car power port. The button 330 can set interrogator device 300 into a programming mode to listen for the object that is to be added to the monitoring queue. The monitoring queue is a list of tracked objects to be monitored by the interrogator device, as specified by the owner of the tracked objects. Interrogator device 300 uses the monitor queue to determine whether to generate a notification if an object in the list is missing under a circumstance of interest. Additionally, button 325 can set the interrogator device 300 into a programming mode to control the removal of objects from the monitoring queue. Light indicator 345 provides indication to the user that interrogator device 300 is on. Light indicator 340 provides indication that the interrogator device 300 is in a programming mode and it is seeking to add an object to the monitoring queue. Light indicator 335 provides indication that the interrogator device 300 is in programming mode and is seeking to remove an object from the monitoring queue. Light indicator 345, light indicator 340, and light indicator 335 are of different color to one another to provide an easy reading to the user.

Figure 4:
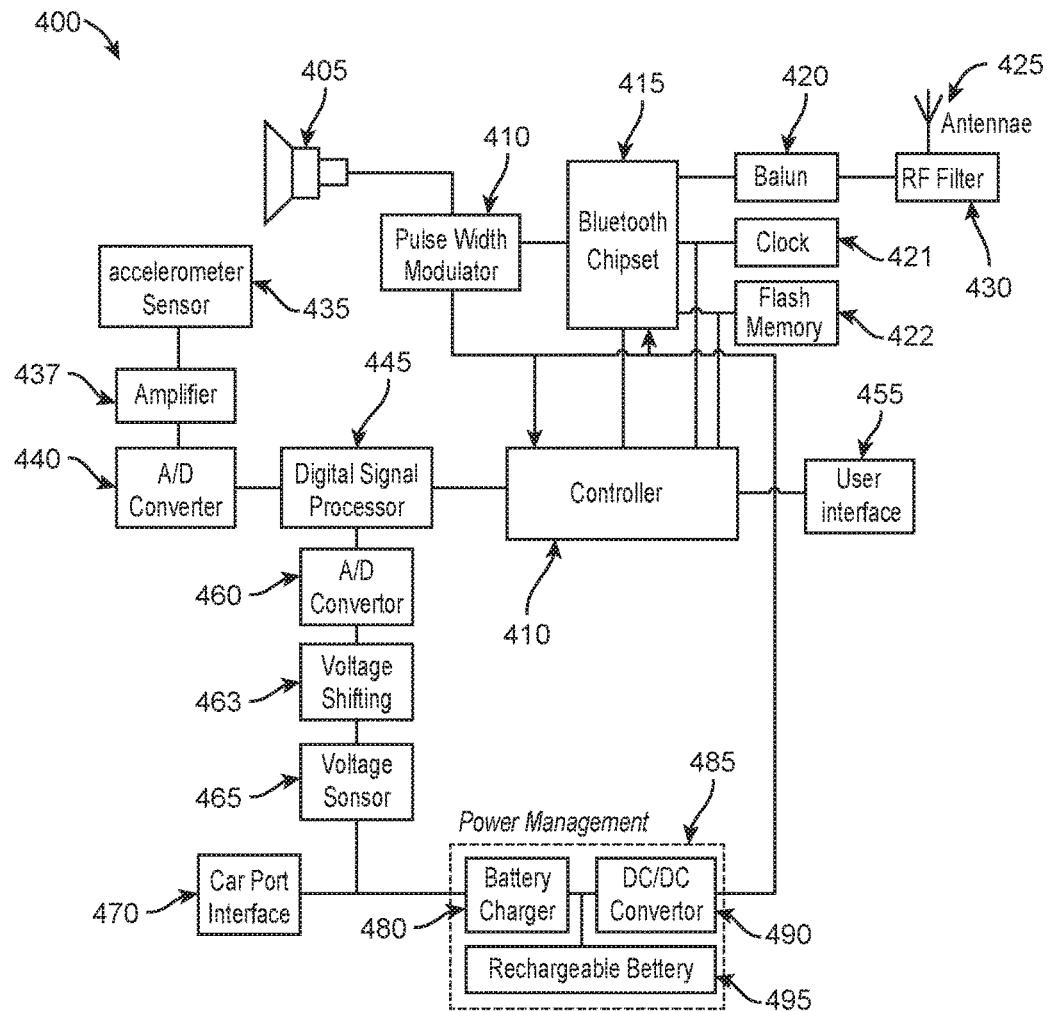
FIG. 4 is a schematic diagram of an exemplary architecture according to a vehicular implementation of the illustrative embodiment.

FIG. 4 depicts a schematic diagram illustrating an exemplary architecture of the interrogator device according to the illustrative embodiments. System 400 has two primary controllers that interface with each other: a system controller 450 and communication (i.e. Bluetooth) controller 415. These two controllers can be separate or two sections of a single integrated circuit. The system controller 450 runs the primary software and the high-level function control of the interrogator device. It takes in all the inputs from the communication modules and determines whether a notification should be generated. Communication controller 415 manages all the networking functions on the interrogator device and generates the alert waveform to speaker 405. Digital signal processor 445, which may be part of controller 410, receives inputs from the on-board accelerometer sensor 435 and voltage sensor 465 and provides feedback to system controller 450 as to whether the activity of interest is detected. Power management circuitry 485 draws power from the vehicle power port and provides power for all the circuitry in interrogator device 400.

Communication controller 415 can be the Broadcom® BCM4325, a single chip IEEE 802.11 a/b/g MAC/Baseband/Radio with integrated Bluetooth® 2.0+EDR and FM receivers or equivalent. It manages all the networking functions of the interrogator device. Communication controller 415 has a built-in baseband, media access control (MAC) address, and PHY.

Communication controller 415 can interface with system controller 450 through a four-wire serial-digital input and output (SDIO) interface using its internal universal asynchronous receiver and transmitter (UART). Communication controller 415 connects with radio frequency antennae 425 through a balun 420, which provides adjustments to the line impedance, reducing interferences from line mismatch. Balun 420 adjusts the balances and unbalances input with respect to the interrogator device ground. Located between balun 420 and RF antenna 425, radio frequency (RF) filter 430 is employed to extract the narrow band frequency component of the input signal ranging between 2.35 GHz and 2.52 GHz. Digital clock 421 provides a digital reference signal for Communication chipset 415, and has a reference clock between 12-52 MHz. Although Communication chipset 415 uses its internal random access memory (RAM) and operates its instruction stored within its read-only memory (ROM), external flash memory 422 provides a means to update its firmware and its instruction sets, which are stored internally.

Communication chipset 415 receives power from the direct current-to-direct current (DC/DC) converter 490. DC/DC converter 490 provides a voltage output of 2.5V to 5.5V to Communication chipset 415. An internal switching regulator within Communication chipset 415 generates the internal voltages necessary to operate its internal circuitries. DC/DC converter 490 is fed power from battery charger 480 or from rechargeable batteries 495. Battery 495 enables interrogator device 400 to operate even when the vehicle is off and when there is no power output from the vehicle power port. The battery charger 480 converts the 12V output of the vehicle power port to 5V.

User interfaces 455 connect directly with the controller 450 and are digital inputs and outputs that interface to the lighting indicators on the interrogator device's casing, and the buttons used for the interrogator device programming. Upon pressing the programming button, a de-bounced circuit latches the input with a dead time of 50 milliseconds, thus preventing multiple inputs from being generated and sent into controller 450.

Communication chipset 415 generates the signal to the speaker, which provides the alarm to the user, based on a digital signal from the controller 450. The internal oscillator of the Communication chipset 415 outputs the signal to pulse width modulation (PWM) circuit 410. PWM circuit 410 is supplied by a 5V power connection from DC/DC converter 490 and outputs the PWM waveform to the speaker 405, which converts the electrical signal to an audible sound with a frequency of between 20 Hz and 5 KHz. The speaker output can be varied by the operation of the controller 410 and the PWM 410a, to output sounds of variable amplitudes. The digital signal processor 445 monitors and analyzes inputs from the sensors, which are the movement readings from accelerometer sensor 435, and from the voltage reading from voltage sensor 465. Voltage sensor 465 is connected to power lead 215 and the ground lead 225. The voltage sensor readings are fed into a voltage divider 463 that s normalizes the voltage to a value within the range of the A/D converter. The signal is fed into an analog-to-digital (AD) converter 460 that can digitize the normalized voltage at 12-bit resolution sampling at 5 KHz. The signal varies in amplitude, but has a frequency range between 50 Hz to 533 Hz, which are the frequencies generated from the firing sequence of the vehicle engine at idle for a 4-cylinder engine to an 8-cylinder engine. A calibration algorithm is employed within digital signal processor 445 to normalize the signal's amplitude based on noise averages observed during typical time period of inactivity.

Voltage sensor 465 and the corresponding scaling circuitry can sense for the presence of power, for electrical noise, and for elevated voltages changes. In the event of sensing for electrical noise, the goal is to detect for frequency information within the power line. As such, analog means of detection can be utilized, such as employing an analog band pass filter sensing for a specific frequencies in the range of 50 Hz and 533 Hz. The output of the band pass filter can be integrated with an RC circuit and compared against a fixed selectable threshold. In the event of sensing for the presence of power, the simple comparator circuit whose output is fed into the controller 450 can be utilized as the substitute for the back end for the voltage sensing circuitry and signal processing function. Other means of power detection can also be employed, such as using a simple field effect transistor whose gate is fed by the power line being monitored and whose output are fed directly to controller 450. The detection can be based on current using any types of switch, such as a bipolar junction transistor. Mechanical and electronic relays can also be utilized. The goal of any circuit is to detect the presence of power. In the event of sensing for elevated voltage level indicating the vehicle has started, and thus the battery is being charged by the alternator, voltage detector means described hereinabove can be employed to sense for a voltage change from approximately 12V (the battery voltage when not being charged for a vehicle powerport having constant power) or from 0V (for a vehicle powerport with no power when the engine is on) to 14.5V (the approximate voltage when the alternator is charging the battery, which happens as soon as the car is started). A simple comparator circuit can also be utilized as a substitute to compare the input voltage with a reference voltage ranging between 11.0V and 14.6V. Prior to starting the engine, electrical signatures from the power port can be monitored and stored by the interrogator device. During this time period, little electrical activity is present in the vehicle power bus as the engine is typically the key contributor of electrical noise within the overall system. This electrical signal is referred to as the null signature. Thus, the interrogator device stores records of the determined engine status based on either the presence of the active engine's electrical activity or based the presence of the null activity from the engine. The signatures of both active and inactive engine activity can be utilized together to improve the delectability and accuracy of the engine "on" state by improving the signal to noise ratio of the incoming signals. The electrical signature can be detected based on detectors of both DC as well as AC components within the monitored signal.

Accelerometer sensor 435 in an exemplary embodiment is the Freescale MMA7260Q, a triple axis accelerometer in a chip form factor. The accelerometer sensor 435 takes a 3.3V power input from DC/DC converter 490 and has a sensing range of up to 1.5 gravitational forces with an output sensitivity of 800 milli-volt per gravitational force (mV/g). Accelerometer sensor 435 has three output channels, one for each of its three axes of movement. A vehicle may experience between 10 milli-gravitational forces to 150 milli-gravitational forces in any axis when a person enters or leaves the vehicle. The three channel outputs from accelerometer sensor 435 feeds into three amplify circuits 437, which amplify the input signals by a factor suitable to drive the following A/D converter 440. The output from amplifiers 437 are fed into a single multiplexing serial A/D converter 440, which has an input range of 0V to 1V at 12-bit resolution sampling at 1 KHz. The resolution of the A/D converter 440 is approximately 24 micro-gravitational forces. A/D converter 440 samples the input signal simultaneously using an internal front-end analog latch, and then serially converts the analog signal to its digital representation. The A/D converter 440 outputs the serial digital stream representing the three analog movement readings to digital signal processor 445.

Digital signal processor 445 operates two primary algorithms, one to process the voltage readings, and the other to process the accelerometer readings. With the accelerometer reading, digital signal processor 445 normalizes the three input readings into a single scalar value by taking the square root of the sums of the square of each of the input readings. Digital signal processor 445 decides if movement exists when the normalized reading value exceeds a calculated threshold value. The threshold value is calculated from the average values of the normalized readings taken when the vehicle is not in motion and is the average value with an offset added to it. Digital signal processor 445 signals controller 450 when such movement activity is detected.

Digital signal processor 445 determines if the engine is operating by analyzing the voltage reading from the car power port. Digital signal processor 445 performs a Fourier Transform function on the input voltage readings from voltage sensors 465. The signals, which were represented in the time domain, are transformed to the frequency domain. The engine is determined to be on if a frequency spike with at least twice the amplitude of nearby frequencies is found between the frequency of 50 Hz and 533 Hz. Digital signal processor 445 outputs the decision value for presence of movement and for engine electrical noise to controller 450, which makes the decision on whether to output an alarm to the user.

A. Sensing Signals that can Instigate an Interrogation

There are numerous sensing means that produce data that is used to initiate the interrogation device to look for objects a user wished to bring to a location or have on their person. In vehicles, these include accelerometers, voltage meter and engine noise circuits inserted into car power outlets, IR sensors and cameras to detect the presence of persons in a vehicle, sensors that register when a car door is opened from the outside or inside, sensors that register when someone is sitting in a car seat, etc.

Another sensor that can be used to instigate an interrogation is a GPS circuit, which can be part of the vehicle interrogator device. Alternatively, GPS data can be communicated to the interrogation device from another GPS circuit in the car via a wireless link, the OBD port, or other means. In any of these approaches, the GPS data can be analyzed by the interrogator and if it appears from that data that the vehicle is leaving its fixed location, after having been at rest for some period of time (as determined by using an algorithm similar to that needed by the accelerometer approach described for the vehicle-based PID) then the interrogation can begin.

B. Filtering Voltage Fluctuations and Accelerometer-Based Means of CIOD

Another feature of the interrogation device concept is that of being able to detect when the car has started. Such "CIOD" (or Car-Is-On-Detection) technology, also described herein by employing CIMS (car-in-motion-sensors), and can be accomplished by circuitry connected to the vehicle power port that looks for noise signals in the electrical system of the vehicle emanating from the engine when the engine is running, or from the increase in the voltage level in such system when the alternator kicks in. Other approaches include use of an accelerometer to detect that the car is in motion, or if sensitive enough to detect the vibration of a running motor.

There are useful, detailed algorithms behind the interrogator device's ability to detect when the car starts using voltage measurements that go beyond using a simple threshold measurement. These techniques apply to those power ports that are always on. Ports that turn on and off as the car starts and turns off don't need a special method to discern when the car has started.

As discussed herein, the primary method for determining the status of the engine is a voltage measurement circuit that looks for the rise in voltage being supplied to the power port that occurs when the car starts.

Problems with this method occur, however, because occasionally a car's voltage drops for short periods of time during a trip. This could be interpreted as the car being turned on and off if an algorithm is used that relies on a simple threshold voltage. To solve that problem, we have instituted a filter that requires the voltage to stay below the threshold for a minimum of five minutes in order to qualify as an event where the engine did actually turn off. In almost all cases, the voltage will rise back into the normal car-on voltage range within this time period.

To further separate actual car-turn-offs from simple voltage fluctuations, we have build hysteresis into the voltage measurement. Thus, the voltage must go above a certain voltage to be considered on, V1. To be considered off, however, the voltage must fall below V1-Vh, where Vh is the amount of hysteresis used. Again, as mentioned above, the voltage must stay below Vh for a minimum amount of time before the car is considered to be off.

An additional way to gather information about the status of the engine is to monitor engine noise that may be picked up and carried in the circuit supplying power to the power port. Such noise analysis can by itself be enough to determine engine status. If such analysis is ambiguous but provides probabilistic information of value, then such noise analysis can be combined with voltage readings to determine if the decline in voltage was due to the engine being turned off or because there was temporary decline in voltage while the car was still running.

A waiting period can be applied in illustrative embodiments, to discern between long stops and actual turning off of the engine. Accordingly, if no motion is detected over, for instance, a specified period, such as five minutes, it determines that the car had been turned off.

This determination could further be reinforced if the accelerometer detected motion that was generated by a person getting out of a car and closing a door. These action would produce a signature signal from the accelerometer. Such signature signals could be learned by the unit by having the user "train" it by putting the interrogator unit into training mode and then performing such actions.

C. Generic Car-is-on Detection Used for Other Devices

As GPS systems use a lot of power, they need to be powered off if connected to an always-on power port as they could drain the battery if left on too long. Today, that power-down may be handled by the system noting that the GPS indicates that the car is standing still. But using GPS information will still leave a time lag in turning the unit on and off.

The inclusion of the CIOD technology into other devices such as GPS systems, would allow such systems to automatically turn on and off as the car turns on and off when such units are plugged into car power ports that are "On-Off" ports (as opposed to "always-on" ports). According to this implementation the unit maintains a low power mode waiting for the signal from the CIOD circuitry to go into a fully operational state. The CIOD technology is implemented in a device similar to the interrogator device described herein, such as the pluggable device for a vehicle power port, as shown in FIG. 2A, but differing in structure. For example, the structure can provide technology of the interrogator device and CIOD technology while still defining a socket for use of the vehicle power port and still monitoring the power output of the vehicle. The CIOD technology-enabled device is operatively connected to the GPS system, or integrated directly therewith, to control the power (ON/OFF) for the GPS system. Thus, an "always on" (i.e. power is constantly supplied) port becomes an on/off port with the vehicle turning on or commencing motion, as monitored by the CIOD technology-enabled interrogator device.

D. Bluetooth Functions

As described in *Profiles, Specification Volume 2, Specification of the Bluetooth System*, V1.0B, Dec. 1, 1999, under the Generic Access Profile, two communicating devices involved in a Bluetooth communication can take the roles specified by the generic notation of the A-party (the paging device in case of link establishment, or initiator in case of another procedure on an established link) or the B-party (paged device or acceptor). The A-party is the one that, for a given procedure, initiates the establishment of the physical link or initiates a transaction on an existing link.

The Bluetooth access profile establishes the procedures between two communicating devices to discover and connect (link and connection establishment) for the case where neither of the two communicating devices has any link established as well as the case where (at least) one communicating device has a link established (possibly to a third communicating device) before starting the described procedure. The Bluetooth user should, in principle, be able to connect a Bluetooth device to any other Bluetooth device. Even if the two connected communicating devices don't share any common applications, it should be possible for the invention to operate using basic Bluetooth capabilities.

Each Bluetooth device is specified by a unique 48-bit Bluetooth Device Address and a Bluetooth Device Name, which can be up to 248 bytes long. Additionally, each Bluetooth device has an assigned Bluetooth passkey, which is used to authenticate two Bluetooth devices that have not previously exchanged link keys to each other. The trust key allows two Bluetooth devices to create a trusted relationship between each other.

Bluetooth devices are further specified by a class of Bluetooth device parameters received during the Bluetooth device discovery procedure, which broadcasts the type of Bluetooth device and the types of supported services.

Bluetooth devices are capable of performing inquiry functions to determine the identity of the Bluetooth device class of other discoverable Bluetooth devices when they are in range. Two discoverable modes exist, which are limited discoverable mode and general discoverable mode. Bluetooth devices are capable of performing different types of inquiries called a (1) general inquiry, (2) limited inquiry, (3) name inquiry, (4) Bluetooth device discovery, and (5) bonding. The purpose of general inquiry procedure is to provide the initiator with the Bluetooth device address, clock, Bluetooth device class, and used page scan mode of general discoverable Bluetooth devices. Bluetooth devices in limited discoverable mode are not discoverable using the general inquiry. General inquiry is used to discover Bluetooth devices that are made discoverable continuously or for no specific conditions. Limited inquiry procedure provides the initiator with the Bluetooth device address, clock, Bluetooth device class, and used page scan mode of limited discoverable Bluetooth devices. Limited inquiry is used to discover Bluetooth devices that are made discoverable only for a limited period of time, such as during temporary conditions or for a specific event. Name discovery provides the initiator with the Bluetooth device name of connectable Bluetooth devices using the name request procedure. The procedure uses the Device Access Code of the remote Bluetooth device as retrieved immediately beforehand. Bluetooth device discovery provides the initiator with the Bluetooth address, address clock, Bluetooth device class, used page scan mode object, and list of discoverable Bluetooth devices. During the Bluetooth device discovery procedure, an inquiry is performed, and then name discovery is done towards the Bluetooth devices that responded to the inquiry. Bluetooth devices have a built-in ability to detect the presence and identity of other Bluetooth devices, which are within its range, and may be used to provide location information to generate useful notification messages to the user.

E. Multi-Pairing, Multi-Tracking

The interrogator device can be programmed to allow pairing for two or more objects, such as two different phones. With a multi-tracking feature, the interrogator device is constructed and arranged to monitor for either phone A or phone B (or even more phones). This is be particularly useful if two people shared a car.

Alternatively, an interrogator device paired to two (or more) phones could also be set up to alert the user(s) if both phones were not there. This could particularly useful when two people always rode together, for instance, two workers in a truck.

This feature can be implemented at the OEM level by linking the interrogation function to one or more sensors built into seats. If the sensor detects the presence of a person in a particular seat, then the interrogator device searches for that person's paired phone. For example, the interrogator device can be paired to both a husband's and wife's phone. If the seat sensor determined the presence of a second person in the car, then the interrogation device would search for both phones and sound an alert if not found. Such a sensor would be most value if it conveyed weight information which would increase the probability that the assumption that the extra passenger was the spouse was correct.

Another sensor available for the seat sensor include infrared sensors, for example, as discussed herein, that convey to the interrogation device information about the presence of another user.

For car poolers, a multi-tracking feature is highly desirable during weekday trips in the morning and evening. Thus, an interrogation system can be enabled with the ability to tell time and day. Such information can be programmed into the interrogation device and maintained with a battery or other constant source of power. Additionally, time and calendar information can be continuously fed to the interrogation device via applications running on one or more phones that are being tracked by the interrogation device.

Another feature is the ability of a multi-paired interrogator device to "boot-strap" its way into "multi-tracking" mode. For example, an interrogator device that is used by a driver who drives alone most of the time but also handles a car pool occasionally. The riders in the carpool often have multiple cell phones, iPads, and other objects. Once the interrogation device detects at least one of these extra devices, it can deduce that that trip consists of a carpool trip and therefore continues to search for all the items in its list of items. It is unlikely that all of the items on the non-driver search list are missing at any one time. Therefore, the presence of any of them can provide the signal that a non-driver-item search is needed.

F. Notification Generation Procedure—Starting a Vehicle

Figure 5:
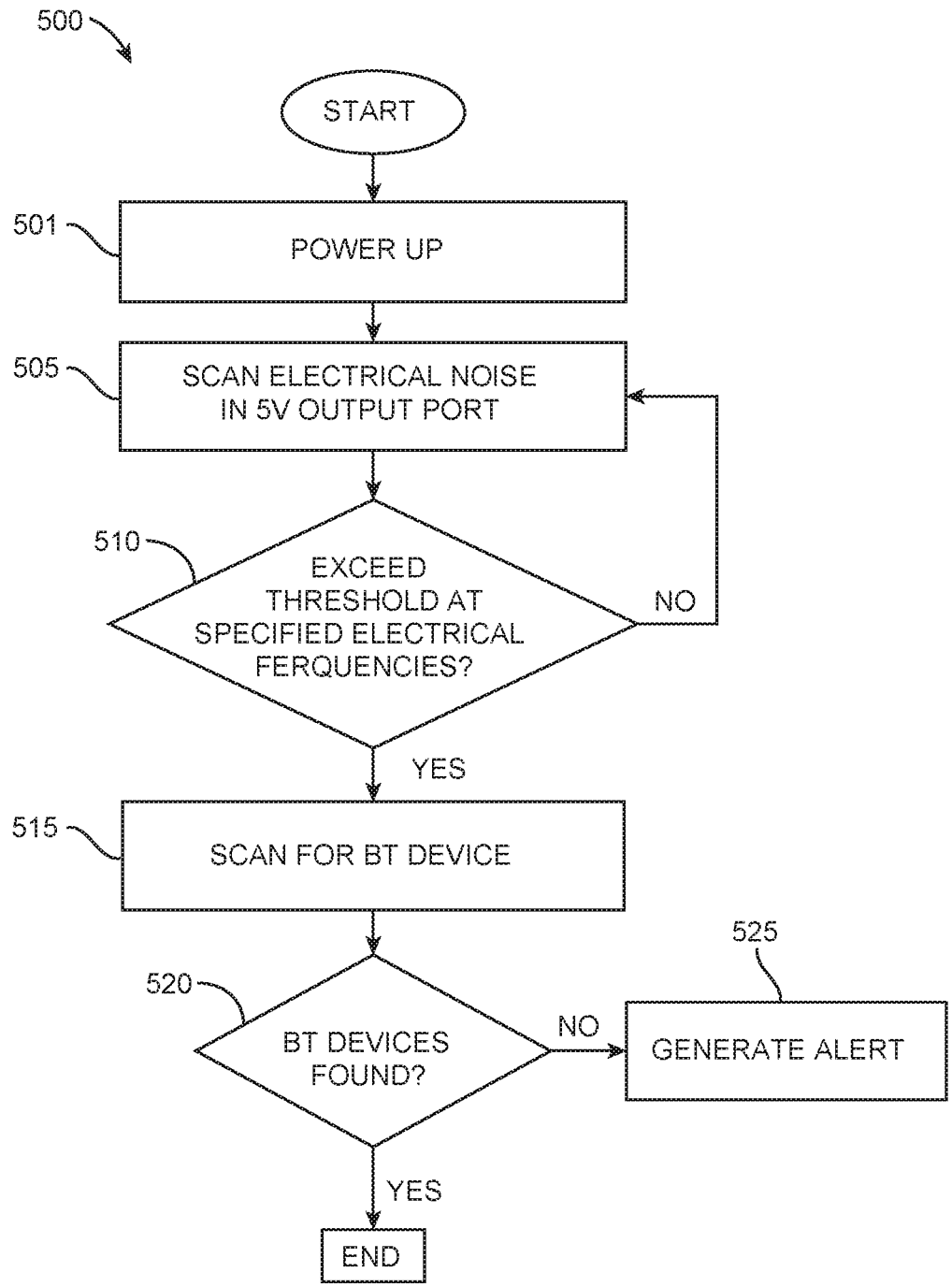
FIG. 5 is a flow diagram illustrating a procedure for generating a notification upon arrival of a vehicle, in accordance with the illustrative embodiment.

FIG. 5 shows the flow diagram for an interrogation procedure 500 of an exemplary embodiment of the invention for generating an alarm if selected items are not detected upon a person starting a vehicle. Upon power-up at procedure step 501, the interrogator device scans the vehicle's 12V output port for electrical noise at step 505. The interrogator device controller transforms the sensor reading from the time domain to the frequency domain to determine if certain frequency components exist within the 12V output port at decision step 510. If the certain frequency component exists, then the interrogator device establishes that the vehicle's engine is on. Then at step 515, the interrogator device scans for tracked objects that are in list of tracked objects to be interrogated upon entry into the vehicle. If a network connection is established between the interrogation device and the objects at decision step 520, the presence of the tracked object in the vehicle is confirmed and an alarm is not generated, and the procedure ends. However, if the network connection is not established between the interrogator device and the objects at decision step 520, the interrogator device outputs an alarm at step 525 to notify the user that a tracked object is missing from the vehicle. In an exemplary embodiment, the tracked object are scanned for a predetermined amount of time, such as 30 seconds, to ensure adequate time in establishing the connection, thus reducing the likelihood of false notification. The user has the option within the program menu to reduce or to increase the wait time before a notification is given.

In another embodiment of the invention, the interrogator device is equipped with a microphone system. When the user instructs the interrogator device to add a personal object to the list of tracked objects to be interrogated, a custom message can be recorded and stored to correspond to the tracked objects. For example, if the user programmed his cellular phone to the list, he can save the message, "cellphone". Thus, when the interrogator device searches for the cellular phone and does not find it, it can notify the user with the user's custom-recorded message. Alternatively, such object-specific names can be selected from a list. This feature is useful when multiples objects are tracked by the interrogator device. Alternatively, the method of programming customizable alerts can also be implemented through an interface on an application on the user's cellular phone and such alerts thereafter transferred to the interrogator for storage and later use, or by connecting the interrogator to a PC via a port such as a USB port and using software on the PC to download such audio files to persistent storage on the interrogator, or by implementing an interrogator functionality directly on the user's cellular phone in the form of an application. This application interface can also include adding an object to be tracked to a calendar event. Notification can be given for the object to be tracked if it is missing and the actual time and date correspond to the calendar event to which the object has been added.

In another embodiment of the invention, a user interface provides a display of selectable objects to be added to the list of devices to be monitored. To add an object, the user presses the add object button. The interrogator device enters the programming mode and listens for a Bluetooth broadcast from other communicating objects. A lighted indicator signals to the user the status of the programming sequence. Once a tracked object is found and a link is established, it is added to the list of tracked objects to be interrogated, where the alarm will sound if the tracked object is not located within the proximity of the vehicle when the vehicle is started.

G. Notification Generation Procedure Upon Vehicle Exit

Figure 6:
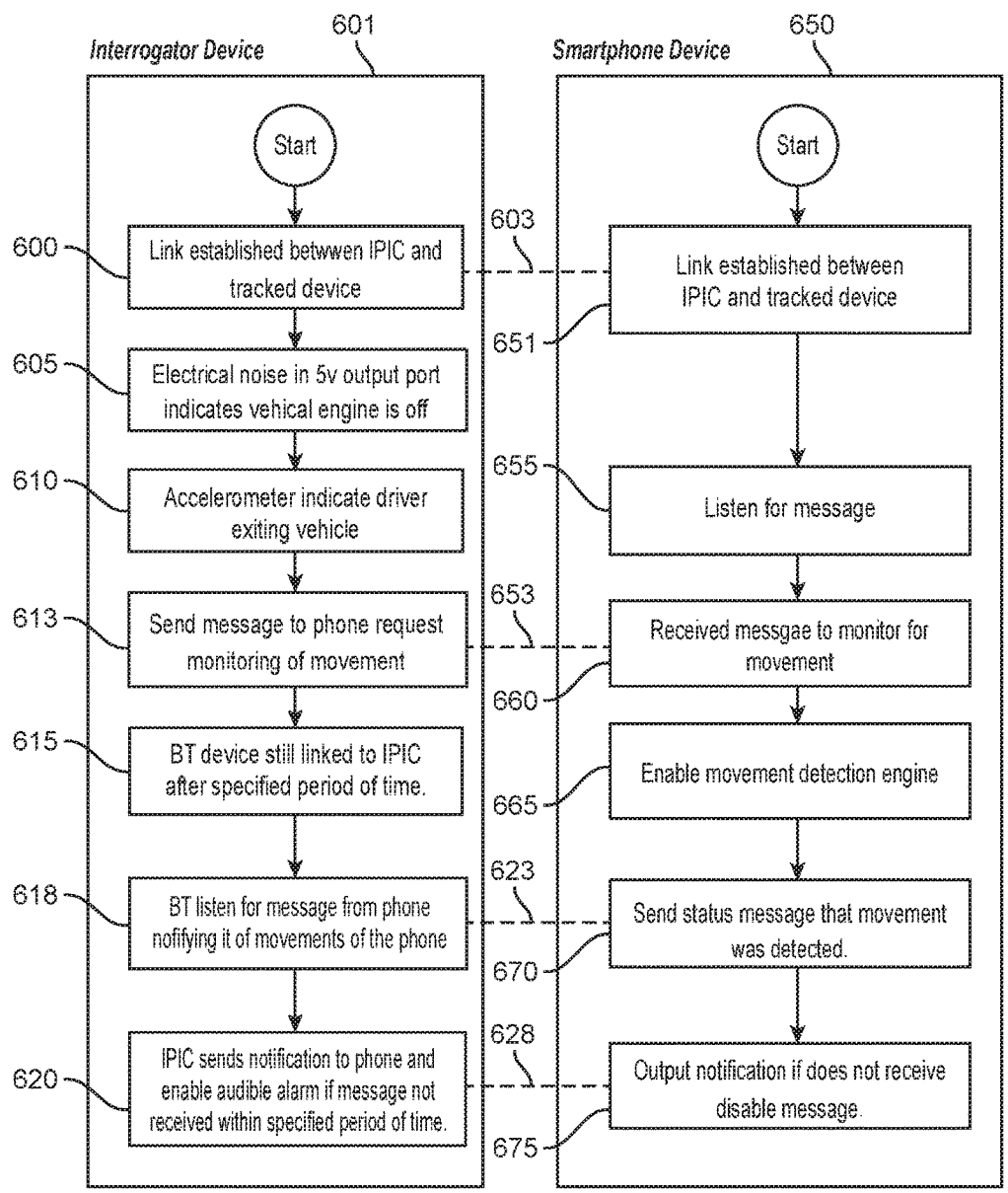
FIG. 6 is a flow diagram illustrating a procedure for generating a notification upon departure of a vehicle, in accordance with the illustrative embodiment.

FIG. 6 is a flow diagram showing the procedure for generating a notification based on a trigger event during the exiting of a vehicle. The scenario begins with the vehicle in an "on" state with the engine running, and a communication link 603 established between interrogator device 601 (located within the vehicle) and tracked object 650, such as a smartphone device in the illustrative embodiment. A list of tracked objects present within the vehicle is maintained by the interrogator device 601 and is shown in step 600. A link is maintained with the tracked object 600 in step 651. When leaving a vehicle, an operator would typically shut down the vehicle's engine first. In sequence 605, the interrogator device 601 monitors for such engine's power down by monitoring the vehicle power port for the electrical noise representing the operation of the engine. When the electrical noise disappears, the interrogator device 601 receives the first indication that the operator is about to exit the vehicle.

The interrogator device 601, if powered by a vehicle power port that supplies power whether the engine is on or off, or if it if has a battery to supplement the power that comes from a port that shuts off when the car turns off, can determine if the engine is shutting down based on either the disappearance of certain electrical signatures representing the engine's firing sequence or the appearance of other electrical signatures indicative of the engine being off. Upon recognizing that the engine has shut down, the interrogator can wait for a short time period and then produce a sound or phrase reminding the user to take the tracked phone or other tracked objects when they leave the vehicle. Such a system would prevent the common scenario whereby a user uses their cell phone while driving and then forgets to take it with them when they leave the vehicle.

Another embodiment of such an existing notification system would not issue an audio notification each time the engine was shut off but only provide such an audio reminder if it appeared probable that the user was leaving the vehicle without their phone or other tracked object. In such an embodiment, once the engine's changed state is detected, the interrogator device 601 listens for additional data that would indicate that phone was being moved, and thus most likely be taken from the car upon exit.

Upon engine shut-off, the interrogator device 601 can transmit a message to the phone or tracked object 650 requesting it to relay sensor readings from its own on-board motion sensors. To illustrate this operation, at step 613, the interrogator device 601 transmits a message 653 to the tracked object 650. In this scenario, the interrogator device 601 transmits the message 653 to the tracked object 650 requesting the tracked object 650 to initiate transmission of its on-board accelerometer readings. The tracked object 650 remains at step 655 waiting for such a signal 653 from the interrogator device 601. Once the signal is received at step 660, it initiates the recording of its on-board accelerometer readings at step 665. The tracked object 650 processes the reading locally and transmits the processed readings 623 or it can send raw sensor readings 623 directly to the interrogator device 601 at step 670. If the interrogator device 601 receives a message from the tracked object 650 indicating it has sensed active physical movement, characteristic of the movement of the tracked object itself and not of general car motion, from the tracked object's accelerometer sensor, it would output a signal to disable any forthcoming alarms related to the lack of removal of the tracked object at step 620. In addition, a disable message 628 can be sent to the tracked object 650 which would disable any forthcoming alarm from the tracked object 650 concerning a lack of its own removal from the vehicle if it has such alarm capabilities. If message 628 was received, the tracked object disables the notification from being made. If no such message is received within a short time period of the engine being shut off, then an alarm would sound to remind the user to take their phone or other tracked object.

An alternative method for discerning motion of the phone or other tracked objects, particularly those without accelerometers, would require the interrogator to monitor the Bluetooth signal strength coming from the tracked devices. If such signal strength started to change after engine shut off the interrogator can assume that the tracked object is being moved, and can therefore ensure that no alarm is issued by either the interrogator itself or the tracked object. If no such change in signal strength is discerned within a short time period of the engine being shut off, then an alarm would sound to remind the user to take their phone or other tracked object.

Merely monitoring for movements of tracked objects after the engine is shut off can lead to false alarms if the user is merely sitting in the car, perhaps waiting for someone to arrive. Thus, an improved embodiment includes a sensor to inform the interrogator that the user was actually leaving the vehicle. In one embodiment, the interrogator uses accelerometer sensors, either in the interrogator itself or in the tracked object, to monitor for specific physical movement signatures that are characteristic of the driver exiting the vehicle. Such an exit, preceded by opening the car door, will typically cause the vehicle to rock or move and such characteristic motions can be discerned by the accelerometers. Other sensors that can indicate that a user was leaving a vehicle include a sensor that determined if a door had opened, a pressure sensor under a seat indicating that a user had gotten out of a seat, or a capacitive sensor that indicated that a person had moved away from such sensor. Once such an exit-sensing sensor had established that a user was likely to be leaving the vehicle, the interrogator can then determine if any tracked-object-motion had occurred. If no such motion had been detected then the interrogator or tracked object itself would issue an alarm.

Such an interrogation and exiting-detection system embodiment can advantageously be implemented by the original car manufacturer with the particular advantage that sensors to determine that doors are opening or a person is getting up from a seat are already installed in many cars, as are Bluetooth systems. In addition, power to a built-in interrogator device can be supplied without requiring a stand-alone battery. Thus, an OEM-supplied interrogator, using built-in Bluetooth functionality, can use the techniques described above to determine that the car's engine had been shut off, or gather such information directly from the vehicle's data bus. At such time, the interrogator can communicate with software installed on a cell phone requesting accelerometer data or such accelerometer data can be supplied in a continuous manner. Alternatively, or in addition to monitoring the accelerometer data, the interrogator can begin to monitor the Bluetooth signal coming from the phone or tracked object. In either case, the interrogator would be looking for signal changes indicating that the phone had been moved in the time since the engine had been turned off.

Additionally, the interrogator can use data from car-door-open sensors or seat sensors to determine the time at which a user was beginning to exit the vehicle. If the car door sensor indicated a user-exit but no motion by the phone had been detected in the time period between the engine being shut off and the door opening, the interrogator would produce an alarm.

In both the OEM embodiment and the non-OEM embodiment, the alarm can continue to be active until the interrogator received accelerometer data that indicated phone movement, or until a change in the Bluetooth signal indicated that the phone had been moved. Alternatively, the alarm can merely timeout.

In the scenario where the user does not hear the alarm and does not go back to retrieve the phone, the phone or other tracked device can use its communications function to send an email or text message to the user informing such user that the phone is still in the car. The user is likely to see such email on a PC or other device that receives email or text message.

In the scenario where the link 603 is severed, for example when the tracked object is removed from an office, the tracked object 650 and the interrogator device 601 do not enable its notification sequence. This prevents the inadvertent false alarm of when the tracked object 650 is removed from the office. In such a scenario, the interrogator device 601 broadcasts messages to try to establish link 603 with the tracked object 650.

In another embodiment of the invention, signal strength of the network connection 603 between the interrogator device and the tracked object 650 can be used as a cue to indicate whether the tracked object has been moved as the user is exiting the vehicle. In such embodiments, the communication controller outputs the wireless signal strength and the controller uses the information to evaluate whether to provide a notification. The signal strength information can be used in unison with the on-board accelerometer readings from either tracked objects 601 and 650 based on the availability of such sensors to improve the likelihood of false notification.

H. OEM Interrogation Technology Built into a Vehicle

A further implementation of this technology for a Fob-based interrogator device includes OEM provided signals that correspond to the fob device, to interrogate for the presence of items. The vehicle itself is OEM-provided with the technology to interrogate for the presence of personal items. From below: Note, that some cars have built-in Bluetooth technology to power hands-free capabilities and some cars can have hands-free units with persistent Bluetooth signals or signals that are activated upon the car being turned on.

I. Interrogator as in-Vehicle Phone Controller

In addition to interrogating for the presence of tracked objects, the interrogator device can also perform various functions described herein relating to the object that is being interrogated or tracked by the interrogating device.

The location of an item determines whether the item is within detectable range of the interrogation device (for example in a vehicle), and the same technology used to determine presence is also used to monitor and restrict the use of a particular object that is found proximate the interrogator device. For example, an interrogator device can interrogate for the presence of a cell phone, and can restrict the use of the cell phone so that a user cannot be distracted by the use of the phone while they are driving a vehicle. Alternatively, instead of precluding such restricted activities, the interrogator device can be programmed to produce a warning sound if such features are being used inappropriately.

a. Precluded Features

If a Bluetooth link is established between the interrogator device and the selected object, for example to a teenager's phone, a phone-resident software program (the PSP) can be activated that disables specific "precluded" features on the phone. Such precluded features can be configured beforehand and selected from a list that can include any of the following, as well as other conventional functionality of the cell phone:

No text messages received or sent

No text messages sent but the receipt and display of messages is allowed

No phone calls to made or received

No Internet access

No phone activity at all

Some CIMS (car-in-motion sensors), such as accelerometers or other appropriate sensors, can detect that a car is in use and also discern whether the car is standing still or moving. For instance, the accelerometer can sense the vibration of an idling engine versus the motion of a moving vehicle. Alternatively, the CIMS that monitored engine noise as received through the vehicle power port can distinguish noise from an idling engine versus noise from an engine driving at a certain speed. The voltage-change approach to interrogation where changes in the voltage level are used to instigate interrogations, however, cannot be able to detect that the car was just idling or standing still, however, and by this token can be the most stringent technology to use as phone usage can be restricted whether the car is in motion or not. In addition to using data from a CIMS, the fact that a car was stationary can be determined by monitoring the GPS or other location data generated by the cell phone itself. With knowledge, therefore, about whether the vehicle is moving or not, the rules for precluding features can be modified such that any given feature can be re-activated if the car was standing still or traveling at a low enough speed to allow the features to be used. Because the interrogator device is installed in the car per se, it controls behavior related to the teenager's cell phone when in that car only. Thus, it does not affect behavior on public transportation or when riding as a passenger in another car.

b. In-Vehicle Phone Controller Procedure

Figure 7:
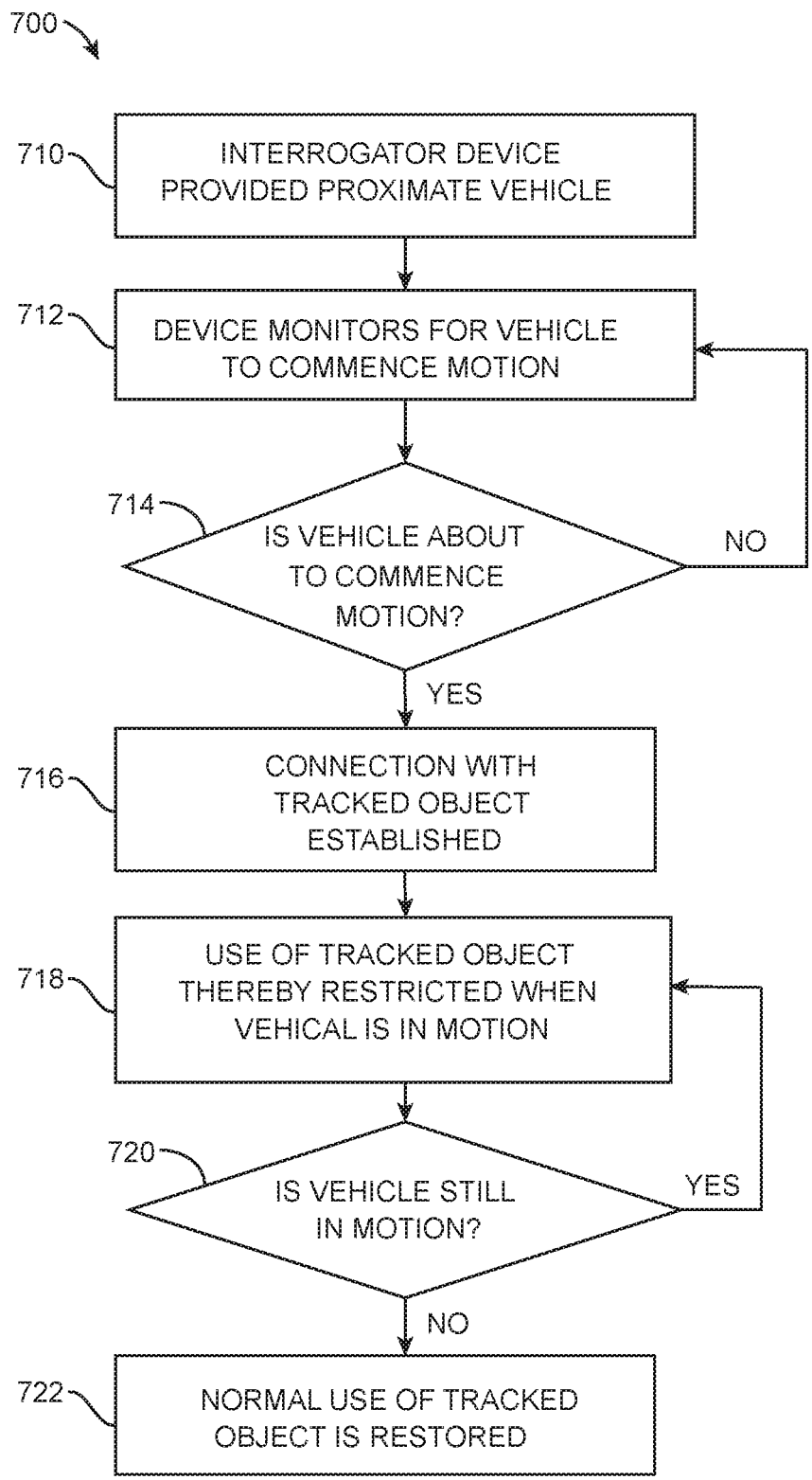
FIG. 7 is a flow diagram of a procedure employing context aware tethering technology in accordance with the illustrative embodiment.

Reference is now made to FIG. 7, showing a flow diagram for a context aware technology procedure 700 according to an illustrative embodiment. The procedure 700 begins at step 710 where an interrogator device is provided proximate a vehicle (or other mobile unit in which a person and selected objects are monitored). At step 712 the device monitors for the vehicle to commence motion. The vehicle continues to check if the vehicle is about to commence motion at decision step 714, and if it is not, continues to monitor at step 712. If the vehicle is detected that it is about to commence motion, the procedure advances to step 716 and a connection with the tracked object, such as a cell phone, is established.

The procedure then restricts the use of the tracked object when the vehicle is in motion at step 718. Then at decision step 720 the interrogator device determines if the vehicle is still in motion. If it is still in motion, the use of the tracked object continues to be restricted. If the vehicle is no longer in motion, the procedure advances to step 722 and the normal use of the tracked object is restored. Once the use of the tracked object is restricted, there are a plurality of precluded features for the tracked object, such as a cell phone according to an illustrative embodiment. The use can also be restricted to change the routing of calls, text messages, and emails while the phone is in use. This is described in greater detail hereinbelow with reference to the PIP (Phone in Place) embodiment. This allows a particular person to manage their cell phone by having calls directed through a particular place, such as their car system, using existing Bluetooth technology in the vehicle, or by monitoring the particular calls, messages, or other alerts that the driver receives.

c. Discouraging Avoidance Behavior

Naturally, teenagers will try to disable the interrogator device. The most obvious way to do this is to try to unplug the device from its power source, (i.e. the cigarette lighter).

To address this issue, the device can include the addition of a conventional mechanical switch that can discern when the device is being pulled from the cigarette lighter receptacle. Ideally, such a switch can register this action, and record the removal event. (Thus, the device would include a battery or equivalent capacitor so that this data can be record even after losing power from the car power port.) Additionally, the act of plugging the device back in, and activating the switch at that time, can be registered and recorded. Such recorded removal information, including the time, date, and duration of such disconnection, can thus be recorded in a non-volatile memory. Such instances of removal are distinguished from merely being deprived of power when the car engine is shut off (as many cars will turn off power to their cigarette lighter when the ignition is off) by virtue of the switch being activated. Additionally, the PSP would prevent the user from disabling the Bluetooth feature on the phone as such disablement would allow the user to perform precluded actions. If such disablement was not possible, then the fact that Bluetooth was turned off would be recorded and reported.

GPS information from the tracked phone concerning location and travel speeds in the period before disconnect can also be recorded and stored by the PSP. Also captured can be data as to whether the teenager cell phone had established a Bluetooth connection to the device when the device was disconnected.

Once the interrogator device was operative again after being plugged back in it may have lost track of the actual date and time, if such information is not being generated via a battery-operated time circuit. Therefore the newly operative device tracks the elapsed time during which it is newly operating. Later, synching with a mated cell phone provides updated date and time information that can then be combined with the aforementioned elapsed time information to reconstruct the running log with absolute date and time information.

In a related manner, the PSP on the teenager's phone can maintain a continuous log of metadata concerning the performance of all possibly precluded activities. That is, a perpetual diary can be kept of activities such as texting and making and receiving phone calls. Differing levels of metadata detail can be maintained ranging from just the time and date of text messages and phone calls to the actual names of parties who are texted or called. GPS data, including speed of travel, can also be associated with any precluded activities. Potentially, the device software can access and store the content of text messages, as well.

Whenever the teenager's phone was synched to the interrogator device, data can be exchanged between the device and the PSP indicating any interruptions in operation. This data can be matched by the PSP to the use of precluded features. If there had been precluded activities on the cell phone during the time period that the interrogator device was unplugged, the PSP can note such a "coincidence", including the time and date and which precluded features had been accessed. Such coincidence information can be stored on either or both devices.

Coincidence information, if recorded by the PSP, can be sent via an email through the cell phone to the email account of a parent of the teenager or other monitoring party such as an employer. If the cell phone or PSP did not have that ability, parents can collect such information locally on their cell phones if such phones are also able to communicate with the interrogator device. Such communication can require the phone to be relatively close to the device when it was plugged in and supplied with power, however. Such local communication can be quite natural, however, if the car was being shared by teenager and one or more parents.

Note that because parents' phones can be able to communicate with the interrogator device at the same time as the teenager's phone, the teenager's PSP can be notified if a parent is in the car with the teenager. Under those situations, no features can be precluded by the PSP.

The interrogator device can also be used to collect data as to which other passengers might be in the vehicle with the teenager by listening for other persistent Bluetooth signals, such persistent presumably coming from another passenger if the vehicle moved any distance.

Metadata about such signals can be collected and recorded in the log. If carrying passengers are a precluded activity, such activities can be reported to the parent in either of the two methods described above. Passengers can always turn off their Bluetooth in such a situation, of course, but it is possible for the interrogator device to still be able to record that it was turned off while the car was in motion.

In some cases users may wish to modify their own behavior of texting while driving or otherwise using their mobile phone in an inappropriate manner. For this type of user, the interrogator device can construct a careful log of such usage and email it to the user or a concerned party, be it a spouse or employer.

Additionally, the PSP software, perhaps in combination with server software, can automatically donate a fixed amount of money to a charity, or to a spouse, upon the performance of any precluded action as determined by the PSP.

Maintaining a Log of Inoperative Time Periods

Naturally, teenagers will try to disable the interrogator device. The most obvious way to do this is to try to unplug the device from its power source, (i.e. the cigarette lighter).

To address this issue, the device can include the addition of a conventional mechanical switch that can discern when the device is being pulled from the cigarette lighter receptacle. Ideally, such a switch can register this action, and record the event. (Thus, the device would include a battery or equivalent capacitor.) Additionally, the act of plugging the device back in, and activating the switch at that time, can be registered and recorded. Such recorded removal information, including the time, date, and duration of such disconnection, can thus be recorded in a non-volatile memory. Such instances of removal are distinguished from merely being deprived of power when the car engine is shut off (as many cars will turn off power to their cigarette lighter when the ignition is off) by virtue of the switch being activated. Additionally, the PSP would prevent the user from disabling the Bluetooth feature on the phone as such disablement would allow the user to perform precluded actions. If such disablement was not possible, then the fact that Bluetooth was turned off would be recorded and reported.

GPS information from the tracked phone concerning location and travel speeds can also be communicated from the phone to the interrogator device and recorded in a log allowing information to be obtained and recorded in non-volatile memory concerning the location and speed of the vehicle in the period before disconnect. Also captured can be data as to whether the teenager cell phone had established a Bluetooth connection to the device when the device was disconnected.

Once the interrogator device was operative again after being plugged back in it may have lost track of the actual date and time, if such information is not being generated via a battery-operated time circuit. Therefore the newly operative device tracks the elapsed time during which it is newly operating. Later, synching with a mated cell phone provides updated date and time information that can then be combined with the aforementioned elapsed time information to reconstruct the running log with absolute date and time information.

Maintaining a Log of Precluded Events

In a related manner, the PSP on the teenager's phone can maintain a continuous log of metadata concerning the performance of all possibly precluded activities. That is, a perpetual diary can be kept of activities such as texting and making and receiving phone calls. Differing levels of metadata detail can be maintained ranging from just the time and date of text messages and phone calls to the actual names of parties who are texted or called. GPS data, including speed of travel, can also be associated with any precluded activities. Potentially, the device software can access and store the content of text messages, as well.

Matching Inoperative Time Periods with Precluded Events

Whenever the teenager's phone was synched to the interrogator device, data can be exchanged between the device and the PSP indicating any interruptions in operation. This data can be matched by the PSP to the use of precluded features. If there had been precluded activities on the cell phone during the time period that the interrogator device was unplugged, the PSP can note such a "coincidence", including the time and date and which precluded features had been accessed. Such coincidence information can be stored on either or both devices.

Coincidence information, if resident in the PSP can be sent via an email through the cell phone to the email account of a parent of the teenager or other monitoring party such as an employer. If the cell phone or PSP did not have that ability, parents can collect such information locally on their cell phones if such phones are also able to communicate with the interrogator device. Such communication can require the phone to be relatively close to the device when it was plugged in and supplied with power, however. Such local communication can be quite natural, however, if the car was being shared by teenager and one or more parents.

Note that because parents' phones can be able to communicate with the interrogator device at the same time as the teenager's phone, the teenager's PSP can be notified if a parent is in the car with the teenager. Under those situations, no features can be precluded by the PSP.

Tracking Passenger Information

The interrogator device can also be used to collect data as to which other passengers might be in the vehicle with the teenager by listening for other persistent Bluetooth signals, such persistent presumably coming from another passenger if the vehicle moved any distance.

Metadata about such signals can be collected and recorded in the log. If carrying passengers are a precluded activity, such activities can be reported to the parent in either of the two methods described above. Passengers can always turn off their Bluetooth in such a situation, of course, but it is possible for the interrogator device to still be able to record that it was turned off while the car was in motion.

Voluntary Functionality Control

In some cases users may wish to modify their own behavior of texting while driving or otherwise using their mobile phone in an inappropriate manner. For this type of user, the interrogator device can construct a careful log of such usage and email it to the user or a concerned party, be it a spouse or employer.

Additionally, the PSP software, perhaps in combination with server software, can automatically donate a fixed amount of money to a charity, or to a spouse, upon the performance of any precluded action as determined by the PSP.

II. Building Embodiment

Figure 8:
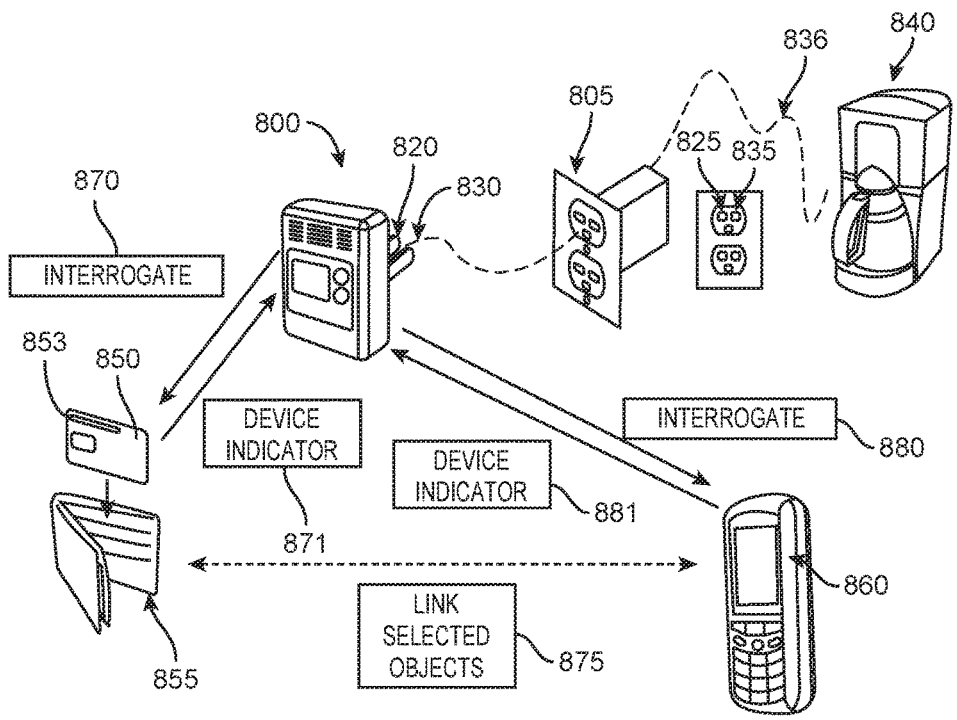
FIG. 8 is an overview flow diagram showing a building implementation of the interrogation system, according to the illustrative embodiment.

FIG. 8 shows a particular implementation of the generic system architecture shown in the block diagram of FIG. 1 according to a building and wherein the interrogator device is a pluggable wall socket adapter. As shown in FIG. 8, the wall adapter 800 is inserted into the wall socket 805 located within the interior of the building structure. It should be understood that the interrogator device can function in any building, enclosed or open, so long as it is plugged into a power receptacle that is powered. In its inserted state, the power lead 820 is in contact with the building power connection 825 and the neutral lead 830 is in contact with the building's neutral lead 835. Appliances 840 can be directly or indirectly coupled via link 836 to the wall socket receptacle.

Wall adapter 800 interrogates for the presence of personal items 850 and 860 via datastreams 870 and 880, respectively. Wall adapter 800 monitors for cues from activities of appliances 840 within the building as conditions to determine whether a person is in the building and thus the tracked objects are present and to thereafter establish whether a notification is generated. The items can also be linked via 875 to provide a communication channel therebetween.

Figures 9, 10:
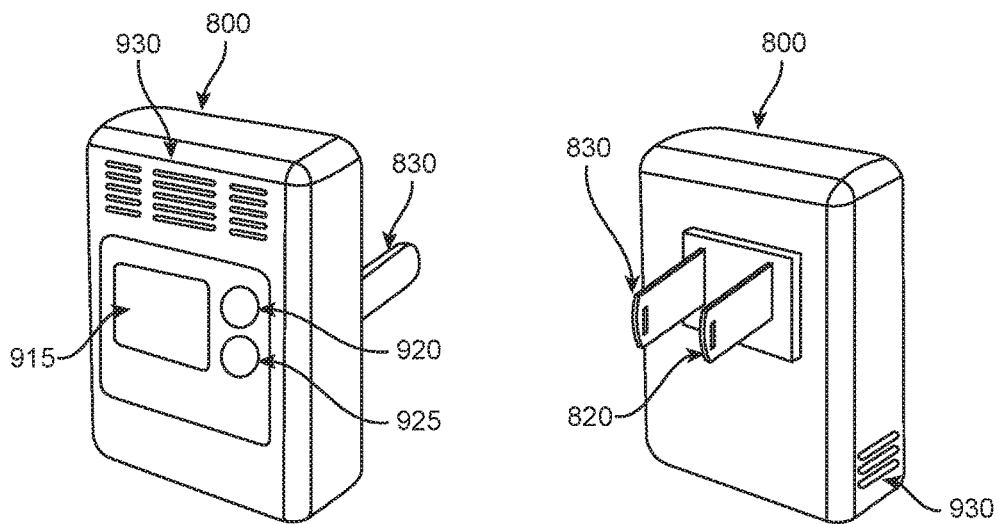
FIG. 9 is a front perspective view of an interrogator device for the building implementation in accordance with the illustrative embodiment.
FIG. 10 is a rear perspective view of the interrogator device for the building implementation in accordance with the illustrative embodiment.

FIGS. 9 and 10, respectively, show front and rear views of the wall adapter interrogator device 800 of FIG. 8. The interrogator device 800 includes a speaker output 930 to provide an audible alarm if and when so desired. The neutral lead 830 is in contact with the building's neutral line and the power lead 820 is in contact with the building's power line. A button 920 is provided that sets the interrogator device 900 into a programming mode to listen for another tracked object that is to be added to the monitoring queue. Another button 925 is provided that can set the interrogator device 900 into a programming mode to listen for tracked objects that are to be removed from the monitoring queue. Display indicator 915 provides indication to the user that interrogator device 900 is on, and indication that interrogator device 900 is in a programming mode and seeking to add or remove a tracked object to the monitoring queue.

Figure 11:
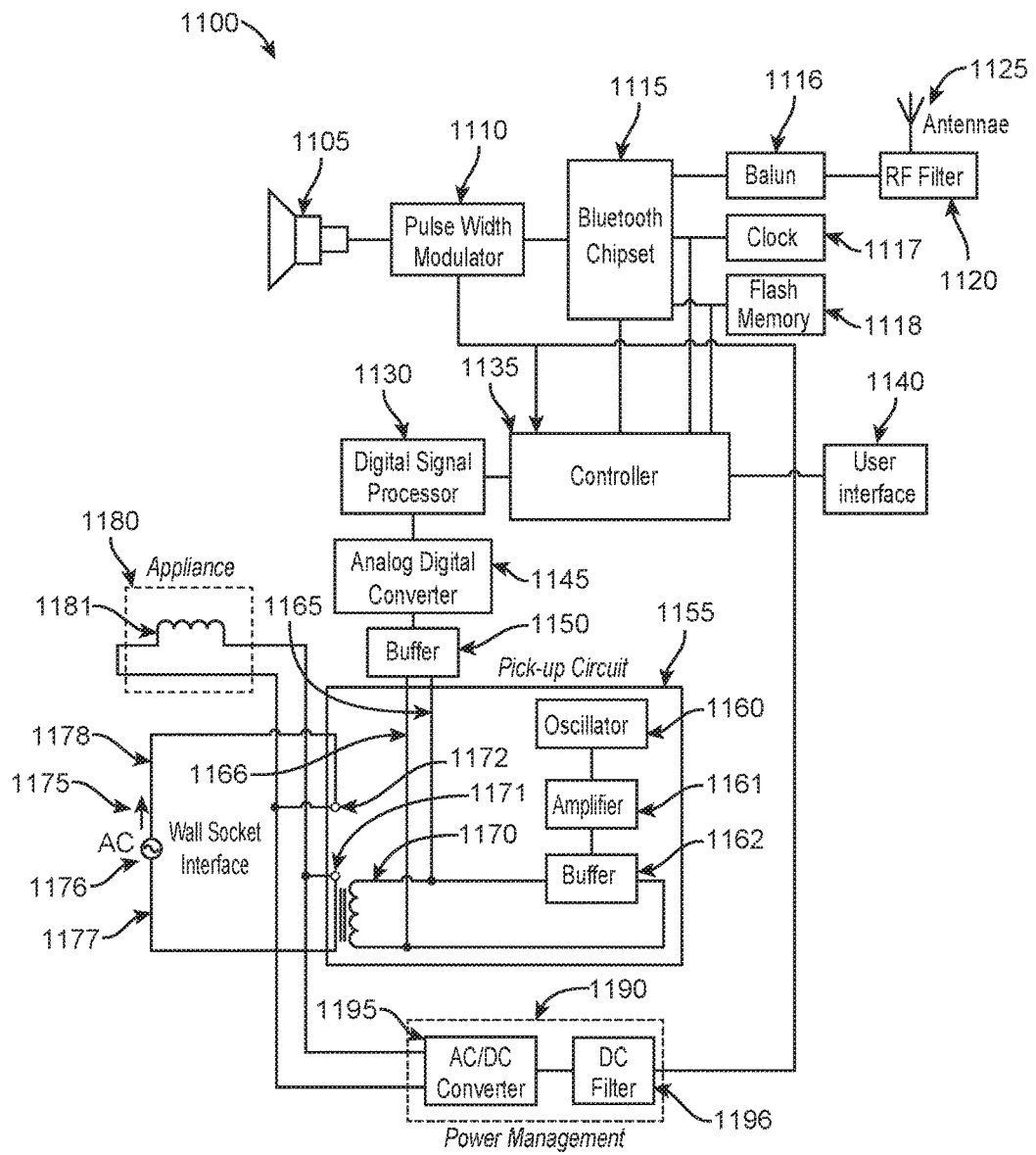
FIG. 11 is a schematic diagram of an exemplary architecture for the building implementation according to the illustrative embodiment.

FIG. 11 depicts a schematic diagram illustrating an exemplary system architecture of the interrogator device for usage in a building. The system 1100 has two primary controllers that interface with each other: a system controller 1135 and Bluetooth controller 1115. The system controller 1135 runs the primary software and the high-level function controls of the interrogator device. It takes in all the inputs from the sensors and determines whether a notification should be generated. The Bluetooth 1115 manages the networking functions and generates the waveform to create the alarm sound from speaker 1105. Digital signal processor 1130 analyzes inputs from current sensor 565 and provides feedback to controller 1135 as to whether the activity of interest is detected. The power management circuitry 1190 draws power from the wall socket receptacle and provides power for all the circuitries in interrogator device 1100. At the wall socket interface, the power lead 1172 and neutral lead 1171 are connected to the appliance 1180. When the appliance 1180 operates, its motor 1181 generates electrical noise within the building power line 1177. A current detection circuit 1155 picks up the noise through pickup coils 1170, which are wrapped adjacent to the building power line near the power lead 1171.

Bluetooth controller 1115 can be the Broadcom® BCM4325, a single chip IEEE 802.11 a/b/g MAC/Baseband/Radio with integrated Bluetooth® 2.0+EDR and FM receiver and manages all the networking function of the interrogator device. Bluetooth controller 1115 can also include a built in baseband, media access control (MAC) address, and PHY.

In building electrical wiring systems, appliances are typically added in parallel with the AC source 1176 from the building's transformer. Within the building, the wirings are divided into subdivisions at the fuse box for a room or combination of rooms. Within each subdivision, power line 1178 runs to the power lead 1172 in the wall receptacle of each room. The neutral lead 1171 in the wall receptacle returns the electrical connection through power line 1177. When an appliance 1180 is plugged into the wall receptacle, it completes the circuit and current flows 1175 through the power line. In a large appliance, there is a motor 1181 inside, and the circuit is not closed until a normally open switch inside the appliance is closed.

Bluetooth controller 1115 interfaces to controller 1135 through a four-wire serial-digital input and output (SDIO) interface using its internal universal asynchronous receiver and transmitter (UART). Bluetooth controller 1115 connects with RF antennae 1125 through a balun 1120, which provides adjustment to line impedance to reduce interferences from line mismatch. Balun 1120 adjusts the balances and unbalances input with respect to the interrogator device ground. Between the balun 1120 and the RF antennae 1125, radio frequency (RF) filter 1120 extracts the narrow band frequency component of the input signal ranging between 2.35 GHz and 2.52 GHz. Digital clock 1117 provides a digital reference signal for Bluetooth chipset 1115, and has a reference clock between 12-52 MHz. Although Bluetooth chipset 1115 uses its internal random access memory (RAM) and runs the instruction set stored within its read-only memory (ROM), external flash memory 1118 provides a means to update such firmware and instruction sets.

Bluetooth chipset 1115 receives power from the direct current-to-direct current (DC/DC) converter 1196. DC/DC converter 1196 provides a voltage output between 2.5V to 5.5V to Bluetooth chipset 1115. An internal switching regulator within Bluetooth Chipset 515 generates the internal voltages necessary to operate Bluetooth chipset 1115's internal circuitries.

User interfaces 1140 are digital inputs and outputs that interface to the lighting indicators on the interrogator device's casing, or the buttons used for the interrogator device programming and connect directly with the controller 1135. Upon pressing the button, a de-bounced circuit latches the input with a dead time of 50 milliseconds, thus preventing multiple inputs from being generated and sent into controller 1135.

Bluetooth chipset 1115 generates the signal to the speaker, which provides the alarm to the user. The signal to enable the oscillator to generate the alarm is triggered from the controller 1135. The internal oscillator of Bluetooth chipset 1115 outputs signals to pulse width modulation (PWM) circuit 1110 with a frequency between 10K Hz and 50 KHz. The PWM circuit 1110 is supplied by a 12V power connection from DC/DC converter 1196 and outputs the PWM waveform to the speaker 1105, which converts the electrical signal to an audible sound with a frequency of between 20 Hz and 5 KHz. The speaker can be varied by the operation to output between 50 decibels to 70 decibels.

When power circuit is closed, appliance 1180 is running motor 1181. From its operation, the motor generates perturbation within the current flow 1175. The winded pickup coil 1170 is wound near the neutral return lead 1171 of the power line and is thus inductively coupled to it. An alternating voltage source creates an alternating current flow through pickup coil 1170. The alternating current in the pickup coil 1170 is affected due to its inductive coupling with appliance motor 1180. The pickup coil 1170 thus observes the perturbation in current 1175 in the building's power line.

Alternating voltage is applied to the pick-up coil through an oscillation circuit 1155. An oscillation circuit consists of an oscillator 1160, which generates a fixed frequency between 1 kHz and 1 MHz at 50 mV peaks. The oscillator 1160 feeds its output into amplifier 1161, which amplifies the waveform by signal by a magnitude of 100. The amplifier 1161 feeds its output into a unity gain buffer 1162 that provides isolation from a return flow from the pickup coil 1170.

A differential output is run into a buffer circuit with one lead from positive lead 1165 connected at the beginning of pickup coil 1170 and the other lead from negative lead 1166 connected to the end of pickup coil 1170. The differential signal contains the perturbed current from the building current 1175, but does not have the alternating current signal along with it.

Analog-to-digital (A/D) convertor 1145 is fed to the output from buffer 1150. A/D converter 1145 is a single channel serial AD converter with an input range of 0V to 5V at 12-bit resolution sampling at 1 KHz. The AD converter 1145 outputs the serial digital stream representing the perturbed current to the digital signal processor 1130.

The digital signal processor 1130 processes the differential current readings and compares the current signature it has stored with the current signature it is observing. If a sufficient match is found, digital signal processor 1130 concludes that the appliance 1180 is operating and signals controller 1135 of its determination.

Interrogator device 1100 can be plugged into a wall socket receptacle and offers a female connector into which the appliance 1180 can plug; however, the invention still operates even if the appliance was plugged into a separate wall socket receptacle. When the appliance 1180 operates, the current signature of the appliance 1180 is still observable by pick-up coil 1170 due to its inductive coupling to the wires in the wall socket receptacle. The inductive coupling makes it act as a radio receiver with the building power line connected to it acting as a radio antenna. Thus, even though current might not necessarily flow in power line 1178, the power line is still coupled to the other power line where the appliance 1180 is operating. This coupling generates the current signature on the power line 1178 which can be detected by the pickup coil 1170.

An example of the application is illustrated in a coffee shop embodiment. If the last thing the user does each night before leaving is to shut down the coffee maker, the user can program the electrical flow to the coffeemaker as a signal that is monitored by the interrogator device. Thus, the interrogator, instigated by a signal that such electrical flow had ceased would generate a notification if it does not receive a message from the mobile phone within a certain time period stating it is in motion after the coffeemaker is turned off.

Another example of the application is illustrated in the home embodiment. In this case the user could connect to any designated appliance. For instance the digital signal processor 1130 can be programmed to recognize different "current signatures" from different appliances in the home. A number of alerts can be programmed in for a variety of scenarios. If the user leaves the home (as detected by cellular phone GPS or initiated by an interrogation of the cellular phone in a vehicle) and the toaster oven is still running, the home interrogator will detect this and a safety alert can be sent to the user's cellular phone before they are out of range.

With addition of a light sensor in the home interrogator the amount of ambient light in a room could be used to enable certain alerts. If the lights are off an alert can be generated if there is any unexpected current signature in a room under the assumption that with the lights out the room is unoccupied. Alternatively turning the lights on could enable alerts as to when the coffee maker is running or not letting the user know when the coffee is ready. This alert is only needed when the room is occupied.

Wall Chargers

Another function that an intelligent wall charger could perform would be to ensure that it is not left behind in a room. This apparently is a major problem. The solution to this problem would be to have a simple app on the phone that could take note of when the expected checkout date and time was. (Time could be optional.)

When checkout day and time comes, the Bluetooth connection between phone and the charger becomes a tether, tying the two together. If the connection is lost, the phone, which is presumably with the user, would signal an alarm or alert.

If the wall charger is pulled out of the wall, the Bluetooth connection is also lost, however, there will be no gradual diminishment of the signal as there would be if the user walked away with their phone leaving the wall charger behind. Therefore, an instant termination of the Bluetooth signal would indicate that the unit has been unplugged and is now being packed away. The app could assume that the wall charger was safely packed away at that point and cease looking for its Bluetooth signal.

Alternatively, the wall charger could have a small battery or capacitor allowing it to send out a brief signal signifying that it had been unplugged and that all was well.

Such a battery could also be used to ensure that the Bluetooth connection remained intact for some period of time. This delayed tether would prevent the wall charger from being unplugged but left on a table, for instant. But such a delayed tether would prevent the user from leaving the room without the unit (to go to breakfast, for instance). Therefore an on-off switch on the charger would be desirable to allow the tether to be broken as needed.

III. PC Embodiment

Figure 12:
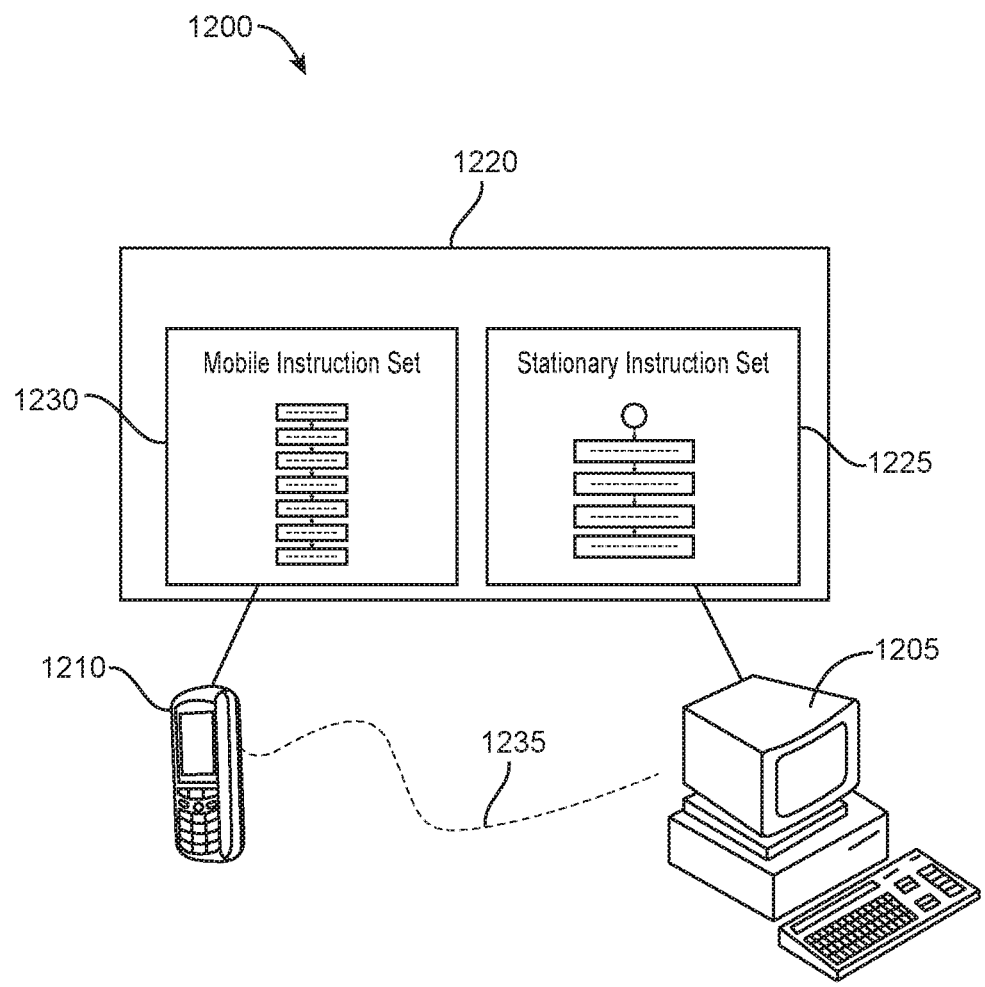
FIG. 12 is an overview block diagram of an office implementation of the interrogation system according to the illustrative embodiment.

FIG. 12 shows an illustrative embodiment of the general system diagram of FIG. 1 in an office implementation 1200 where the interrogator device is a personal computer operating within the office. The personal computer 1205 serves as the interrogator device by undergoing a set of computer instructions 1220. The computer 1205 operates together with a mobile device 1210 via an established link 1235. Instruction set 1220 consists of two instruction sets, one set of computer instructions 1225, which resides on the personal computer (PC) or a laptop 1205 and the other set of computer instructions 1230 on a mobile phone 1210.

Figure 13:
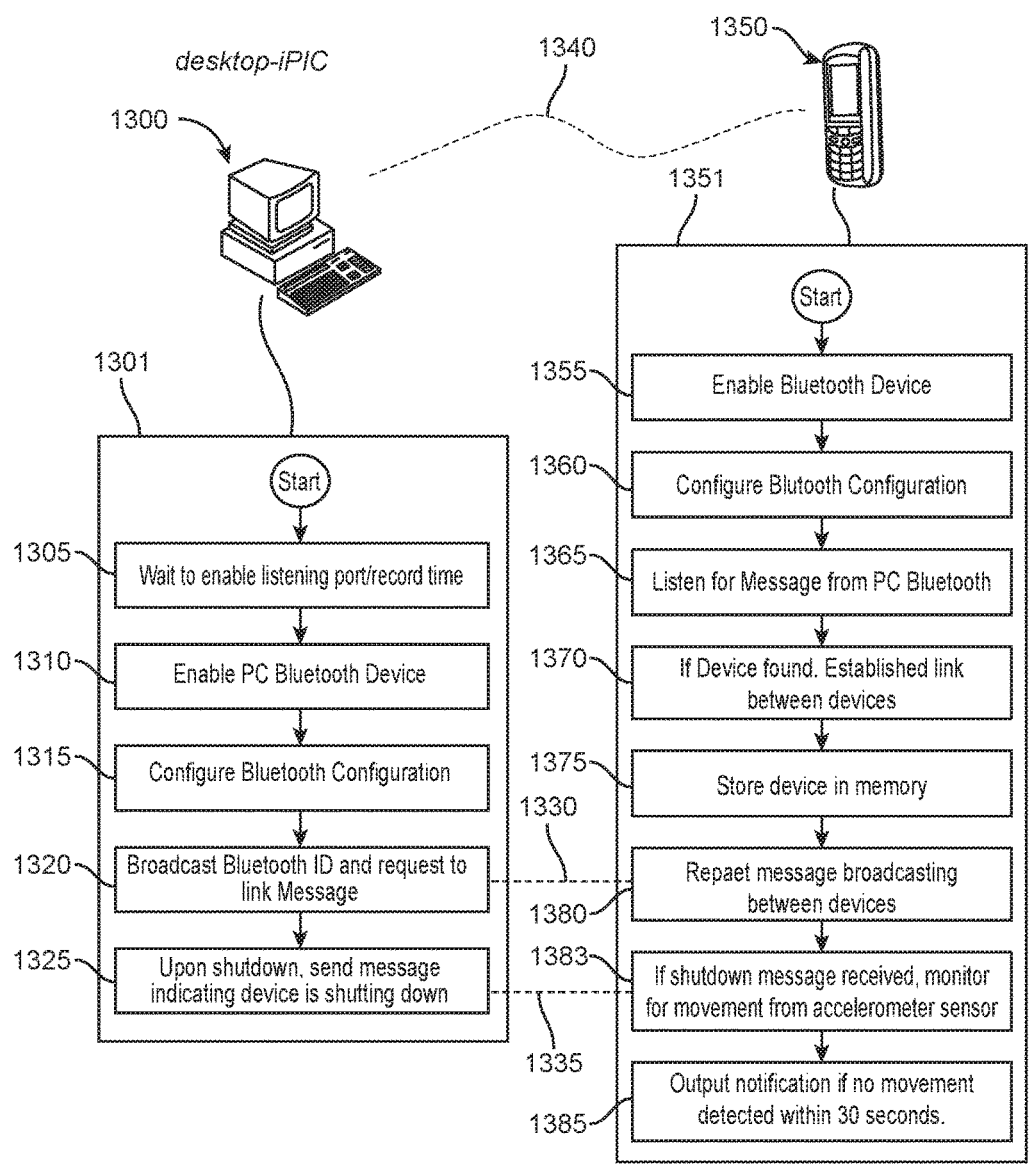
FIG. 13 is a flow chart of a procedure for interrogation within the office implementation according to the illustrative embodiment.

FIG. 13 shows a flowchart of a procedure of an office-based object tracking system according to a system such as that shown in FIG. 12. When arriving at the office, the interrogator device detects a mobile phone indicating that the user has arrived, and if tracked objects are not present, instruction set 1301 generates a notification through the interrogator device 1300 indicating tracked objects 1350 are not present within the office. Interrogator device 1300 can be a computer, a laptop, or any computing platform with networking capabilities to establish communications with tracked objects. In leaving the office, instruction set 1351 generates a notification through mobile device 1350 to alert the user that tracked object 1350 was left behind. Mobile device 1350 can be a cellular phone or other object with the appropriate communications ability. Instruction set 1351 only generates the notification once interrogator device 1300 shuts down and mobile device 1350 does not detect any movement from its on board accelerometer or gyroscope readings.

Instruction set 1301 is a typical executable application that is initiated by the interrogator device 1300 operating system. Upon execution at step 1305, instruction set 1301 records the time of execution and stores the time in the interrogator device's 1300 persistent memory. Then at step 1310, instruction set 1301 searches the system hardware list for existing communication ports and enables the Bluetooth communication port if one is found. Then at step 1315, instruction set 1301 configures the Bluetooth port with a specific port number. Then at step 1320, instruction set 1301 enables the Bluetooth port to broadcast its Bluetooth ID along with a request to link message. It does so continuously every 10 seconds for 120 seconds or until it is told to stop by the user.

Corresponding instruction set 1351 operates on mobile device 1350 as a standard executable application that executes within mobile device 1350 operating system. Upon execution at step 1355, instruction set 1351 searches the system hardware list for existing communication ports and enables the Bluetooth communication port if one is found. Then at step 1360, instruction set 1355 configures the Bluetooth port with a specific port number. Then at step 1365, the instruction set 1301 enables the Bluetooth port to listen for a unique broadcasted message from interrogator device 1300. Then at step 1370, if interrogator device 1300 is found, a network link is established between the computer 1300 and the cellular phone 1350. Then at step 1375, mobile device 1350 stores the network identifier of interrogator device 1300 locally within its non-persistent memory. Then at step 1380, interrogator device 1300 and mobile device 1350 maintain a communication link 1330 between each other through intermittent broadcasted messages. Upon shut down at step 1325, instruction set 1301 sends a message to mobile device 1350 indicating it is shutting down. Instruction set 1351 receives message 1335 at procedure step 1383 providing the cue that the person is about to leave the office. As an alternative, instruction set 1350 resides on the mobile device within non-volatile memory as well as volatile memory.

Instruction set 1351 generates a notification at step 1385 if two scenarios occur, the first being if it does not detect movement from mobile device 1350 on-board accelerometer sensors after receiving broadcast message 1335 from interrogator device 1300 indicating it is shutting down. The second scenario is if instruction set 1351 does not receive a broadcast message from mobile device 1350 for a period of time. In either instance, instruction set 1351 generates a notification to the user through mobile device 1350 in the form of an audible alarm. Notification can also be sent as an email message to a user specified email account.

The intermittency period of broadcast messages 1330 typically occurs every 10 seconds, but is configurable by the user within the programming menu on interrogator device 1300. Message 1330 not only provide an indication of the presence of mobile device 1350, but also provides its relative distance from interrogator device 1300 based on the signal strength and direction.

Several use-cases exist: (1) the person starts up interrogator device 1300 and mobile device 1350 is present, (2) the person starts up interrogator device 1300 and mobile device is not present, (3) the person reboots interrogator device 1300, (4) the person walks out of the room with mobile device 1350, (5) the person walks out of his room without mobile device 1350, (6) the person shuts down interrogator device 1300 and walks away without mobile device 1350, and (7) the person shuts down interrogator device 1300 and walks away without mobile device 1350. Table 1 shows the decision for the instruction set 1351 to generate a notification under such use-cases.

TABLE 1

| | | |
|---|---|---|
| 1 | Person starts up his computer with his phone | No notification |
| 2 | Person starts up his computer without his phone | Notification generated |
| 3 | Person reboots his computer | No notification |
| 4 | Person walks out the room with his phone | No notification |
| 5 | Person walks out the room without his phone | No notification |
| 6 | Person shuts down computer and walks out of the room with his phone | No notification |
| 7 | Person shuts down computer and walks out of the room without his phone | Notification generated |

According to this particular embodiment, there are only two scenarios when a notification would be generated. The first, when the person starts up his computer or begins to use it as determined from software that monitors for keyboard and/or mouse, tablet, or touch screen usage, and the phone is not present (2 in Table 1 above). The second, when the person shuts down the computer and the phone has not reported any movement characteristic of being picked up and taken with the user (7 in Table 1 above).

Similarly, when the person walks out of the room with the cell phone, or even without the cell phone, the invention does not take any action, as the triggering event is based upon the power on status of the computer system, not the person leaving the room.

A button exists on the user interface of instruction set 1301. When pressed, it puts instruction set 1301 into a programming mode to listen for tracked objects that are to be added to the monitoring queue. Correspondingly, a button exists on the user interface that puts instruction set 1301 into a programming mode to remove tracked objects from the monitoring queue.

In another embodiment of the invention for use in an office, the instruction set generates the alert in the form of an audible sound as well as some kind of visual alert based on the user settings. The visual alert would be displayed when the computer is turned on. The objective of the notification is to notify the user that an object that is supposed to be present within the area and the given circumstances, is not, and thus alert him to retrace his steps to discover where the tracked object was left. For example, if the user had left his cell phone in another room, upon returning to his computer, there would be a notification on the computer screen telling him that his phone was not present. In addition to simply alerting the user of the presence or absence of his cell phone, the notification can also display important metadata from the phone, including but not limited to: remaining battery life, presence of an unread text message, or a new voicemail, which can be transmitted in the notification from the cell phone to the computer.

In still another embodiment, a remote user could query the computer to see if a tracked object were left proximate to the computer. If the user left his cell phone (or other tagged object) in his office, he could contact the office computer over the internet from another computer and ask the office computer to determine if the tagged object is in the office. This is done by using the methodology described above to see if the object can be located, saving the user much time in the search for the object. In some embodiments, a number of computing devices could be queried simultaneously to see if the object could be found, either through a broadcast to all devices on a network or through specific requests to individual computers or through a mesh network request that propagates through all connections of a set of networks. Of course, this concept is no limited to an office computer or network, and could incorporate the home computer or any processing unit and/or networks, from home BLE pico-nets between light bulbs and appliances to Wi-Fi networks between laptops, routers, and switches to networks within a vehicle to the internet at large. One of skill in the art could envision many similar permutations.

In another embodiment, chargers could incorporate functionality to perform searches. For example, Starbucks provides charging stations for their customers. If these chargers have BLE and Wi-Fi functionality, then a customer could connect to the charger remotely and query the charger to see if a lost cell phone is still in the restaurant. This saves the customer the trip back to Starbucks to search for the phone if the phone was not left there. With this level of connectivity, the customer could also check to see if there were charging facilities available before traveling to the Starbucks. Perhaps Starbucks would provide an app to provide information on the availability of a slot at the charging bay. This app could also detect a nearby charger and remind the user if the cell phone needs charging.

IV. Portable Embodiments

A. Cell Phones and Dongles as Interrogator Devices

There are products that use wireless technology to help user keep cell phones in close proximity with dongle-equipped devices. These systems create a "virtual leash" between the cell phone and the tethered device, typically a dongle attached to a keychain. Note that there can be two or more interrogator devices in such systems. A "dongle" is a small piece of hardware that is connected to an object for communication with the interrogator device. That is, the phone, acting as an interrogator, can check for the presence of the dongle and the dongle, acting as an interrogator, can check for the presence of the phone. Accordingly, the dongle, as well as both the phone and the dongle, can sound an alarm when the pair is separated. Such alarms can be generated when the separation is as little as 30 feet when Bluetooth is used as the communications means.

It is desirable to provide technology to intelligently perform the interrogations without creating false alarms (e.g., warnings that the paired devices have separated or can no longer communicate when the user doesn't care or need to know of such occurrences.) For instance, users who tether their phone to their keychain may inconvenience co-workers at an office if they keep their phone on their person but leave their keys in a coat pocket that stays in their cubicle when they go to meetings. The key chain dongle will sound an alarm each time the user leaves the vicinity. The solution to this problem of false alarms is an "intelligent tether".

Figure 14:
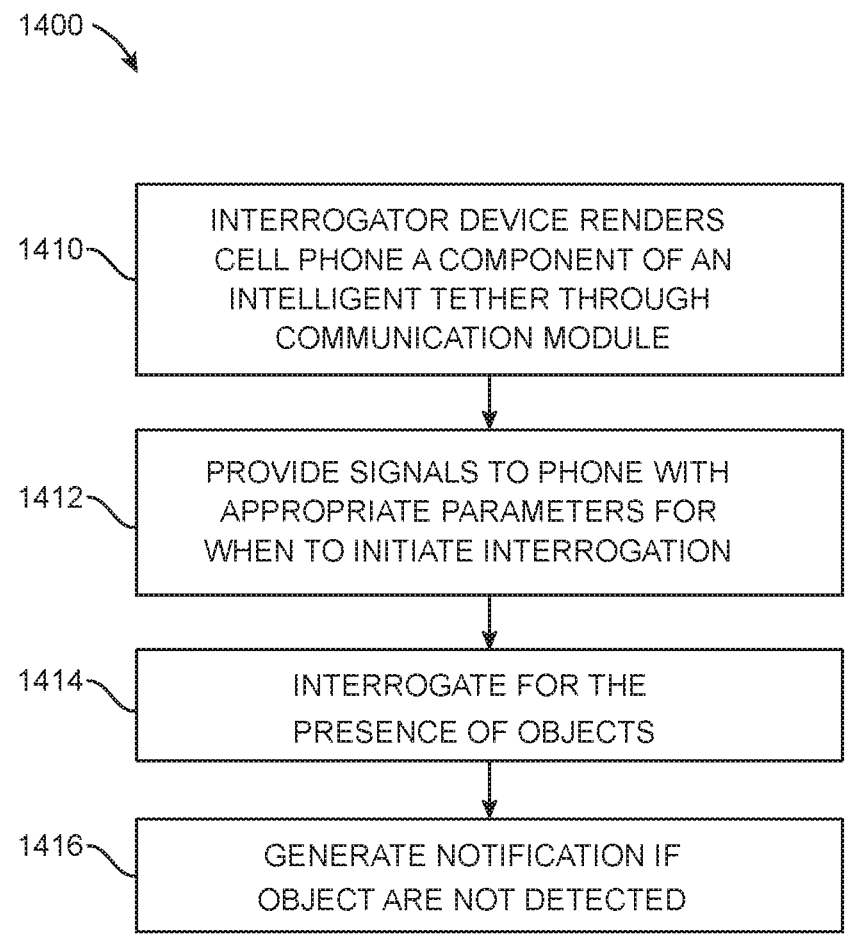
FIG. 14 is a flow chart of a procedure for performing intelligent tethering according to the illustrative embodiment.

A flowchart is shown in FIG. 14, detailing a procedure 1400 for performing intelligent tethering. The interrogator device technology described herein can be applied to make a cell phone into a component of such an effective intelligent tether at step 1410. A cell phone typically already has Bluetooth capability and components that generate alerts. It is advantageous to provide signals to the phone at step 1412, suggesting the appropriate parameters during which to initiate interrogations for paired objects the user wishes to keep close by. Step 1414 can be executed by an interrogator application that is resident on the user's cellphone. For example, appropriate date, time or location parameters for initiating interrogation. Unfortunately, such a phone-based interrogator device cannot practically check for the presence of itself but it can assure the user that wallets, PCs, eyeglass cases or purses are nearby. On the other hand, a dongle that performed as a portable interrogator device can also serve as one end of an intelligent virtual tether system that can keep two or more tracked objects (including the dongle) together as a set.

The signals for such intelligent interrogations that would minimize false alarms can come from a number of sensors that can communicate with the phone or portable dongle. GPS data from the phone or the dongle, for instance, can inform the interrogator devices in the system that the user was leaving a house or office, a point in time when it can be natural to collect all of one's important objects. At step 1414 interrogator devices can check for the presence of each other and other tracked devices. Another signal can come from a Bluetooth device in the vicinity. For instance, a wall socket-based interrogator can emit a steady Bluetooth signal just for the purpose of notifying one or more of the interrogator devices that it was now located in a certain room in a building. Or one or more of the interrogator devices can be paired with a naturally occurring Bluetooth signal originating from such a location or alternatively, a unique combination of Wi-Fi signals that only occurred in a specific location can be used as the instigating signal when such signal was sensed by one or more interrogator devices in the system.

Or a phone can sense that it was recharging and at that point reach out and look for paired objects via an interrogation, as such charging locations can represent logical places from which to perform interrogations. Thereafter, notifications can be generated at procedure step 1416, according to techniques described herein, if objects are not detected.

B. Interrogator Device Integrated as a Key Fob

The interrogator device can be implemented and integrated into the car fob, the small accessory offered by car manufacturers that can perform many functions such as: lock and unlock car doors, start the engine, etc. In this embodiment, when the user presses the fob button to open the door lock, the interrogator device's Bluetooth circuit can be activated and look for the phone and other devices. Such a system is passive as the user doesn't have to remember to do anything in addition to the normal behavior of opening the car door. But it has the drawback of not being useful if the car is not locked (and thus not in need of the lock being opened with the FOB).

To rectify that last issue, an alternative key-based implementation can have a fob connected to a key in such a way that can detect that the key was being used. Such a system can use a capacitive sensor that can read the unique capacitive load when the key is in the keyhole. Another retrofit approach can be to use a sheath. When the key was unsheathed, it can trigger the interrogation.

If the car has its own Bluetooth circuit that is activated when the car is started, the fob can be paired to that, as well as the phone. If the fob senses it was close to or in the car, by virtue of detecting the car's Bluetooth signal, it can interrogate for the presence of the phone.

Another implementation of the technology for a fob-based interrogation device can include the addition of an accelerometer to the fob. The microprocessor in the interrogation device's circuit can read data from the accelerometer and can detect the data signature created when the car is in motion. Such signature would include the rhythmic motion of the fob as it dangles from the steering wheel when the car was moving. When such a signature was detected, the interrogative function can begin. The fob can be trained to understand what motions represented car motion by having the owner press a button during such a period of motion.

C. The Portable Interrogation Device

The Portable Interrogation Device (PID) is equivalent to a battery-powered, and thus portable, interrogator device that can be attached to a backpack, pocketbook, or computer bag or other similar object that might carry a user's tracked objects. Preferably it can be built in the form of a dongle that can be attached to the outside of such a bag. It can be able to use its Bluetooth circuit to look for other Bluetooth objects with which it had been paired with such object likely to be carried in the bag. Its alert mechanism can preferably be sound-based, although light, vibration and other alert mechanisms can be used, as well. The device can come with a strap allowing it to dangle on the outside of the bag thus allowing for clearer alerts. If mounted on the bottom of the bag, the vibrator can make an audible sound on a table or other hard surface.

The key to a useful PID is a sensing mechanism to inform the interrogator that the bag is moving and is in some sort of "trip" mode, where a trip would be movements larger than merely walking across a room or office with the PID or moving it off a table, for instance. One such means can be the inclusion of an accelerometer circuit. The accelerometer can detect when the PID was being moved and thereby instigate an interrogation for paired objects at that time. A software filter can be applied against the accelerometer data to ascertain whether the movements seemed to indicate a trip was beginning.

In one embodiment of the vehicle interrogator device, the user does not have to necessarily manually turn off the alarm if a device is missing. This is because the alarm can be programmed to turn off after a short period of time and not sound again until the next time the car was started. The PID, on the other hand, can usefully employ an alarm "Off" button. This is due to the fact that if a paired object is missing, and it is not possible or there was no need to get it, then the alarm can keep going off each time the bag was moved. A parameter can be set, however, that would turn off the alarm for a certain time period when the alarm-off button was pressed. Alternatively, instead of turning the alarm function back on after a certain period of time, the alarm function can be set (via an interface or by programming of the interrogator via another connected device) to turn back on again after the PID had been at rest for a certain period of time. Such ending of a "resting period" would indicate that a new "trip" had begun and a new interrogation should begin. Alternatively, GPS data collected by the PID can be used to ascertain whether the user is actually starting a new trip Multiple sensing means can be used to instigate the interrogation.

Some users may not have an available cigarette lighter port through which to power a vehicle interrogator device. In this situation, the interrogation function can be handled by a PID, which can function as a vehicle interrogator device. Such PID can be mounted on the dashboard or other convenient location. It can use initial vehicle motion as sensed by an accelerometer as a trigger to start the interrogation.

One embodiment of such an accelerometer-based vehicle interrogator device can employ a software algorithm that can perform interrogations only after the vehicle had been at rest for a specified time period. Using such a time interval can it make it more likely that the initial motion sensed corresponded to the beginning of a new trip for which object presence-checking was required. This can reduce repeated interrogations alarms generated each time the vehicle started and stopped. Such mid-trip interrogations can have little user-value if they just continued to repeat the same alert status.

D. Intelligent Tethering

Under the Intelligent Tethering concept, the PID does not interrogate while known signals are present. These known signals can include a house Wi-Fi signal or Bluetooth signals in an office. Thus, a user whose phone was tethered to a PID need not keep the two devices together when in a home or office, where one or both of the two devices could detect familiar local signals. Once such a signal was recognized, either device could turn off the tethering.

When the user departs from the office or house, however, the PID (or the other device if it were a two-way tether) immediately knows of that departure by virtue of the known signals being lost. The PID or other elements of the tether thus monitors for the paired device(s).

The recognition of missing known signals is faster than if GPS signals are used to signify that a trip had started. Further, employing known signals is applicable in situations such as in a large building where GPS signals do not penetrate. This method also is applicable once the user moves a short distance, such as 30 feet, from a Bluetooth signal—resolution that not all GPS systems have. The battery drain on constantly checking GPS locations can be a major concern, as well.

E. Forms of Alerts

When a trip first starts, be it a vehicle trip or moving a backpack, the interrogator device, be it a PID or vehicle interrogator device, will perform an interrogation. It can then produce an alert if all tracked objects are not present and an affirmative tone if such objects are present (and such affirmative tones are desired).

Despite the undesirability of repeating alarms or affirmative tones, there can be utility in alerting a user to a change in the "present" state. Following the initial interrogation, then, the interrogator device will continue to monitor the Bluetooth signal or signals from present objects. If any of these signals goes away during the course of the trip an alert will sound—one possibly different from the "Not Present" alert. Such an alert can signify that the object had been present but is not now. The user can assume that the battery for the object has gone dead, although other reasons can account for the change in status such as the fact that the user had turned off the Bluetooth function.

F. Baby Car Seat Alarm

Unfortunately each year a number of babies die in automobiles because they were inadvertently left in cars. The technology described herein can be applied to address this problem using "Baby Seat Positive Separation" (BSPS) technology.

Figure 15:
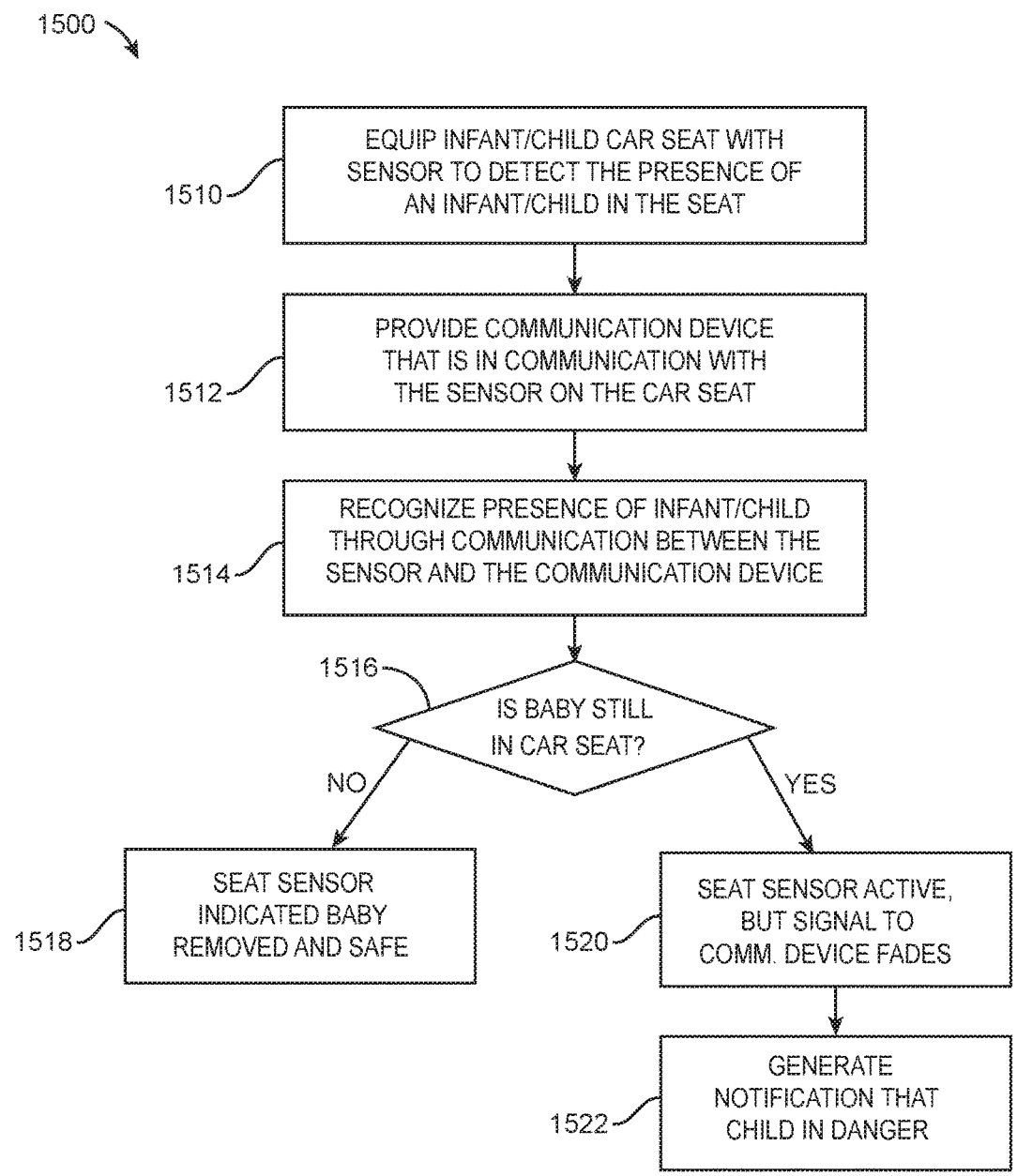
FIG. 15 is a flow chart of a procedure for implementing a Baby Seat Positive Separation (BSPS) system, according to the illustrative embodiment.

Reference is now made to FIG. 15 showing a flow chart of a procedure 1500 for implementing a BSPS system. To implement a BSPS system, baby seats are equipped with the BSPS technology at step 1510 and include a Bluetooth enabled sensor that detects the presence of a baby in the baby seat. For example, the manufacturer can build-in a circuit that could detect that the seatbelt was closed. Further, a sensor that detects weight in the seat or the capacitive load of a baby can also be used. Those methods are subject to false positives, however, if something else (like groceries) was placed in the seat or if the capacitive load could not be detected due to, for example, heavy clothing separating the baby from the sensor. Such false positives are reduced using a seat belt-based system. An exemplary sensor, whether it OEM-supplied or added to an existing baby seat, can be battery powered, solar-powered, or powered via a hardwired connection to the car's power system, according to the various illustrative embodiments.

In addition to the sensor, the other major component of a BSPS system is a communication device, such as a phone, which is provided at step 1512 and paired to the Bluetooth enabled sensor in the car seat. An application on the phone manages the BSPS system in an illustrative embodiment. When the sensor senses the presence of a baby in the seat at step 1514, the Bluetooth signaling commences and the phone recognizes the signal and determine that the seat is occupied.

The separation monitoring technique is similar to that described hereinabove for a hotel wall charger. The procedure 1500 continues to monitor the sensor at step 1516 to determine if the baby is still in the car seat. If the seat sensor detects that the baby has been removed at step 1518, the Bluetooth signal is abruptly cut off and the phone application determines that the baby has been removed. This indicates that the baby is safe and there is no need to generate a notification. However, if the baby is not present, at step 1520 the seat Bluetooth signal fades out gradually, it indicates that the user has walked away from the car, leaving the baby behind. Accordingly, appropriate notifications can be generated by the communication device at step 1522.

In further embodiments, a battery operated or continuously powered baby seat communicates to the phone via Bluetooth when the baby is removed, as indicated by the sensor. Thus, in this scenario, if the phone lost the Bluetooth signal, without having received a previous "baby removed" signal, then it is clear that the user has walked away from the car leaving the baby behind. Accordingly, appropriate notifications can be generated.

If the vehicle is equipped with CIOD or CIMS technology as described herein, the BSPS system allows the phone to lose the Bluetooth connection with the baby seat without generating an alarm if the car is running. This lack of an alarm would be desirable in those situations where the baby was loaded in the car first while the parent was gathering other items for the trip.

Another method for suppressing the alarm in such a scenario would use the GPS data from the user's phone. If the phone's GPS showed that the trip had not started yet, no alarm would sound if the phone lost the baby seat signal. By the same token, if the trip had ended, some leeway can be afforded before an alert is generated.

In the case where a trip had commenced, the alarm might still be suppressed if the user does not go a measured distance from the vehicle. Moreover, time measurements can be used to suppress the alarm. The application would note the time that the baby seat signal was lost. If the parent's phone did not reconnect with that signal within a certain amount of time, then an alarm might sound. Such timing information could be used in conjunction could be distance to produce a suppression algorithm utilizing both parameters.

A baby seat employing both a seat-belt-closed sensor and a baby-present sensor (for instance using weight) could offer the added benefit of sounding an alarm if the baby was present but the seatbelt was not fastened.

G. Home Automation Connection

Many homes are outfitted with various levels of automated smart controllers including thermostats, lighting systems, security systems, to name a few. Many of these automated devices have connectivity into the user's home computer network or the broader network. Signals and alerts generated from the interrogator can be sent directly to these systems to trigger object or time based actions. Via the Bluetooth (or Wi-Fi) connectivity an interrogator can send an alert at the time of arrival at home to a smart thermostat to turn the temperature to the desired setting. (Note that while this description is written for the home environment, one of skill in the art could implement this invention in an office or industrial environment.) Other object/events that can trigger messages include:

Starting the car engine (as described in the Vehicle Embodiment) can indicate the user is planning to leave the house and send alerts to set thermostat at the "away" temperature for energy savings, set lights to the "away" default setting, and arm the security system. These alerts could be sent directly to the thermostat in one embodiment. In another embodiment, the alerts could be sent to the users cell phone (or tablet, iPod, smart watch, IOT device, etc.) to be analyzed (and perhaps request input from the user regarding the action to be taken), and then the instructions sent to the thermostat. In another embodiment, the cell phone could be replaced with a server somewhere in the network (cloud server, home computer, security system computer, etc.).

Turning the car off and opening the door can send the lights on message for the walkway or other appropriate lighting for the user's arrival.

By putting a tag on a bag of luggage or on a set of skis, for example, the interrogator could then determine that the luggage or skis were put in the car, and notify the thermostat that the user is leaving for a while and thus the thermostat should be set in "Away" mode. In a more complicated embodiment, a query could be sent to the user's cell phone, requesting that the user enter the expected time of return so that the thermostat could signal the HVAC system to start warming the house before the user actually arrived.

In this last embodiment, the movement of a tag is used to notify a household system that an activity is about to occur. For instance, the movement of a tag attached to a piece of luggage or a set of skis, while pulling such items out of storage, indicates that the user will be leaving the house for an extended period of time. When leaving the house for a vacation or for a long time, a number of settings in the house are typically changed, and a number of activities are typically required. When leaving the house, the thermostat needs to be turned down, the house locked, the security system turned on, the lighting system set to automatically turn on for the evening hours, the US Mail needs to be notified to hold the mail, the newspaper needs to be stopped, the pet sitter needs to be notified to take care of the animals, and the user needs a list of items to load into his luggage (such as the passport, medicines, tickets, cell phone, etc.).

Human beings do a poor job of remembering to perform every task without forgetting something, but a computer is designed to make sure that everything is found in a list. With sensors and communications, a processor can make sure that every step and item is in the proper place for a vacation.

The basic architecture of this system includes a tag with a network interface, and the household system. The architecture could also include a cell phone, a PDA, or a computer. The network could be a Bluetooth network (standard or BLE), a Wi-Fi network, or any other wireless network. The household system could include a smart thermostat system (such as a Google NEST, an EcoBee, or a Honeywell Smart Thermostat device), a smart HVAC system, a security system, a lighting system or any other system.

In the simplest embodiment, a tag is attached to a piece of luggage. The tag would communicate with a NEST thermostat over BLE when the tag moves. The tag would have an accelerometer to determine that the tag is moved. When the tag moves, the tag sends a message that tells the NEST to go into a vacation setting.

The tags, or tracked objects, could incorporate a Bluetooth chip with a processor, such as the PSOC system on a chip by Cypress Semiconductor. This PSOC processor could communicate its presence to the interrogator, such as a cell phone, over a Bluetooth protocol. The tag could also include an accelerometer to determine that the tag has moved. Or the tag could include GPS or IPS functionality to track changes in movement. The accelerometer or GPS/IPS functionality could be electrically connected to the PSOC chip, and the values from these chips could be polled or could be used to wake up the PSOC chip when movement occurs. The tag would also include adhesive, tape, zip tie, or other means for mechanically attaching the tag to the tracked object. The tracked object could be a piece of luggage, skis, scuba equipment, a boat, or any number of other items that would indicate that the user is planning a vacation or on leaving for an extended period of time.

There are a number of methods of determining that the tag has moved. The tag itself could determine movement by checking the movement of an internal accelerometer against a noise threshold. This noise threshold is to avoid false alerts due to normal movement of the house or the shuffling of items in a storage area. Preferably, the system would learn or know beforehand the characteristic movements of a tag attached to a suitcase as the suitcase was opened and laid down to be filled. Alternately, the tag could include GPS/IPS functionality that provides the chip with the location of the tag. When the location values change, the tag knows that it has moved.

Another method of determining movement by the tag involves the tag looking at the network devices that are visible on the network, and after a few days of monitoring the devices, determining which network devices/addresses do not move. Then the tag could monitor the RSSI signal strength of those devices/addresses for differences. In a Wi-Fi network, this could be done to measure the RSSI levels to the switch or router. Alternatively, a time-of-flight algorithm could be used to see if the tag has moved. Or the tag could simply monitor the presence of the typical array of devices that it sees, and assume that the tag has moved if one or two of the devices are no longer visible.

Alternatively, the automotive interrogator described above could determine that the luggage tag was put into a car by determining the presence of the tag, thus making the determination that the tag has moved because it is now in the car.

The movement of the tag can also be determined by the household system. For instance, a thermostat system with a Bluetooth interface could monitor the presence of the tag, and determine its movement if the status of its presence changes (it was not visible on the network and suddenly becomes visible, or if it was visible and suddenly is not visible). The thermostat system could also use RSSI or time-of-flight methodologies to determine if the tag has moved. The advantage of using the household system is that it is typically located in a fixed location.

While not fixed, the user's cell phone (or other mobile device, or a computer) could also be used to determine if the tag has moved using presence, RSSI, or time-of-flight. In each case, the user's phone needs to know it is in a fixed location, either through GPS/IPS functionality, knowledge that if it is charging it is always at the same location, or through some other method.

In one embodiment, when the tag is moved, the user's cell phone is notified through a network message. This message may include a time that the tag was last moved. The cell phone could save the last time the tag was moved, and if a message from the tag arrives with a time that is different from the stored time, the phone determines that the tag has moved.

Or an application on a cell phone monitoring the movement of the luggage tag could determine the location of the tag itself. The application could store the location of the luggage, either with a GPS/IPS system or by using RSSI signal strength readings or time of flight readings for network messages. Once the application stores the location of the luggage, then it compares the location each time it sees the luggage tag on the network. If the location is different, then the application determines that the luggage has moved.

When movement is determined, the user could then be prompted through a user interface associated with the system's cellphone application. These prompts could include questions concerning when the user is leaving, how long the user plans to be away from the house and/or what temperature to set the house during the absence. The responses to these questions are then sent to a thermostat in the house either immediately or at the time specified for departure by the user. Other parameters for the security system and the lighting system could also be queried and sent to the systems. In all cases, either the application or the home automation device itself could interpret the user's input and generate the corresponding command for the devices such as a thermostat.

The application could also be in communication with an app related to the thermostat or security system. For instance, the application could find the app for a NEST thermostat, and communicate with the NEST application instructions to adjust the temperature based on whether the user is leaving or arriving. The user could also be prompted for confirmation of the temperate setback (and perhaps other parameters, such as return time and how low to set the temperature) before sending the information to the NEST app.

In addition, the user interface could provide the user with a check list of all the items needed for traveling, perhaps with a specific list of items needed to pack the tagged suitcase (swimsuit, toiletries, shirts, etc.) and another list of other items. Such a checklist might have previously been input by the user, perhaps with suggestions from the application, and might be modified to reflect the type of trip being taken as interpreted by the application with data obtained from the user's calendar program. In addition, the interface might present to the user several different lists, for instance, one for items to pack for a trip to the vacation house in winter, one for summer, and third for a visit to the in-laws. The user might then select which list to work off of. The calendar data might also contain information concerning tagged items to be taken on a trip as described below. This checklist could appear on the screen immediately or could be added to a calendar program for display at a set time or at multiple times. This check list could include physical items to include in the car at the time of departure. The application could check for the presence of these items directly if they are tagged. Alternatively, the user could manually check the items on the list through the user interface. Other items, such as messages to the pet sitter and the US Post Office, could be sent directly from the application using email, SMS, or phone call messages.

In another embodiment, the cell phone could be replaced with an Amazon Alexa or similar device. When the Alexa senses or is notified that the user is preparing to travel, the Alexa may prompt the user for details of the departure. Will the user be gone for a few hours or for many days? If leaving for a few hours, the user may be prompted to see if he has his phone, wallet, and car keys. If leaving for a longer period, the user may be reminded of additional items, and may be asked if the mail should be stopped, the temperature reduced, and the alarm system set to an "away" mode.

H. Automobile as Interrogator

A Bluetooth-equipped automobile can function as the interrogator by interfacing with the Bringrr app-equipped smartphone. This embodiment eliminates the need for a standalone automobile interface. Said elimination is desirable because it reduces the cost and physical footprint of the Bringrr suite.

After a Bluetooth-enabled smartphone has been paired with an automobile's Bluetooth system, an automatic connection is created whenever the smartphone is sufficiently close to the Bluetooth receiver. This level of proximity is understood to signal the user's presence within the car, and may trigger any of the previously described automobile functions of the device. For instance, pairing to the automobile may cause the smartphone to search for a predetermined set of Bringrr-tagged objects. This set may be determined manually or through an automatic learning process. Additionally, the set may be loaded from the Bringrr calendar function, in which the user saves a set of items which is to be present on a specific day, every weekday, or any other combination of time periods.

The ability to connect multiple phones to the automobile is highly desirable. In the case in which multiple drivers make use of the same vehicle, the drivers follow the ordinary set-up procedure for each phone and may proceed as previously described, provided there is only one Bringrr user in the car.

The Bringrr application can also accommodate several users in the same automobile, albeit with an added layer of complexity to accommodate limitations of the Bluetooth protocol. Typically, automobile-to-smartphone connections are limited to one device at a time. It is, however, conceivable that multiple users would use Bringrr functionality in the same vehicle, for example in a carpool scenario. In the case of multiple users, the first device to come into range pairs with the automobile. Each following device then pairs with the initial device as an interrogator. The initial device signals the ensuing devices to enter automobile mode. Once in automobile mode, the devices perform their programmed functions as if they were tethered to the automobile.

V. Dongle Embodiment

An interrogator device can offer the ability to look for additional items besides phones or other already-enabled Bluetooth devices through the use of dongles—small Bluetooth devices that can be attached to other objects. Related interrogation methods are also discussed below.

A. PC Dongle as a Tracked Device

The PC dongle can persistently reside in the USB port or a similar port, of a computer be it a notebook, desktop, netbook, tablet or other portable, USB-equipped computer device. The Dongle system resembles the system shown in FIG. 12, but includes a dongle attached to the computer (not shown) To accommodate such a dongle-equipped portable device being put into a carrying bag, the design of the dongle can be as flat as possible. Specifically, the dongle can bend sideways after exiting the USB port so that the dongle extended as little as possible from the side of the computer.

The first function of such a dongle can be to allow the computer, if portable, to be monitored by an interrogator device. Thus, if the user wanted to bring a notebook along on a commute each day, the interrogator device can search for this device upon starting the car. The dongle, therefore, needs to be battery-powered in order to provide a continuous Bluetooth signal when the computer is off. The battery can be recharged via the USB port when the computer is on.

In many ways, the PC Dongle can also function in a manner similar to a vehicle interrogator device and monitor for the presence of tracked objects. To instigate such an interrogation, the dongle it can look for the presence of the user as indicated by the use of the computing device to which the dongle is attached. Such presence can by the fact that power is going to the USB port, indicating the PC was in a working state, or getting signals from software on the PC indicating that at the unit was being used at the time (see below for software details). Such an interrogation function might be easier done using the Bluetooth-equipped computer itself, however.

B. Positive Separation

A user may have a stationary computing device, such as a desktop PC, with PC interrogator software installed that ensured a paired cell phone was always nearby when the computer was being used (as determined, for instance, by the software's monitoring of the keyboard and mouse input). When the user left such a workstation for the day, however, it can be advantageous to be sure that the cell phone, and other tracked devices were taken.

With a PC dongle installed on the stationary computing device such a scenario can occur. When that computer is turned off at the end of the day, the PC dongle can sense that the computer has been powered down, as described below. The user is then expected to leave the area where the computing device is located and take any tracked devices at that time. Such removal, the Positive Separation (or PS), should occur within a pre-defined and appropriate time interval, the Positive Separation Time (or PST).

Bluetooth signals that the now-battery-operated dongle had been previously receiving from near-by tracked devices such as a cell phone should start to change and eventually diminish upon the beginning of PS. Alternatively, such attenuation-of-signal information can be supplemented or supplanted by information from the cell phone, whose accelerometer, working in conjunction with background software, can produce data indicating that the phone was in motion and thus likely to be in the process of being taken away by the user.

The battery-operated PC dongle can be able to sense that the power had gone off on the PC to which it was connected by reading voltage levels in the USB port if these typically changed when the computer powered down or went into sleep mode. Alternatively, there can be resident software on the machine that continuously communicated with the dongle letting the dongle know that the machine was still operating. When this software ceased to operate and send such communications upon shutdown, the dongle can then know that the computer had been turned off. This moment when the PC is turned off is the beginning of the PST.

If PS was not detected within the PST time period, then the PC dongle can sound an alarm before the user walked too far away. In this scenario, the dongle can need to be equipped with a sound-emitting component. In the preferred embodiment, however, the phone itself, using software that communicated with the PC Dongle, can sound such an alert with the notification means it already had.

In an alternative to the use of a PC Dongle to sense power-down and PS, the computing device itself can be programmed to offer Delayed Shutoff (DS). With DS, the user would power down the computer or put it to sleep, however, the computing device would continue to operate long enough after such shut-down command to monitor for PS using it interrogation capabilities. If indications of PS were not discerned during the PST, an alarm would follow at the end of the PST.

A vehicle-implemented interrogator device can also be advantageously equipped to monitor PS. Such a system can ensure that the user took paired phones and other objects when leaving the vehicle. Similarly, the wall-socket device can be equipped with similar functionality.

Each of these two interrogator device forms can have unique sensing means for determining the beginning of the PST at which time it can then check for diminishing Bluetooth signals or accelerometer data indicating movement away from the interrogator device and thus PS. In the case of the vehicle implementation, the signal can be when the engine was turned off. In the case of the wall socket device, the beginning of the PST can be indicated by the user leaving the room, perhaps indicated by a motion sensor, or the shutting off of an appliance connected to the wall-socket device as indicated by the cessation of power flowing to the connected device.

C. Wallet Dongle

A wallet dongle can be a battery-powered, credit card-sized, Bluetooth-equipped device that can fit into a wallet. The simple version can emit a periodic Bluetooth signal and be paired with, and used with a vehicle interrogation device, or other interrogation systems described herein, to ensure the wallet is present when needed and taken when needed. For example, a wallet dongle resembles the personal item 850 of FIG. 8 which conveniently fits in a wallet for tacking and other purposes.

A more sophisticated version can have a mechanical clip built-in into which a credit card can slip. If the credit card is removed, an electrical switch can be allowed to close alerting the microprocessor on the dongle to the fact that the credit card had just been removed. The dongle can then use a timing circuit to wait for the credit card to be reinserted. If the card is not returned within a certain time period, an alert can be given to the user. Alternatives to a mechanical switch could include a magnetic sensor on the dongle that can detect a magnetic element placed on the credit card, or a set of contacts on the dongle that can inter-connect with conductive material placed on the credit card to form a circuit, or a capacitive sensor on the dongle that can detect the capacitance of an element of the credit card.

Such alerts can take the form of audio from a sound-generating component of the dongle such as a speaker or transducer and/or via vibrations generated by the dongle that can be felt by the user through the wallet. The user, however, might not perceive these alerts if the dongle was in the wallet and the wallet suppressed the sound or vibration. To address such issues, the data concerning the missing credit card can be relayed to the cell phone via the Bluetooth connection built into the wallet dongle. The cell phone can then issue an alert to the user that the credit card was missing using the notification systems already built into the phone.

The phone-to-dongle communication channel can also be used to program the dongle. For instance, using the robust interface on the cell phone, the parameter controlling the elapsed time required before sounding an alarm is issued can be set. All such parameters can also be set with the use of buttons or other interface devices on the dongle itself.

The wallet dongle can have a connector allowing the internal battery to be recharged and one or more LEDs or other visual indicators to show the power level of the battery.

The dongle's battery can have a secondary purpose of being used as emergency power for the user's cell phone or other portable device. To do so, the dongle system can have a short connecting cable that can be used to connect the dongle's battery to the phone's recharging port. Such connector can snap into a recess built into the dongle thus minimizing an any extra thickness attributed to the connecting cable and allowing the connecting cable to be comfortably carried on the user's person at all times.

Additionally, the wallet dongle can be combined with the power-me-up technology described herein to request power when near a Bluetooth charger. In this manner, it provides a power boost for the phone in the wallet while further ensuring that a wallet is not inadvertently left behind. Thus, the battery of the dongle can be used in an emergency for a phone or other similar object.

D. Voltage Pump

The wallet dongle can be programmed to reserve power to be used for emergency phone recharging. For instance, if the dongle's battery held a maximum of 1200 milli-amp hours of power the user can have the ability, via the interface described above, to specify that the Bluetooth interrogation feature will cease when the battery level drops to 300 milli-amp hours thus ensuring that there is always some power left for emergency purposes.

E. Dongle Battery Management

Dongles can suffer from the inevitable need to recharge the battery periodically unless they reside in a power port, such as the PC Dongle described above. The Wallet Dongle can have the ability, however, to communicate its power needs to the user via its built-in Bluetooth functionality. To do so, the user can set a threshold level of battery charge, which when reached, can cause the dongle to communicate its charge level to an interrogator, cell phone, or PC to which it has been paired. Such device can then alert the user to the battery charge level via an alarm, notification, or alert.

Alternatively, such interrogator, cell phone, or PC can deduce an approximate charge level by keeping track of the history of communications that have been emitted by the device over time and considering the power needed for such communications. Upon computing such estimated charge level, the device monitoring the dongle can alert the user as described above when the approximated battery level reaches a predetermined level.

Despite the ability of a dongle to communicate its power needs, it can be desirable to extend the battery life if doing so would not adversely affect the functioning of the dongle. The dongle, therefore, can be programmed to send out only intermittent Bluetooth signals, going into a low-power state between signals, and thereby conserve battery power.

The spacing of such signals, however, might result in the user traveling some distance before the vehicle interrogator device produced notification of a missing tracked object. The time period between Bluetooth signals, however, can be controlled by the user via an interface on another device that communicated with the dongle or via buttons or other interface means on the dongle itself. Such means would allow the user to make the tradeoff between the speed of missing-device notification and the frequency with which the dongle's battery has to be recharged. Such an interface can also be used to set the threshold battery level described above.

The dongle can also be programmed such that the rate of pinging is a function of battery level. Thus, the lower the battery charge is, the less frequent is the communication between the dongle and the interrogator unit, thus preserving battery life until a recharge can occur.

The dongle circuit can include a clock, and preferably a calendar, and can be programmed to reduce or stop its generation of Bluetooth signals at certain times of day or on certain days in order to preserve its battery. Such programming and calibration of the clock can best be done on the user's cell phone using special software on the phone and a Bluetooth connection to the dongle.

The dongle can also have a GPS circuit, or more practically, obtain GPS data from the user's cell phone. With such data, the wallet dongle can know if it was at home or at the office—places where a lost wallet can be very unlikely—or traveling at vehicle speed during which the devices would be unlikely to be separated. If the dongle is at either of these locations, or other "safe" locations, or in a vehicle, it can go into a low battery-use mode reducing or ceasing its Bluetooth pinging frequency and waiting for a signal to return to normal operation. In addition, the dongle, if it were running low on battery power, can relay such information to a paired device and such device can provide notification to the user.

F. Time-Based Dongle

For instance a user might wish to ensure that a passport was taken on a trip. In this scenario the dongle is paired with the item that needed to travel. The user utilizes an application, such as a phone application or other web-based application, to program in a trigger event. For example, the fact that on a certain date (and possibly after a specific time on that date) a certain item needed to be added to the interrogator device tracked item list. The user's cellphone with Bluetooth and with the phone application can also be used as the interrogator device.

When the trigger event occurs (i.e. travel day arrives), and the Bluetooth connection between the phone and the interrogator device is established (signifying that the user is proximate the vehicle) either the phone (acting as the interrogator device) or interrogator device monitors for a Bluetooth signal from the dongle and alert the user if not found.

Likewise, the system (including the interrogator device, a phone, and other objects being tracked and monitored) can function in a "reverse" manner. As described herein, according to "Positive Separation" embodiments, the system ensures that the item being tracked by the dongle is not proximate the vehicle at the end of the trip. This prevents an item from being inadvertently left behind.

To ensure that a tracked item (other than the phone) leaves the car a tether approach can be employed. That is, the phone can institute a tether with a dongle that is interrogated upon the trigger event of losing the interrogator device signal. If the phone does not detect the interrogator device it determines the interrogator device is not proximate the vehicle. Accordingly, the signal of the dongle remains detectable if the item is also removed from the car. Thus, if no signal is continually received upon loss of the signal from the interrogator device, the phone is constructed and arranged to generate a notification, such as an alert or alarm.

This is applicable, for example, when the tracking of a dongle is temporary in nature. If it is a permanent tracking then the phone and dongle can form a permanent tether. But instances where there is a time-based need to track a dongle, the time-based alert from the interrogator device verifies that the item is proximate the car. And the positive separation tether verifies the item is not proximate the car and thus has exited the vehicle. Such a tether can be programmed to last for a variable length of time, or be active within specific GPS-defined areas, or areas defined by other radio signals such as Wi-Fi signals.

VI. PIP (Phone in Place) Operation

An interrogator device that is already paired with a phone, and which already contains Bluetooth technology, can readily perform the function of a hands-free unit by building in a speaker and appropriate interface buttons and software. As such, an interrogator device hands-free unit, working in conjunction with application software on the paired phone, can be used to reduce the frequency with which a phone needs to be retrieved from a pocket or purse. Such software on the handset, working in conjunction with an interrogator can be called PIP (Phone in Place).

The basic interrogation system uses sensor-based input to determine that a user is in the car and getting set to drive, and then instigates a search for the Bluetooth signal of the paired phone. PIP software, resident on the handset, however, can conversely detect the new presence of the interrogator device Bluetooth signal and can receive a signal from the interrogator that the car started. The PIP software can then use the knowledge that the user was now in the car and about to start driving in order to modify how the paired phone behaved. Such modified behavior can lead to safer driving by reducing the amount of direct physical interaction with the phone. That is, certain activities can be curtailed, some added, and others done differently.

Note, that some cars have built-in Bluetooth technology to power hands-free capabilities and some cars can have hands-free units with persistent Bluetooth signals or signals that are activated upon the car being turned on. In both cases, the PIP-enabled handset can use the initial detection of such Bluetooth signals to invoke the use of the PIP functions described below.

A. PIP Notifications

Upon learning that the user was in a driving state, the PIP software can proceed to filter its normal notifications (of phone calls, text messages, voicemails, and notifications generated by phone applications such as weather alerts) to the user according to rules previously established by such user. For instance, the user can program the PIP software to only notify the user of a SMS text message or MMS message if it was from a particular set of senders. Similarly, voice calls and email notifications can be screened in the same manner.

Key words and phrases, or semantic analysis that can infer meanings similar to keywords or phrases, can also be used to filter incoming text messages. Voicemails can be transcribed using voice recognition software and analyzed for key words and phrases in the same manner. If certain key words or phrases are present then notifications can be generated.

When a message (SMS, MMS, voice call, voicemail, or app notification) is screened the notification can be eliminated or done in a manner that conveys information to the user. For instance, text messages from family members could generate a specific type of sound on the hands-free device. With such information, the user can make a decision in real-time whether to deal with the message then or later.

In addition to tones and sounds, text-to-speech technology can be employed to announce, for instance, who is calling if the caller is not on a previously set up white list. Stored or streamed audio files, for instance of the calling party's name, can also provide the information that the user might need in order to decide whether to take the call.

Often when a user starts a trip, notifications that are already on the phone may have been forgotten or not attended to in the rush to get out the door. Therefore, the PIP software can also be configured by the user to announce, at the appropriate time relative to the start of the trip, the presence of these notifications on the phone. Thus, a user may rush out and drive off to a meeting forgetting that there are several unviewed Missed Calls. The PIP software can generate special tones for these and other types of notifications (be they un-listened-to voicemails, weather alerts, or new Facebook posting) and/or can use well-known text-to-speech technology to produce audio renditions of such notifications.

The PIP software can also be configured to allow the original notifications to be left in place on the phone's UI (for Missed Calls, for instance) or to have them be deleted under the assumption that the notifications have served their purpose having been delivered to the user in audio form.

In addition to bringing the user up to date regarding the status of notifications, the PIP software can also advise the user as to what state their phone is in. Thus, if the phone was in vibrate mode, this fact could be communicated to the user via audio signals or a verbal announcement.

In addition to just announcing the state of such phone settings to the user, the PIP software can be configured to have the phone's settings change each time the user is in the vehicle as indicated by the phone's detection of the car's Bluetooth signal (be it from a interrogator, an installed hands-free device, or a Bluetooth-enabled GPS system). In addition to just sensing the presence of the Bluetooth signal, more refined context-setting information can be communicated to the phone, via the Bluetooth signal for instance, specifically information that the phone has been started.

There are several ways that the phone can adapt, under user control, to the environment of the car once given unambiguous information that the phone is in such a setting. Thus the user can configure the PIP software such that when the phone has been informed that the user's car has started, the phone's volume is increased to a maximum setting and taken off vibrate mode at the beginning of each trip. In addition, the interface of the phone's visual display can become optimized for vehicle in several ways. For instance, the applications displayed on the screen can be rearranged to show those most applicable to vehicular use, such as the GPS app. The text size on the screen can be increased, as well, to allow for easier reading.

B. PIP Content Announcements

This PIP application, having received communications signals from the interrogator, has knowledge that the user is in the car and has just started the trip. This time and place information makes it probable that the user is receptive to receiving certain types of information, and therefore the PIP software can proceed to generate audio information of useful to the driver.

One such class of such information is calendar and time-based. Such a time-based application can be invoked when a user gets into a car and the interrogator device indicates the user is getting set to drive off. At a time after such indication is given to the PIP software (such time delay, if any, being programmable by the user) the phone can announce all of that day's coming appointments (based on the time of day at that moment) as noted in the phone's calendar using text-to-talk technology. Alarms, such as those commonly available with calendar software and able to be associated with specific appointments or events, can be programmed into the handset using PIP software and can be announced in audible form at the start of the trip or at predetermined times later in the trip.

Semantic technology can be applied to the text of calendar entries to discern if travel is involved, and if so, such entries can be selected for announcement, reminding the user where the vehicle should be going to next.

Other forms of content can also be conveyed in the same manner. Such content can be the sort that a user might wish to hear upon starting a trip. This can include weather, sports or other news, or a list of To-Do items applicable to that day.

The PIP software can also allow for the creation of specific content to be played at a time related to when the user starts a trip, such content's sold purpose being to be used in this playback manner. An example of such content might be reminders of things to do during the trip.

Music is another content-type that can benefit from the technology employed by PIP software. For instance, a user can set up their music playlist such that it automatically starts up where it left off when the PIP software understood that a trip was starting or resuming.

C. GPS Means to Establish Context for PIP Functionality

An alternative to using context data from an interrogator device (data that implies that the user was now in the car and beginning a trip), PIP software can deduce similar context information by analyzing GPS data obtained from the phone or another source in the car, such as a Bluetooth enabled GPS dashboard system.

For instance if GPS started to show that the phone was traveling at vehicle-like speeds, and starting from a known location from home, then PIP can assume the user had just started to drive from home. Assuming the Bluetooth connection to a hands-free unit was already established, the Calendar Announcements and other PIP functions can commence. As GPS functions can consume significant battery power, such use of the cell phone's GPS can be limited to situations where the battery charge was above a certain threshold or the cell phone was already plugged into a charger.

D. Other Context Settings

As described above in the PC and Building embodiments, other settings or locations can contain sensors or other communication modules that can establish that a user had arrived in a particular location or was beginning a specific action (such as using a PC keyboard or mouse or entering a room) and such information can be used to look for the presence of the paired phone via Bluetooth. PIP software installed on such a phone, however, can allow the phone to now behave in any of the ways described in PIP functions above.

For instance, if a student did not want to be distracted by extraneous text messages while studying at a computer, the paired phone, using PIP software, can filter text message notifications.

The non-car setting, however, might not necessarily be only a computer desk if the user was employing the wall-socket model of the device described above. For instance, in a workshop, the user might have a lamp plugged into a wall-socket device. When the user turned on the lamp, the current-draw can instigate an interrogation from the device. At that point, content programmed by PIP can begin play through speakers on the phone or device or streamed to another speaker or speaker set.

E. PC-Based PIP Software

In the embodiments described above the PIP software produced information and communicated with the user in audio form in order to reach users for whom it may have been inconvenient to look at their handset. But when PIP software is used in conjunction with software on a PC, the PC can communicate with the user in a visual manner to accomplish many of these same functions.

When using PIP software in a desktop setting with a PC involved, it is advantageous to have software on the PC that interplays with PIP software resident on the phone, such combined software being the PC-PIP software. An important component of such a PC-PIP system is a communications link established over Bluetooth between the two devices that can pass information from the phone to the PC for display on the PC.

For instance, consider the scenario whereby a user's cell phone and computer were both on a desk and such user stepped away from the desk for a period of time. During that time period a phone call comes in to the mobile phone. The user might not see the notification associated with such a call if the user came back to the desk after the phone had gone back into sleep mode. Significant time could elapse before the user had occasion to use the phone for another purpose and happened upon the notification.

Another scenario involves the situation where a user is receiving a stream of text messages and has to turn away from a PC screen to pick up the phone and view this second screen.

Problems associated with such scenarios are addressed by the PC-PIP software when the software on the phone passes the notification information to software on the PC. The PC then displays the relevant information pertaining to the notification on the PC's screen. Such display can be in the form of a pop-up that overlays on top of any other information being displayed on the screen. The user can click away the pop-up or it can go away automatically if the user starts to interact with another program on the screen indicating that the information displayed in the pop-up has been seen.

The PC-PIP system can be configured such that notifications seen on the PC's screen would no longer been seen on the phone's screen when that device was next turned on.

Such notifications passed from phone to computer can include text messages or even entire MMS messages, voicemail notifications, missed call information, weather alerts and other similar notifications that have been set up for phone consumption.

As in the vehicle embodiment described above, the user can configure the PC-PIP software such that certain types of notifications or those related to certain types or specific persons can be precluded from display on the secondary screen—the PC's screen. Such screening could keep distractions to a minimum if the user were trying to perform work on the PC.

The Bluetooth connection between phone and PC in the PC-PIP system can also be usefully employed to enhance computer security. Many users when they step away from their computer would prefer that others, whether they be children, co-workers, or spouses, not be able to use their computer. Password solutions can take time to use and can be off-putting to others who might feel offended that they are being used.

Many such password systems are based on screen savers that don't kick in until a certain amount of time has elapsed since the last user action taken at the PC (keyboard input, for instance). But such action-based timers can leave the system unprotected until the time-out is over, or leaves the user inconvenienced if the screen saver pops up while the user was working on a paper-based task before returning to the computer.

The PC-PIP system can offer PC protection in a much more fluid fashion. When the user leaves the vicinity of the PC, taking their phone and related Bluetooth signal with it, the PC-PIP software will proceed to disable the user's PC. This can be done by freezing the PC's input devices including mouse, touchpad, and keyboard. Alternatively, the screen can be frozen or the hard drive temporarily disabled. When the user's Bluetooth signal comes back into range, such proximity is noted by the PC-PIP software and all capabilities are restored.

The signal strength of the Bluetooth signal able to be detected by the PC is able to be controlled by the PC-PIP software. Such a setting would allow the user to employ a sensitive setting thus allowing them to leave their phone in a coat pocket (where they won't forget it when they leave) across a large room and still have the signal picked up, or a low-sensitivity setting that would mandate that the phone be left right beside the computer.

If the user forgets their phone and needs access to the computer, an alternative means to access the system can be provided. Such a system would entail the use of password or other input means to override the limitations placed on the PC by the PC-PIP software.

VII. Phone Charger Embodiment

A. Automatic Power Requests

A procedure can be implemented according to a plurality of embodiments to determine whether or not an item is present and also, whether the item is being charged. Alarms can be produced to ensure that all tracked objects are present and that some or all are being charged. Five exemplary embodiments of the Automatic Power Requests (APR) idea can be used with any set of Bluetooth-enabled tracked objects paired to a Bluetooth-enabled charging device. Such charging devices can be a charging mat, a wall-socket-type charger, a PC used to charge one or more devices, a car charger, or similar devices.

In the first APR embodiment, the charging device such as a charging mat or simple wall charger is Bluetooth-enabled. The charging device is also equipped with a means to sense whether one or more devices are connected to it and charging. If the charging device senses the presence of the Bluetooth signal from the phone, it generates an alarm after a delay period (which allows the user time to put devices to be charged on the mat or connect them to the charger), gently reminding the user to plug the chargeable devices in the charger, or in the case of the charging mat, place the phone, and/or other registered and chargeable objects, on the mat. Note that in the case of the mat or other charging device that can charge more than one device at a time, only one device among the set to be charged need be Bluetooth-enabled. The presence of that Bluetooth device, assuming it was present when the other devices were, would trigger the charging device to monitor its charging activities to be sure the entire set then gets charged. The other devices merely need to be compatible with the charging device. Such an embodiment would be most advantageous when the user wished to always charge multiple devices at the same time.

Regarding the APR function, the alarm or reminder generated can be an audible sound or light or combination of both. This first embodiment does not require any software per se on the phone and would just require a pairing-type setup. The request to charge the phone can be made regardless of the battery level of the phone at that time.

In the second exemplary APR embodiment, a sensor is used by the charging device to infer that the user is in a room or proximate to the charger. If the sensor senses the user has entered the room and no charging activity has begun within a certain time, the charging device can produce an alarm or reminder to charge. In the case of a car charger, such proximity detection can include detecting an increase in voltage in the power port. Note that this embodiment does not require any of the devices the user wishes to be charged to be Bluetooth-enabled. Thus, the vehicle-based APR device can use a power-port voltage reading to note that the car had started and if the user's cell phone was not plugged in after a certain time period, an alarm would go off. Such a system would ensure that a user's phone was both in the car and being charged. Neither software, nor Bluetooth capability on the phone would be needed.

In a third exemplary APR embodiment, the charging device can communicate with the user's PC, cell phone, tablet computer, or other device with a visual display, which presumably is close by. When the user started to use the PC, for instance, (which can also be the charging device), as noted by any keyboard or other input activity, a utility on the PC checks to see if the phone or other objects of interest are being charged. If not, the PC or the charging device can generate an alarm or notification to charge the phone. An advantage of this embodiment is that the alarm can be visual in nature, and thus quiet, with a high likelihood of being seen as the user presumably is using the device with the display. (Such an alarm, of course, can also serve to notify users that their phones were lost or missing if that was the reason that there was no charging activity.) Again, no Bluetooth signal from the devices to be charged would be needed, nor software on the phone.

In a fourth exemplary APR embodiment, the user has a list of devices to be charged. The "sensor" input comes from the detection of at least one device that is connected to the charging device. Once one device is set up to be charged, all devices are to put in a charging state as well, in order to preclude an alarm state. Thus, if a user put their iPhone on a charging mat, but not their iPod within a few seconds, an alarm (visual or audible) initiates. Note that this embodiment can be software that is added to an existing charger product and doesn't necessarily require new hardware except that needed for an alarm.

Finally, a fifth exemplary APR embodiment utilizes the "constant alarm" concept. The charging device generates an alarm during any time period for which all registered devices re not being charged. Such an alarm can be as simple as a blinking red light that will only cease blinking when all the registered devices are being charged.

Note that in the case where an APR embodiment involves a PC, such PC must be kept powered on in order for the system to be operable when registered devices come into range.

B. Smart APR (SAPR)

Until recently, many cell phones had a standard feature whereby the phone chirps when its battery started to get low. The offering of this feature as the default setting on many phones has been phased out in many cases due to the annoyance such a notification can cause, particularly when the phone doesn't have any clues as to context, or the situation the user is in, when such notification is given. (Having one's phone begin chirping in the middle of a meeting or on a night-stand was not necessarily desirable even if the battery was running low.) The "Smart" APR (or SAPR) embodiment corrects that problem by making sure that the circumstances or context associated with the device whose battery is running low are appropriate for an alarm. When the alarm for a SAPR goes off the charging means will likely be close by and/or the venue probably means an alert would not be bothersome.

The first APR embodiment (utilizing Bluetooth as a sensing means for presence) can also be implemented with an intelligence feature that reflects the battery power level of the phone or other device to be charged. This SAPR embodiment uses software on the phone to communicate with the charging device, which would also be Bluetooth-enabled.

The SAPR system includes an "app" or similar software functionality that is installed on the portable device to be charged. The portable device, such as a phone, as well as the charging device, both have a communication means such as Bluetooth to communicate with each other. When the phone gets into proximity to the charging device it can recognize the Bluetooth signal of the SAPR-enabled charging device. The presence of such a signal provides the location-based context that deems it acceptable to sound an alarm if necessary to warn the user to charge the phone. For instance, if the power level of the device to be charged, for example an iPad, is below a certain threshold, such threshold either being set by the user or previously set as a default standard, then the device, or the charging device, sounds an alarm if the iPad is not connected to the required charging device within a set time period once the Bluetooth connection has been made.

The SAPR can produce a visible or audible alarm, while alternatively, the iPad or other device to be charged can use one of its normal notification means. Such alarms can alert the user to place the iPad upon the mat for charging or connect to another type of charging device.

The SAPR embodiment can be implemented by any type of charging device working in tandem with the device to be charged via a communications means. A vehicle-based interrogator configured to function as a phone charger, for instance, could also perform SAPR functions. A PC or other display-enabled device, if a charging function is part of such a device or the PC communicates with a charging device, could be part of an SAPR system and provide visual notification about the need to charge.

C. Single-Device SAPR Embodiment

A SAPR system can also rely on information solely from the phone, and not require information from a separate device (such as the presence-signaling information generated by a Bluetooth-enabled wall charger) to determine if the circumstances for generating a low-battery level alarm are warranted. Such an embodiment can work with input provided by standard sensors on the phone working in conjunction with parameters supplied by a user.

Thus, a user can specify through the phone's interface various allowable locations where the charge notification or alarm (that the battery level had fallen below a threshold) can be sounded. The phone can supply GPS data to its alarm-control software module preventing alarms from occurring in undesired locations and allowing them in preferred locations.

The preference for allowed locations to sound a battery-charge alarm can be narrow, for instance only being allowed in a particular room. As GPS signals can be weak and indeterminate indoors, Bluetooth and Wifi signals and combinations thereof, can also be used as location determining proxies, to determine indoor location.

By the same token, the user can specify times of day, days of the week, and other time-based information that further can control the issuance of such alarms. Such time-based parameters can work in conjunction with location-based parameters to allow for refined user-generated alarm rules such as: "Sound a battery alarm only if I'm home and it is between 8 a.m. and 8 p.m."

Another problem with previous battery-level alarm systems is that the owner of the phone may not have been nearby when the alarm went off and continuous alarming would further hasten the draining of the battery or annoy more people close to the phone. Thus, another feature of the SAPR is that the battery-level notification can be programmed to be initiated when the phone detects that the owner is nearby. The phone can use its accelerometer data to detect when it is in motion to make that determination.

In addition to having the crossing of a simple battery threshold level trigger the alarm or battery-level notification the SAPR software on the phone can utilize time-based information, as well as calendar entries, including historical data of battery usage over time and during certain types of events, to make forecasts of upcoming battery usage needs and thus make the threshold level dynamic. Thus, if it was Sunday night, and the calendar showed a day of meetings out of the office on Monday, the SAPR software on the phone could decide the user needed a full charge before Monday morning. Thus the battery threshold would be increased under such circumstances.

The battery threshold level can also be made dynamic by incorporating data regarding when the battery has been totally drained in the past. Times, dates, and circumstances surrounding such battery-down times can be used to build more buffer into the battery reserve by increasing the threshold level.

D. The Collection Plate

Many consumers have a habit of placing all their valuables (phone, wallet, keys, etc.) in one particular place at night or when they come home or arrive at the office. Given that this "down time" is a perfect time to charge a user's phone, a charging mat is therefore an ideal candidate to be turned into a "collection plate", a location on which all personal items may be collected.

The Collection Plate (CP) embodiment can work with most objects and not just devices with Bluetooth connections and those needing charging. The goal of the CP system, then, is to collect all registered objects on the mat when desired, and charge the chargeable devices while on the mat.

Such an embodiment includes a mechanism for of detecting the presence of, and identity of, non-charging objects placed on the mat. One such method would equip the mat with one or more sensors that allows the mat to serve as a weighing scale, as well as, a charging device.

The weight of each item can be previously registered to the mat. If items are place on the mat one by one, the mat can register the presence of each new item by measuring the incremental weight as such object is placed on the mat and matching such weight against the list of registered objects with their known weights.

Alternatively, the total weight of all the registered objects can be known by the mat and the mat can merely compare the total weight after all objects had been collected against the nominal total. The item-by-item approach would be advantageous when there was some day-to-day variation in the weight of an object (such as a wallet after payday), with such variation being in the same range as the weight of another object, for instance, a ring.

The instigation of the collection process for a CP system is similar to the methods outlined above for the APR system that instigate interrogations. For instance, if a motion sensor is used to detect a user's presence, an alarm is generated if all registered objects are not placed on the mat to be weighed within a certain time period. As is the case with the other systems discussed above, a constant alarm method can be used in place of a sensor-based method that instigated interrogations.

In a weighing-based CP embodiment, weight information replaces the connection information generated when a device in connected to a charging device (be it an electrical or inductive charge connection), or the Bluetooth connection made when an interrogator device and a tracked object are in close proximity, as the means by which presence is detected. As all objects have weight, this allows the mat to be able to detect the presence of items that do not have a Bluetooth circuit or a charging element such as keys or rings.

The mat can be calibrated by simply pressing a calibration or registration button when an item is first placed on the mat, for the item-by-item approach. If the item varies in weight, the minimum and maximum weights can be registered by manipulating a simple button interface on the mat. Such an interface can be used to select the collection method, as well, such as item-by-item placement or total weight. Alternative detection means can also be used for discerning which items were on the mat. For instance, one or more low-cost cameras can be built into the side of the mat. The CP system can then use image recognition technology to detect presence. Capacitance sensors built into the surface of the mat can also be utilized to detect and identify objects that vary in their capacitance.

E. Automatic File Uploader

It is commonplace to store certain files on portable flash memory drives, either as backup in case of internet outage or file loss or as a convenient way of transporting files from one system to another. However, most such flash drives transfer files through a USB port, which is not found on most smartphone devices. To facilitate the use of memory drives in such situations, the phone charger embodiment may include a USB port and a small amount of flash memory. When a flash memory drive is inserted in the phone charger embodiment's USB port, the files are read from the drive and subsequently transferred over the Bluetooth protocol to a nearby Bluetooth-enabled computing device. An application on the phone then interfaces with an internet-based "cloud" storage service such as Dropbox to upload the files.

As data transfer is capped by many cellular networks, a function is provided which allows users to choose the network over which the files are transferred. For instance, a user with a monthly data limit might instruct the application to wait until a Wi-Fi connection is established before transferring files above a certain size. If no service is available or the desired network is not available, the device would store the files until service became available, only deleting them from local memory once uploaded.

Figure 22:
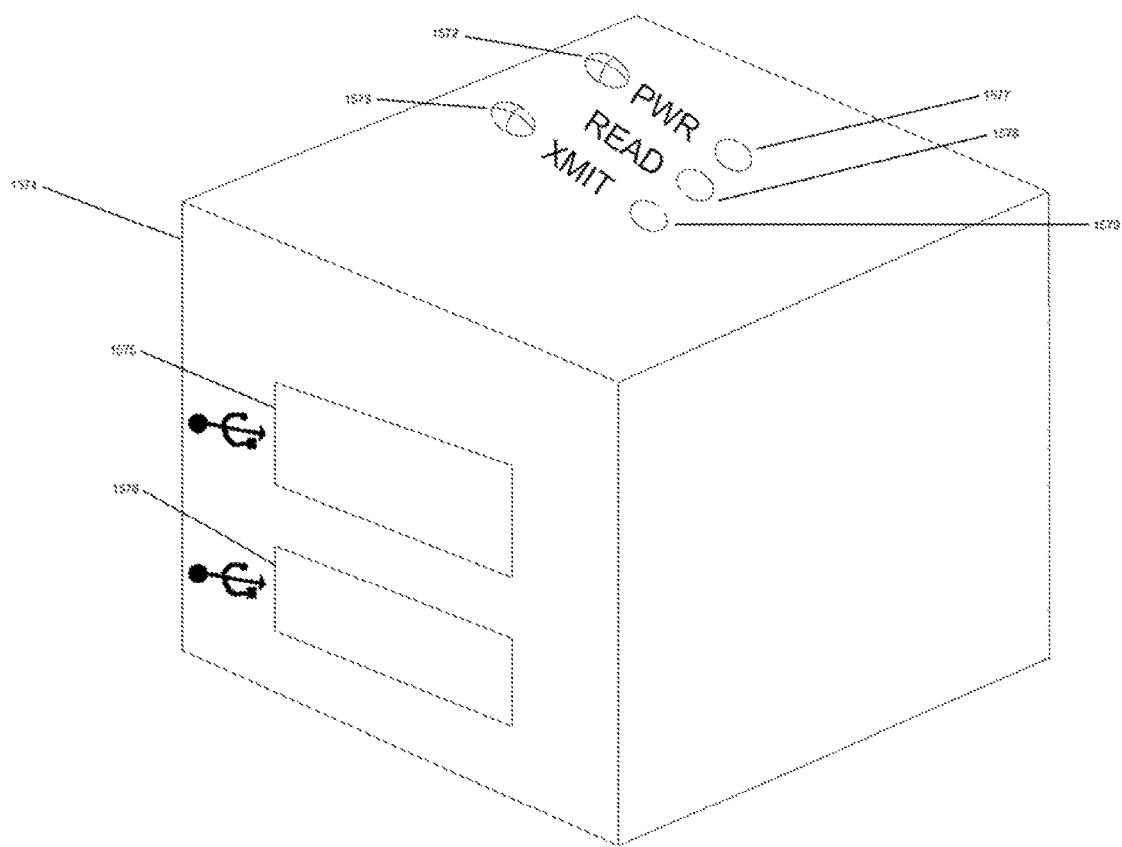
FIG. 22 is an isometric view of an implementation of the automatic uploader embodiment.

FIG. 22 illustrates an embodiment of the automatic file uploading device. The internals of the device are contained within a small cube 1574 made for example from a hard, resilient plastic material such as Polycarbonate/Acrylonitrile Butadiene Styrene (PC/ABS).

In one embodiment, there are two universal serial bus (USB) ports 1575 and 1576. As the device is charged via a USB power cable, the second port enables the use of the device during charging.

The user interface is located on a face of the device 1574. The user interface consists of push buttons 1572 and 1573, and LED status indicator lights 1578, 1579, 1580. Pushing the button marked PWR 1572 causes the device to turn on, lighting the PWR indicator light 1578 at the same time. When the device is on, a user may insert a memory device such as a portable flash drive into one of the USB ports 1575, 1576. With a USB port occupied, the device will turn on the indicator light 1578 indicating that it is reading a flash drive.

When a memory device is read, the user may then depress the button 1573 which is marked "XMIT". The button 1573 creates a connection to a local Bluetooth-enabled device such as a smartphone and allows the transmission of files from a memory drive to the connected device.

Figure 23:
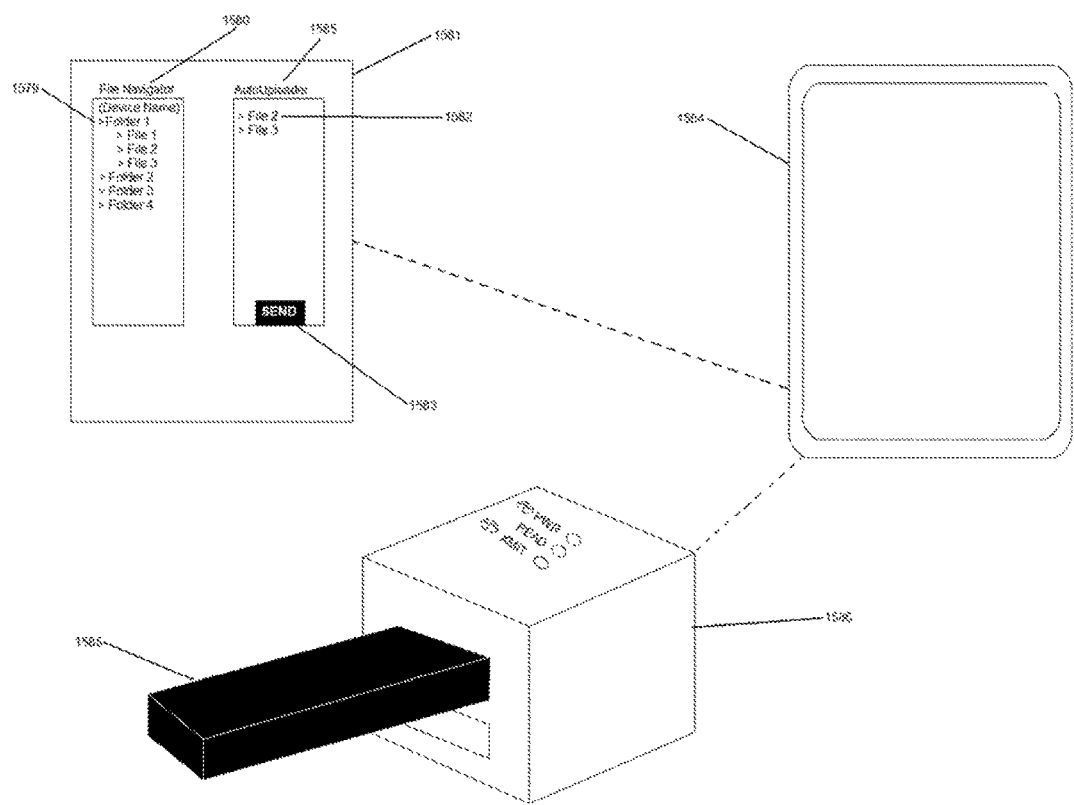
FIG. 23 is an overview diagram of the automatic uploader embodiment's functionality.

FIG. 23 illustrates the method of transferring files from a memory drive to a smartphone device, thereafter uploading to a cloud storage service. A portable flash drive 1585 is inserted in a USB port of the automatic uploading device 1586. With the flash drive 1585 thus inserted, the power button 1572 is pressed. Thereafter, the power status light 1577 and read status light 1578 are activated. As the user wishes to transmit files, he presses the XMIT button 1573. When a connection is established between the uploading device 1586 and the smartphone device 1584, the XMIT status light 1579 is activated. The XMIT function establishes a Bluetooth connection between the smartphone device 1584 and the upload device 1586. The XMIT function activates the software interface application 1581.

An embodiment of the software interface is shown in 1581. The File Navigator 1580 displays the name of the device and the folders contained therein. When the user selects a folder 1579, the software expands the folder to reveal the files contained therein. The user then selects the files he wishes to upload 1582 and drags them to the AutoUploader box 1585. With all the files to be uploaded collected in the AutoUploader box 1585, the user pushes the "SEND" button 1583. This causes the files to be uploaded to the user's account on a cloud file storage service such as Dropbox, the details of which are stored within the software. An API for each supported cloud storage service is integrated into the software to facilitate the transfer of files.

Figure 24:
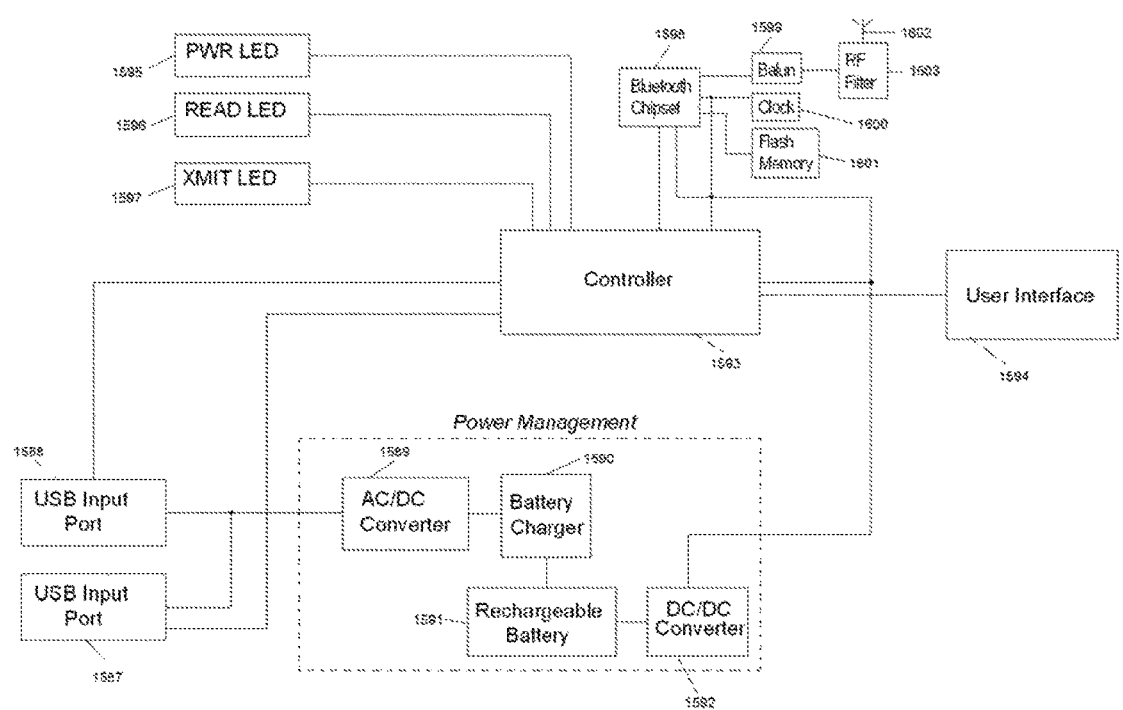
FIG. 24 is an overview block diagram of an exemplary implementation of the automatic uploading hardware embodiment.

FIG. 24 shows a schematic block diagram of the automatic file uploader. System 1586 has two primary controllers that interface with each other: a system controller 1593 and communication (i.e. Bluetooth) controller 1598. These two controllers can be separate or two sections of a single integrated circuit. The system controller 1593 runs the primary software and the high-level function control of the uploading device 1586. It takes in all the inputs from the communication modules and User Interface 1594, then performs the action dictated by firmware stored in the flash memory 1601. Communication controller 1598 manages all the networking functions on the interrogator device.

Communication controller 1598 can be the Broadcom® BCM4325, a single chip IEEE 802.11/a/b/g MAC/Baseband/Radio with integrated Bluetooth 2.0+EDR and FM receivers or equivalent. Communication controller 1598 has a built-in baseband, media access control (MAC) address, and PHY. Communication controller 1598 can interface with system controller 1593 through a four-wire serial-digital input and output (SDIO) interface using its internal universal asynchronous receiver and transmitter (UART). Communication controller 1598 connects with radio frequency antenna 1602 through a balun 1599, which provides adjustments to the line impedance, reducing interferences from line mismatch. Balun 1599 adjusts the balances and unbalances input with respect to the interrogator device ground. Located between balun 1599 and RF antenna 1602, radio frequency (RF) filter 1603 is employed to extract the narrow band frequency component of the input signal ranging between 2.35 GHz and 2.52 GHz. Digital clock 1600 provides a digital reference signal for communication chipset 1598, and has a reference clock between 12-52 MHz. External flash memory 1601 provides a mean to update the firmware and instruction sets, which are stored internally, of the system controller 1593 and communication controller 1598.

Communication chipset 1598 receives power from the direct current-to-direct current (DC/DC) converter 1592. DC/DC converter 1592 provides a voltage output of 2.5V to 5.5V to communication chipset 1598. An internal switching regulator within communication chipset 1598 generates the internal voltages necessary to operate its internal circuitries. DC/DC converter 1592 is fed power from rechargeable battery 1591. Battery 1591 enables uploading device 1586 to operate without a continuous connection to a wall socket.

User interfaces 1594 connect directly with the controller 1593 and are digital inputs that interface to the buttons used for automatic uploader device 1586 function.

There are two universal serial bus (USB) input ports 1587 and 1588. Each is connected to the power management circuitry so that either port 1587 or 1588 may charge the rechargeable battery 1591.

Each USB port 1587 and 1588 directly interfaces with the system controller 1593. When a Flash storage drive 1585 is inserted in a USB port 1587 or 1588, the system controller 1593 reads the drive 1585 and activates the "READ" LED status light 1596.

When the user pushes the "XMIT" button on the User Interface 1594, the system controller 1593 activates the "XMIT" LED status light 1597. Pushing the "XMIT" button on the User Interface 1594 causes the system controller 1593 to signal the Bluetooth chipset 1596 to establish a connection with a previously paired Bluetooth device in the vicinity. With this connection is established, files are transferred in the previously described method shown in FIG. 23.

VIII. Time-Based Alarms

Many of the embodiments above can potentially benefit from adding a dimension of time, such as time-of-day and/or day-of-week, to the algorithm controlling alarm generation. For instance, the CP system might be most productively employed on certain days of the week when it would be most important that the user "round-up" all the registered devices.

In cases where the constant alarm mode is used, such time-based systems can be used to minimize the disadvantages posed by such an approach (annoying constant alarms and energy inefficiency) by concentrating the constant alarms to particular times of day and days of the week.

The system may also include a training mode whereby the user has a selection of certain items that are brought to similarly timed events that are then learned by the system. Alerts can subsequently be generated based on whether or not all of the regular items are present. For instance the CP system can learn that the keys, wallet and phone are always taken at a certain hour during the day. These items are then learned by the system to be associated together at that time. After a period of training an alert can be presented if the items are not all taken, as a set, at the regular time.

IX. Calendar-Based Alerts

Many of the embodiments in this invention can potentially benefit from adding an interface to an electronic calendar for the generation of alerts. For instance, the PID embodiments might be most productively employed when generating reminders tied to a certain event when it would be most important that the user have all the necessary registered devices for that event.

Tracked objects can be associated with a calendar event recorded in an electronic calendar application on a phone or computer. When a user creates a calendar event, a list of tracked objects can be presented which allows the user to drag and drop items from that list onto an upcoming event in the calendar. That event will have a timed alert associated with it. At the time of the alert the user can be presented with a reminder on their cellphone of which items are needed for that event and in particular which items are not present in the detectable range. In one embodiment, the user interface for the calendar application has an icon for tagged objects. When the icon is selected, the list of tracked objects pops up for selection.

For any event or series of events recorded in an online calendar the user can link any number of tracked objects. These indicate the items that are needed at that event. Intelligent analysis of the relative timing and locations of the events in the calendar can enable the application to create specialized alerts.

An example might be when a user starts the day at home and adds the following events in the calendar: 9:00 in the office, 12:00 lunch at restaurant to review presentation, 18:00 vacation home for the weekend. The user then adds items for the "In Office" event in the calendar including a laptop and a tablet. The user then adds items for the "Lunch" event in the calendar including only the tablet. The user then adds items in the "Weekend Vacation" event in the calendar the including a weekend bag and the tablet. As the user departs in the morning they get an alert if the car interrogator does not detect the presence of the laptop, tablet, and weekend bag in the car. The system knows that the weekend bag is needed at the end of the day and the user is not likely to return home before heading to the vacation house. The system can then provide an alert prior to each calendar event if the user is not in proximity with each of the tagged items needed for that event at the time of departure for such an event. That is, if the user starts to move from one location to the other without the specified items for that time period on the calendar the interrogator may sound an alert.

Figure 16:
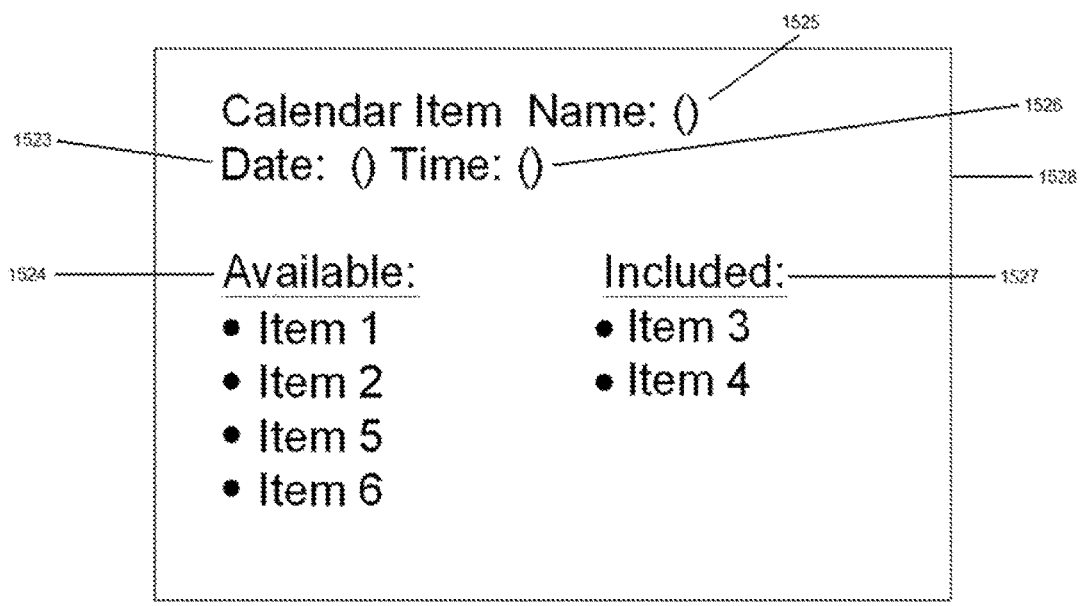
FIG. 16 is a front perspective view of an exemplary software implementation of the calendar-based item tracking embodiment.

FIG. 16 illustrates how such a calendar item would be created by a user in a software implementation of the calendar tracking embodiment. The user enters the calendar item date 1523 and time 1526, as well as optionally an item name 1525 through a software user interface 1528. The user selects from a list of available items 1524, which is populated by the user's tagged items, and moves all items needed for the calendar item to an included item list 1527. When the user has completed this process, the calendar item is saved to the device memory and added to the active calendar item list.

Figure 17:
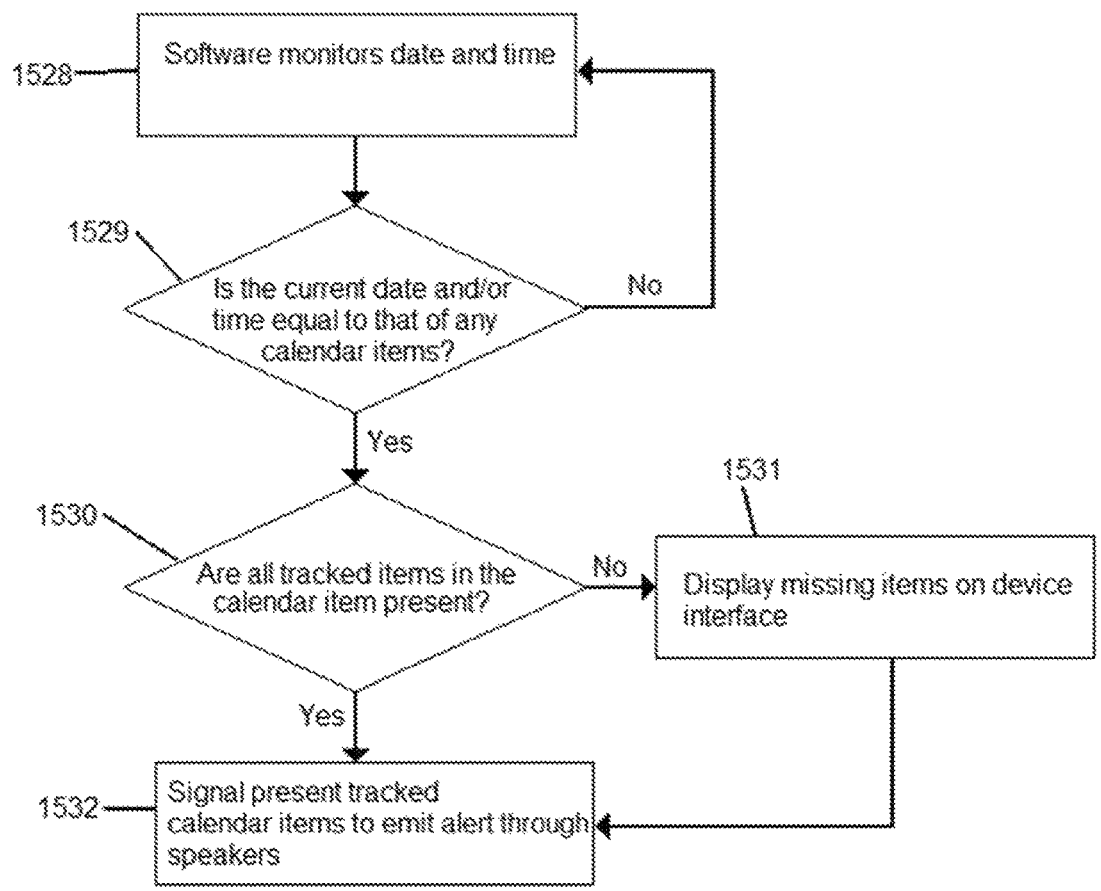
FIG. 17 is a flow chart of an exemplary software implementation of the calendar-based item tracking embodiment.

FIG. 17 illustrates the process flow of the calendar item software embodiment. While the software application is active, it is constantly checking the date and time against the saved calendar items 1528. If the current date and/or time match that of a saved calendar item 1529, the software evaluates the presence of all tracked items in step 1530 via its BT connection. If one or more items are not present, the software proceeds to step 1531, causing the interface to sound an alarm and alert the user through the interface of the identity or identities of the missing item(s). If all tracked items are present, or after the user is alerted as to the identities of the missing items, the software proceeds to step 1532. It sends all tracked items a signal which causes them to emit a sound through their speakers, which enables the user to easily gather all items needed. After a period, the alert ceases and the calendar item becomes inactive.

Figure 18:
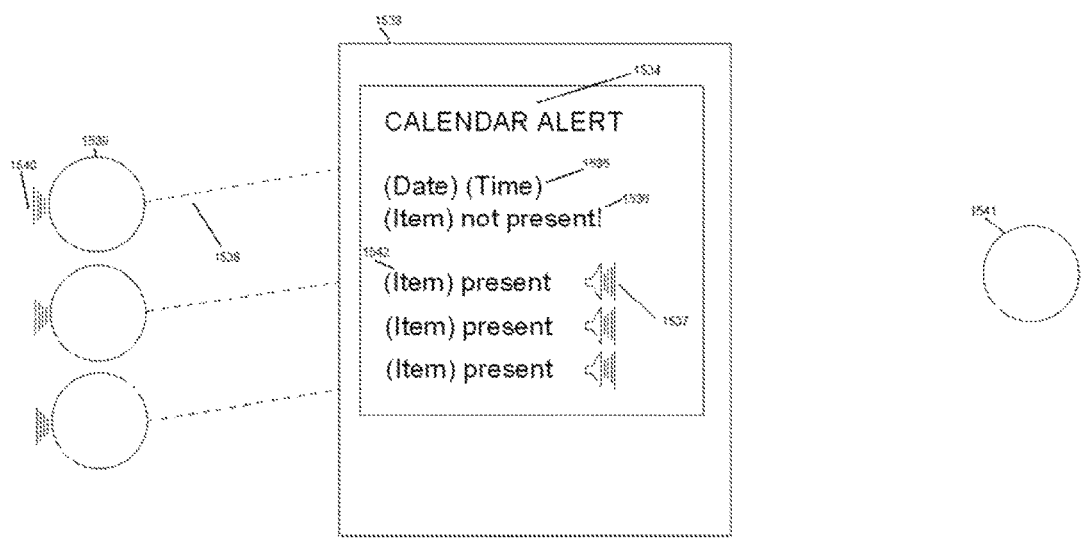
FIG. 18 is a front perspective view of an exemplary use scenario of the software implementation of the calendar-based item tracking embodiment.

FIG. 18 illustrates an example use case of the calendar-based item tracking. At the day and time and time of the saved calendar item, the software on the smartphone 1533 evaluates the presence of tracked items in the calendar list. It determines that one item 1541 is not present. It displays a calendar alert 1534 on the user interface of the smartphone 1533. This alert contains the calendar item name 1534, the date and time 1535, the identity 1536 of the missing item 1541, the identities 1542 of the present items 1539, and a graphic 1537 showing that these items are emitting an audible alert 1540. The software signals the present items 1539 through a BT connection 1538 to emit a noise 1540, thus enabling the user to easily collect them.

In one embodiment, the calendar application could use intelligence collected from one or more interrogators that track the movement of tracked objects each day and determine which items are typically together at a particular point in time and use such information to create automatic entries. For instance, if every work day at 8 AM the cell phone, school books, gym bag and lunch box are in the car as determined by the car interrogator, then the application on the user's cellphone would store this as a pattern after a week or so of tracking the objects and each work day henceforth, the interrogator would look to see if such items were in the car at the start of such a trip. At the same time, a corresponding calendar entry would be generated for Monday through Friday at 8 AM signifying that the interrogator will check that the cell phone, school books, gym bag and lunch box are in the car.

X. Collected Sets

Many of the embodiments above can potentially benefit from adding a mode where a set of tracked objects, each having its own sensing device and interrogator device integrated, is associated with one another. Any one of them can then generate an alert if the complete set is not gathered together at the proper time and/or place. The CP system describes one such embodiment.

Another collected set embodiment includes a set of PID devices such as a backpack, notebook, and lunchbox that should all be gathered at a specific location in the morning before a student leaves for school. In one embodiment, this location and set are programmed into the system by the user on an application. This embodiment is described in the Calendar embodiment description. As each tracked object is both an interrogator and a sensing device, any one of them can create an alert without the others present, thereby eliminating the need for a separate alarm-creating device.

XI. Accelerometer-Based Actions

Many of the embodiments above can benefit from having a variety of ways of connecting the sensing devices on the tracked objects to the lists in the interrogator system.

As described in many of the embodiments the addition of an accelerometer in the sensing device can provide additional triggers for alerts. In addition, specific motions of this accelerometer in the sensing device can transmit to the interrogator information about how or when the object is to be tracked.

The internal accelerometer may be a 3 axis accelerometer, in which case the sensing device detects accelerations in the x, y, and z axes in a Cartesian axis system, or a 6 axis accelerometer, in which case the sensing device detects both linear and rotational accelerations about the x, y, and z axes. The accelerometer records the acceleration about each axis, and transmits this information to an interrogator for feature mapping and recognition. In another embodiment, the data analysis is performed on the local system.

Each gesture has specific acceleration characteristics which can be detected by an algorithm created for that purpose. In one embodiment, software performs a Fast Fourier Transform (FFT) on the raw acceleration data from the accelerometer. It then evaluates the normalized cross correlation (NCC) between the transformed data and each of the pre-programmed gestures sequentially. The gesture with which the data has the highest NCC score is determined to be the one which was performed, provided the NCC score is sufficiently high (close to 1). With this method, very high accuracy levels can be achieved.

The software contains a table of several recognized gestures. In one embodiment, these gestures are hard-coded into the program. In an alternative embodiment, accuracy is improved by enabling the user to train the device to recognize specific gestures so that the recognition is user-specific.

Each gesture is associated with a specific action to be taken by the device. These actions may be hard coded or user-determined. In the case of user-determined actions, a training mode.

The following table illustrates an embodiment of gestural control of the device.

TABLE 2

| Gesture | Action |
| --- | --- |
| Flip | Tracking software application opened on smartphone device |
| Drop | Tagged item added to active calendar list |
| Tap | Interrogator adds item to monitored list |
| Double Tap | Interrogator stops checking for item |
| Spin | All present tracked items emit a noise |

If the sensing device is mounted in a small flat enclosure it can be "flipped", such that it rotates end-over-end one or more times 1 times, just before attaching to a specific object to be tracked. This rotational motion can be detected and transmitted to the interrogator. In the case where the interrogator is implemented through an interface on the user's cellular phone, a pop-up selection can be presented asking the user to program a customized alert for the "flipped" sensing device. In one embodiment, the tag is "flipped" and attached to a passport. The action is sensed by the user's cell phone causing a background app to open a dialog box asking the the user what action he would like. The user selects "make sure item is in car" and sets a date and time or selects "For next trip". At the specified date and time, the user is given a warning if the tag is not found in the car.

If the sensing device is mounted in a small enclosure it can be "dropped" into a specific object to be tracked such as a backpack or purse. This dropping motion can be detected and transmitted to the interrogator. In the case where the interrogator is implemented through an interface on the user's cellular phone, a pop-up selection can be presented asking the user to program a customized alert for the "dropped" sensing device.

A spinning motion on the sensing device can be detected and transmitted to the interrogator. This motion could be used in a variety of ways, such as a "reset" to set the usage for a given tracked object back to a default state.

Figure 19:
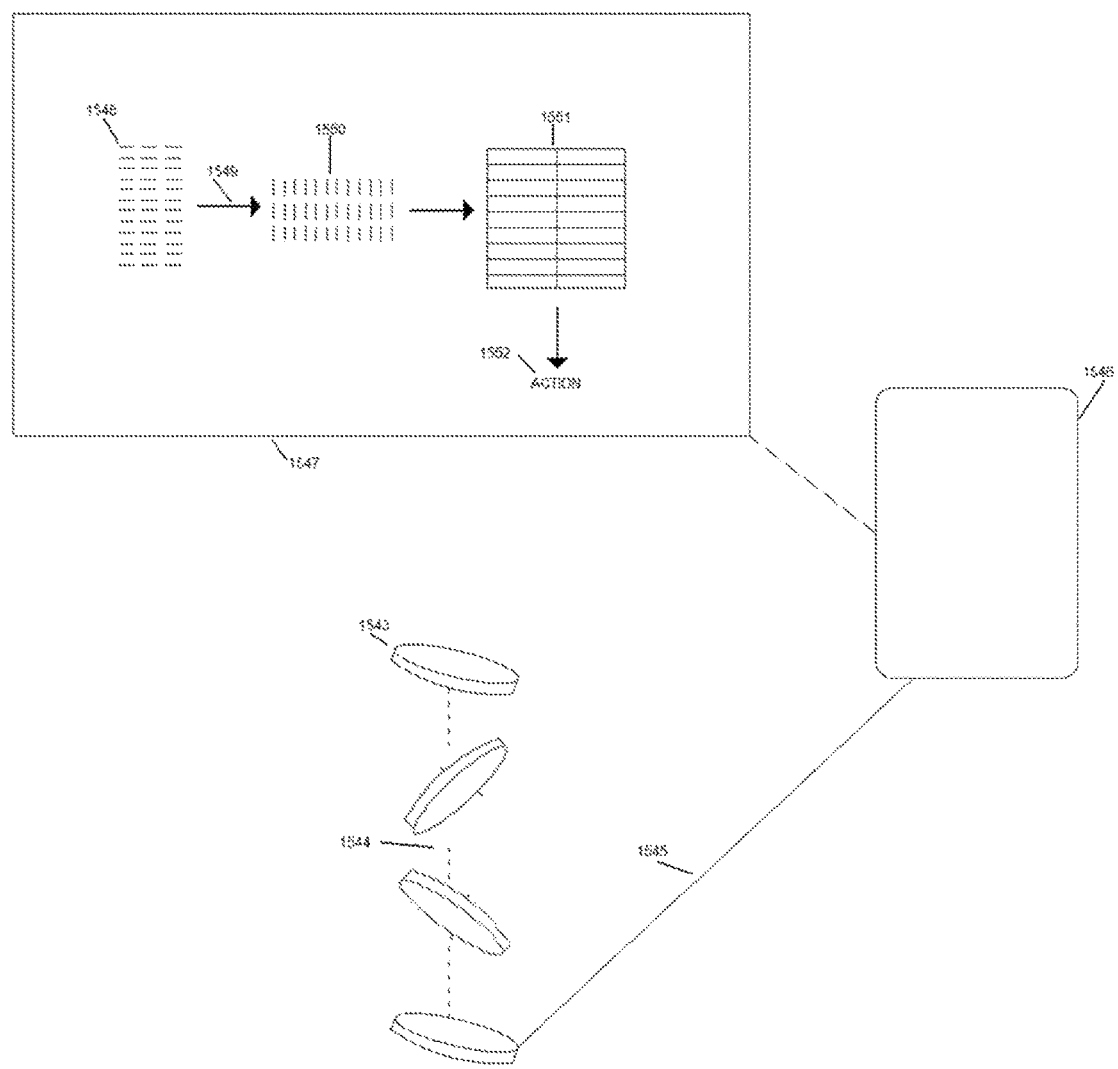
FIG. 19 is a front perspective view of an implementation of the accelerometer-based gestural control embodiment.

FIG. 19 illustrates the process by which accelerometer-based gestural control of the tracking application works. The tracked item 1543 executes an action 1544. In the example, the action 1544 is a "drop". The device transmits 1545 raw accelerometer data about this action 1544 via bluetooth to a personal smartphone device 1546. The personal smartphone device 1546 opens a gesture analysis process 1547 on receiving the raw data 1548 from the tracked device 1543. The raw data 1548 is processed 1549 into a set of transformed data 1550. This data is then compared against a table of stored gesture data 1551. If the match between the transformed data 1550 and an item in the gesture data table 1551 is sufficiently high, the software performs the action 1552 associated with the selected item from the gesture table 1551.

XII. Finding Lost Items

A. Lost Mode

In the event that an item is left behind, it is desirable that the item be marked as lost. An item would be marked as lost if it failed to receive a response from the interrogator in a certain period of time. That is, the tag on the item itself measures the time since the last interrogator response. When the time from the last response (TFR) is sufficiently large, the item switches itself over to lost mode. An item in lost mode may proceed to periodically emit a Bluetooth signal signifying that it is lost. If the user subsequently found the item, thus enabling it to communicate with the interrogator, the item would return to its normal operational mode.

At the same time, the interrogator monitors the TFR on all local tagged items. When the TFR of an item is sufficiently large, the interrogator adds the item to a list of lost items. Alternatively, the user may manually mark the item as lost. In one embodiment, this list is uploaded to a global database of lost items. Interrogators scan for signals from lost items. When an interrogator detects a lost item signal, it compares the lost item's device ID against the database of lost items. If there is a match, the owner of the lost item receives a notification with the time and GPS coordinates at which his lost item was detected. If the interrogator is a smartphone device, the lost item scan may be performed in the background by a proprietary application, or as part of a common application's own functions.

In one embodiment, the user's personal smartphone device may report the time and location via GPS at which it last saw the tracked object. This would increase the ease of locating lost objects at the expense of potential privacy concerns and increased battery drain due to the constant use of the GPS function. To address these issues, the GPS tracking functionality could be disabled by the user or alternatively made to be an opt-in service.

Alternatively, the lost item may use public Bluetooth connectivity points to communicate its status to the lost item database if it is range to use them. In this case, the item's owner would receive a notification containing the location of the Bluetooth connectivity point's location, which would provide the owner with a small vicinity to check.

B. Drone Finder

The development of small, relatively inexpensive remotely-piloted aircraft, often called drones, provides one potential method for locating lost items. In this embodiment, the drone would complete a daily sweep of a given city monitoring for lost items. The drone would fly sufficiently low to detect Bluetooth signals, approximately 200 to 300 feet. The downside to this embodiment is items may be lost in areas which obstruct Bluetooth signal, and will drain their batteries quickly if constantly emitting signals. To detect such items, the drone itself may send out Bluetooth signals alerting objects to its presence. When the items receive a drone signal, they may increase the strength and frequency of their Bluetooth signals, subject to local regulatory limitations.

When drones detect lost items, they can communicate wirelessly to the lost item database with their current coordinates and time. The lost item database then notifies the items' owners with this information.

C. Taxi Fleet Embodiment

In order to quickly detect lost items, it is desirable to have a large fleet of interrogators constantly scanning for lost item signals. It would be preferable to use an existing fleet of vehicles rather than developing such a system for this purpose. Therefore, the taxi fleet embodiment would outfit many taxi vehicles (or similar on demand car services) with interrogators. As these vehicles constantly circulate around a city's streets, they provide excellent and fairly continuous coverage.

In addition, it is common for passengers to leave personal items in taxi cabs. Integrating the interrogator into such vehicles would alert passengers if they accidentally left items in the cab, as well as facilitate their retrieval.

Figure 25:
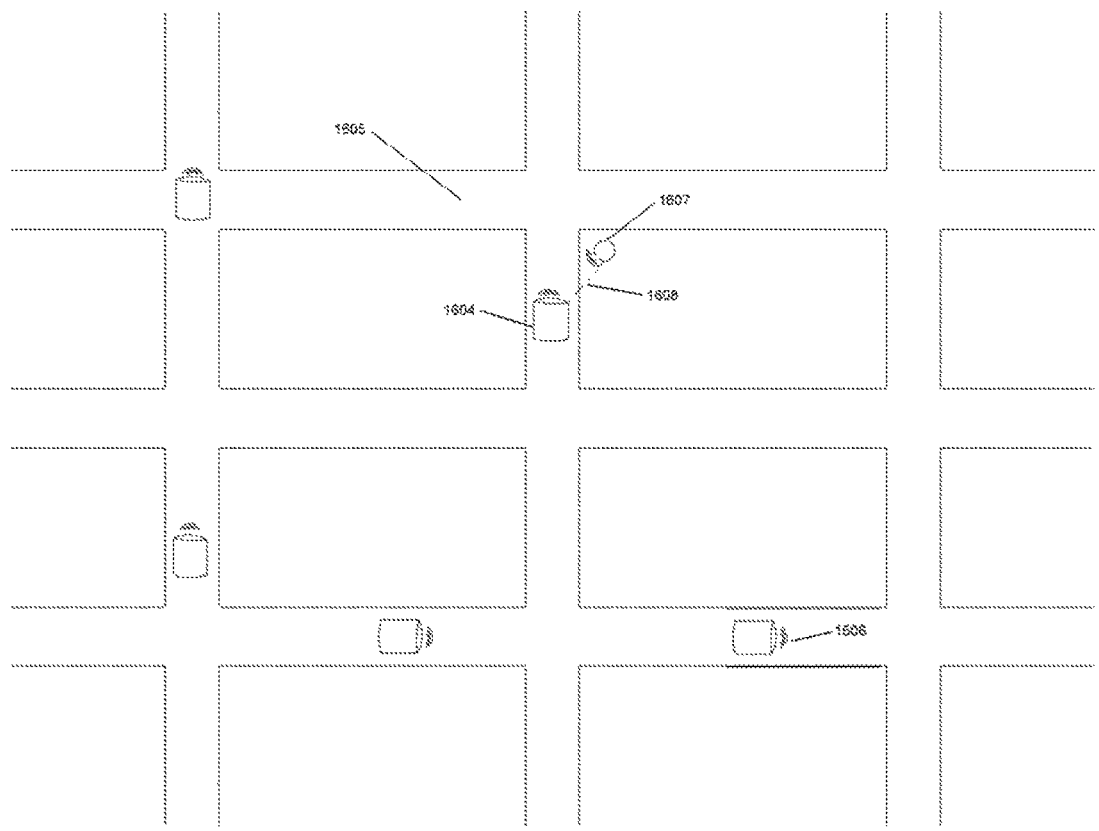
FIG. 25 is an overview showing the taxicab implementation of the finding lost items embodiment.

FIG. 25 depicts an illustrative scenario of the taxi-cab search fleet embodiment. A fleet of interrogator-equipped vehicles 1604 continuously circulate among the city streets 1605. As the vehicles circulate, their equipped interrogators continually emit Bluetooth signals 1606 to search for lost items 1607. When a taxi vehicle 1604 comes within Bluetooth range of a lost item 1607, a Bluetooth connection between the two 1608 is established. The interrogator device within the taxi 1604 then notifies the online database of its location, date and time, and the identity of the lost item. Location is derived from GPS location coordinates, which may be supplied by an on-board chip in one embodiment. In an alternative embodiment, GPS coordinates are supplied by a connected smartphone with GPS capability.

D. Marketplace Embodiment

In many situations, owners of lost items are unable to personally retrieve them. For example, a person may lose an item on vacation and receive a notification of its location after returning home. Therefore, the marketplace embodiment encourages users local to the lost item to return it to its owner.

In one embodiment, a lost item's owner may opt to make his item retrievable by marketplace users. The owner may also choose to set a reward for the item's retrieval in order to encourage other users to search for it. Thereafter, the marketplace application notifies users when a lost item is in their vicinity. Users may choose to retrieve the item and claim the reward. However, the reward is only delivered when the owner confirms that the item has arrived safely. One potential pitfall is that a user could claim an item and then opt to keep it, rather than returning it. The marketplace application would prevent such behavior by monitoring a user's proximity to an item. If the user claims an item and subsequently comes into contact with it, but never returns it, that user would be banned from the service.

In an additional embodiment, users might be able to view a list of items and awards available in their city as well as an estimated distance. This would encourage users to actively retrieve items, thereby increasing the speed and likelihood of retrieval.

XIII. Charger Cable Embodiment

In another embodiment of the invention, an intelligent charger cable is integrated into the interrogator/interrogatee system. Along with other necessary components, the cable contains a Bluetooth chip, a speaker, and a small rechargeable battery. When tagged items or items running a specific application come within a certain distance of the charger cable, the application checks the battery levels of chargeable devices. If the devices should be charged, the application alerts the user. The charger cable may also emit a noise through the speaker to alert the user to its location.

The application can check context to make sure that it is appropriate to create a noise. For instance, the application may detect that the user has ignored the warning while remaining in the room. In this case, the application does not remind the user to charge again for a certain period of time. The user may also choose to switch to silent alarms. In this case, an alert would be displayed on the screen without any accompanying sound.

The rechargeable battery is needed to provide power to the electrical components of the device. It need not be charged as a separate function, but may instead collect charge while it is plugged in. In one embodiment, the battery draws current from the outlet when it needs charge. In another embodiment, the battery uses inductive charging to collect charge from current passing through the cable.

Figure 20:
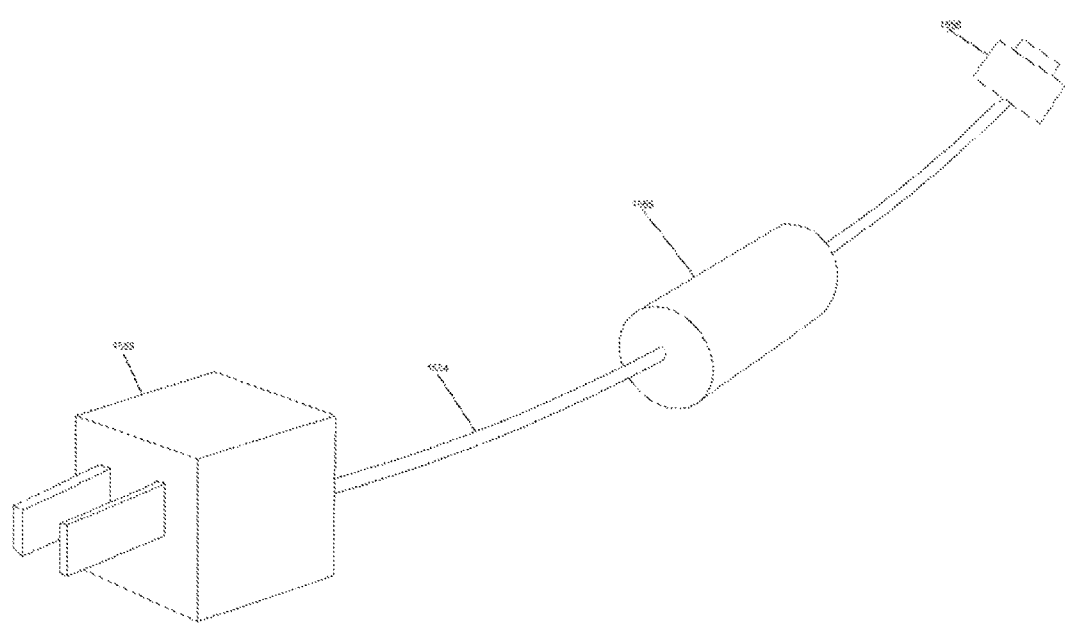
FIG. 20 is an isometric view of an implementation of the tracked charger cable embodiment.

FIG. 20 illustrates the charger cable embodiment of the invention. An electrical socket plug 1553 supplies electricity through a flexible cable 1554 and a power connector 1556 such as a mini-USB or lightning connector to a smartphone or other charge-requiring device. The tracking device is embedded in a housing 1555 around the flexible cable 1554. This design ensures that the tracking device 1555 remains with the charger cable, unlike a removeable design. The proximity to the cable 1554 allows the tracking device 1555 to draw electric current to charge its internal battery.

Figure 21:
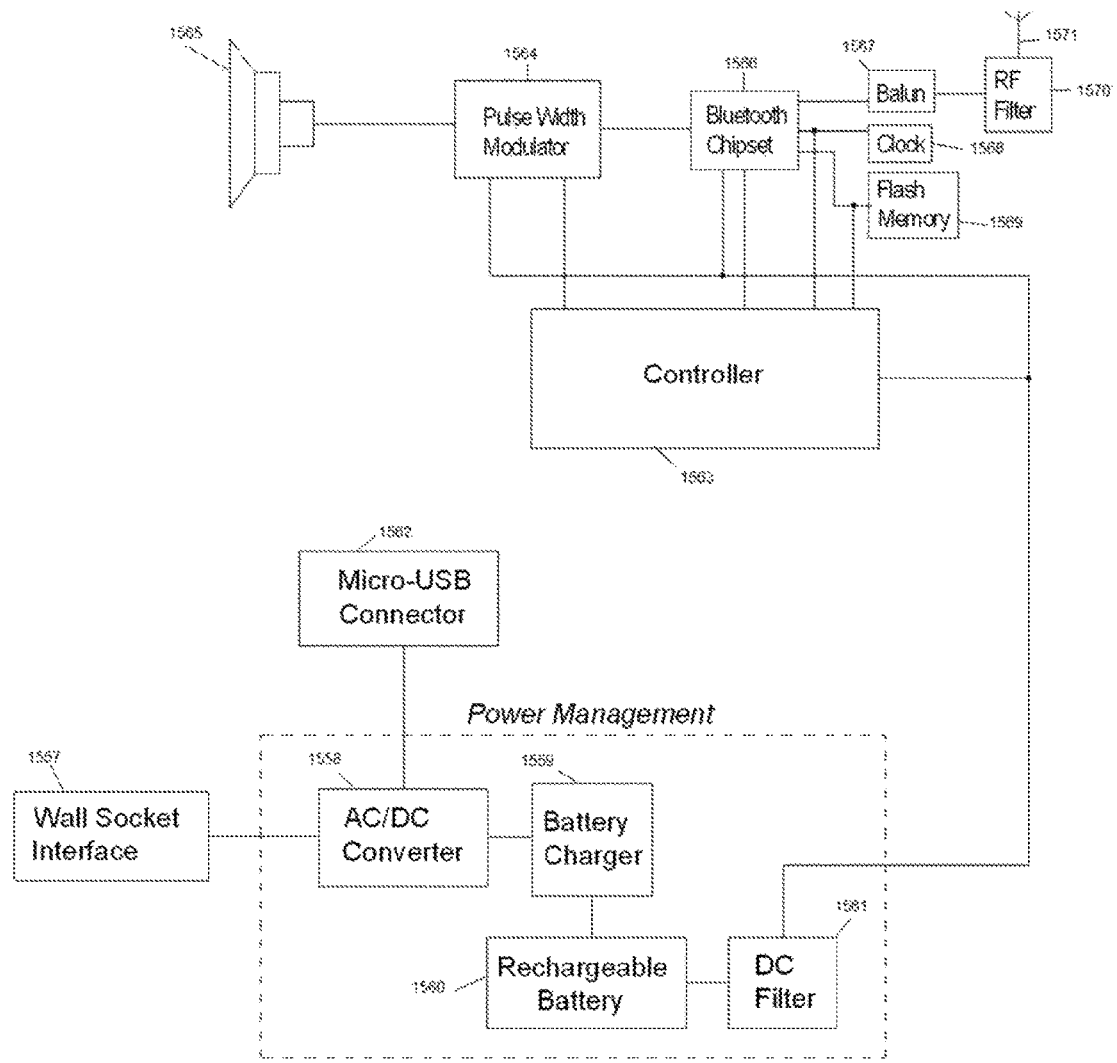
FIG. 21 is an overview block diagram of a cable implementation of the tracking system.

FIG. 21 is a schematic diagram of an exemplary architecture for the cable embodiment according to the illustrative embodiment. The system has two primary controllers that interface with each other: a system controller 1563 and a Bluetooth controller 1566. The system controller 1563 runs the primary software and the high-level function controls of the interrogator device. It takes in all the inputs from the sensors and determines whether a notification should be generated. The Bluetooth controller 1566 manages the networking functions and generates the waveform to create the alarm sound from speaker 1565. The power management circuitry 1557 draws power from the wall socket receptacle and provides power for all the circuitries in the interrogator device as well as the charging device connected through the exemplary micro-USB connector 1562. Bluetooth controller 1566 manages all the networking function of the interrogator device. Bluetooth controller 1566 can also include a built-in baseband, media access control (MAC) address, and PHY.

Bluetooth controller 1566 interfaces to controller 1563 through a four wire serial-digital input and output (SDIO) interface using its internal universal asynchronous receiver and transmitter (UART). Bluetooth controller 1566 connects with RF antennae 1571 through a balun 1567, which provides adjustment to line impedance to reduce interferences from line mismatch. Balun 1567 adjusts the balances and unbalances input with respect to the interrogator device ground. Between the balun 1567 and the RF antennae 1571, radio frequency (RF) filter 1570 extracts the narrow band frequency component of the input signal ranging between 2.35 GHz and 2.52 GHz. Digital clock 1568 provides a digital reference signal for Bluetooth chipset 1566, and has a reference clock between 12-52 MHz. Although Bluetooth chipset 1566 uses its internal random access memory (RAM) and runs the instruction set stored within its read-only memory (ROM), external flash memory 1569 provides a means to update such firmware and instruction sets.

Bluetooth chipset 1566 receives power from the rechargeable battery 1560. Battery 1560 provides a voltage output between 2.5V and 5.5V to Bluetooth chipset 1566. An internal switching regulator within Bluetooth chipset 1566 generates the internal voltages necessary to operate Bluetooth chipset 1566's internal circuitries.

Bluetooth chipset 1566 generates the signal to the speaker 1565, which generates the alarm for the user. The signal to enable the oscillator to generate the alarm is triggered from the controller 1563. The internal oscillator of Bluetooth chipset 1566 outputs signals to pulse width modulation (PWM) circuit 1564 with a frequency between 10 kHz and 50 kHz. In an alternative embodiment, the internal oscillator of controller 1563 outputs signals to pulse width modulation (PWM) circuit 1564 with a frequency between 10 kHz and 50 kHz. The PWM circuit 1564 is supplied by a 12V power connection from battery 1560 and outputs the PWM waveform to the speaker 1565, which converts the electrical signal to an audible sound with a frequency of between 20 Hz and 5 kHz. The speaker can be varied by the operation to output between 50 dB and 70 dB.

XIV. Phone Sweeping Embodiment

The sweeping cellphone invention describes a method used to locate objects using a cell phone. The method relies upon a mobile central interrogator, such as a smartphone, and objects with Bluetooth LE (BLE) networking abilities.

The user holds the central interrogator in his hands and rotates it ("sweeps") it about his body. Using a proprietary algorithm, software on the central interrogating device is able to calculate the direction in which the tracked object lies in two dimensions. This method does not require a clear line of site, as BLE signals pass through most household objects.

Glossary

RSSI: Received Signal Strength Indicator. A value reported by a device which denotes the current strength of a received radio signal such as Bluetooth Low Energy (BLE). This signal has a range of −100 to −26 decibels (dB).

Signal Pool: A rolling average of RSSI values that keeps track of the lowest and highest values received as well as the difference between the two.

Facing: Facing is the angle of the device relative to a starting position. Facing is determined by means of angle data from the device's gyroscope. When initiated, the gyroscope calibrates its current orientation as the origin (0, 0, 0). Only the y value (yaw) is taken into consideration. When the facing is updated. The facing is used to determine the circle sector to which a particular RSSI reading can be attributed.

Heading: The predicted direction in which the user should turn in order to face the signal being tracked. This value is intended to only influence the device's current yaw value and therefore the user's Facing direction.

Movement: A change in user's position, detected by parsing the weighted moving average of the dot product of each accelerometer readout and the previous readout. The weighted moving average is a normalized value which is calculated as follows:

where A is an accelerometer vector and

N is the number of samples.

MT=movement threshold=0.8

If m>MT, movement has occurred.

Description of Algorithm

Figure 26:
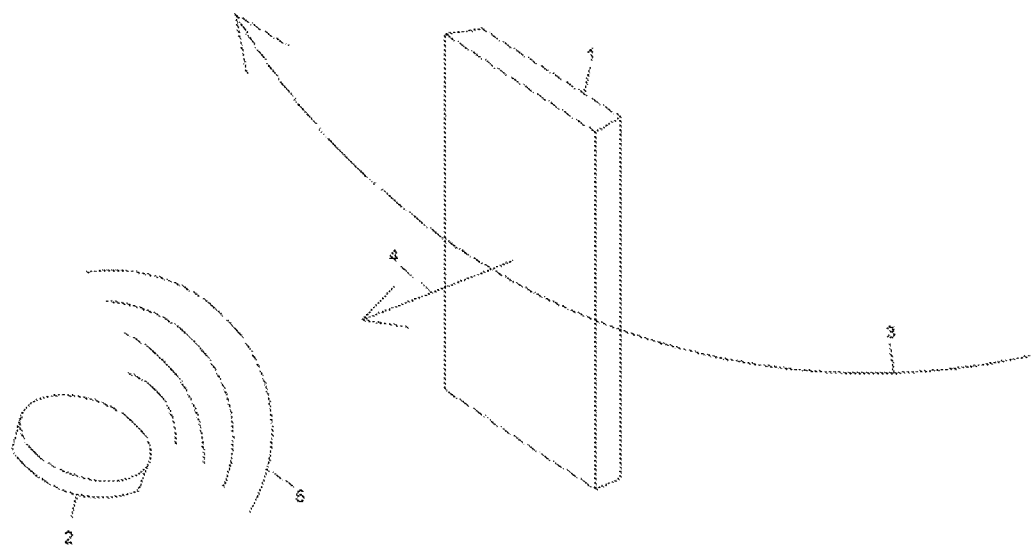
FIG. 26 shows the general relationship of the cell phone to the object in the phone sweeping embodiment.

In FIG. 26, the user holds the central interrogator 1 and moves it in a circular motion 3. Based on yaw data from the accelerometer, the interrogator's facing 4 is instantaneously updated. For each facing 4, the strength of Bluetooth LE signals 5 received from the tracked object 2 (RSSI) is calculated.

The area surrounding a user is visualized as a circle centered at the central interrogator. An array of 16 signal pools is allocated, each one associated with a different circle segment. Therefore, each segment is $$\frac{2\pi}{16}$$

radians wide (22.5°).

Figure 27:
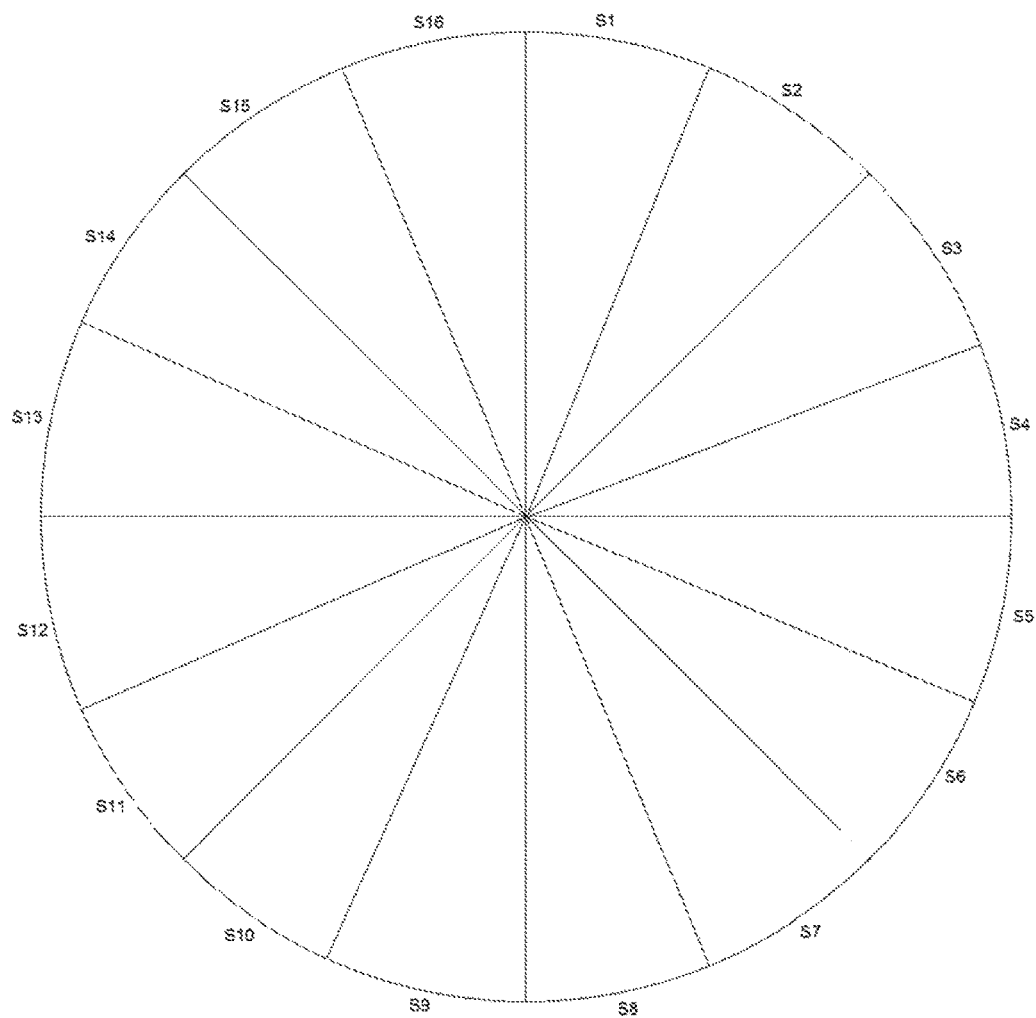
FIG. 27 shows the signal pool associated with the respective circle segment in the phone sweeping embodiment.

In FIG. 27, RSSI is requested once every second and is added to the signal pool associated with the current facing (the gyroscope's yaw value). When a new RSSI value is added to a signal pool, the pool will first check for and discard skewed values. (a skewed value occurs when abs (RSSI−RSSI$_{avg}$))>30). Then all signal pools are checked to find the pools with the highest RSSI values. If two or more pools share the highest RSSI value, the direction is determined by the pool with the smallest difference between the highest and lowest values.

The direction of the tracked item is indicated to the user as follows. A circle is drawn with a gradient from Red to Green, with red representing the lowest RSSI values with the largest RSSI difference, and green representing the highest RSSI values with the smallest RSSI difference. Colors on a gradient from red to green are drawn at other circle segments representing the relative RSSI values of the surrounding segments.

TABLE 3

| Signal Pool RSSI (Low to High) | Segment Color (RGB) |
|---|---|
| 16 | (255, 0, 0) |
| 15 | (240, 15, 0) |
| . | . |
| . | . |
| . | . |
| 1 | (0, 255, 0) |

Heading arrows are displayed when the user's facing does not fall within the circle segment with the highest RSSI and lowest signal difference. The direction of the arrow is determined by the dot product of the vector representing the circle segment determined to be the direction of the tag ($\vec{A}$) and the vector perpendicular to the user's facing ($\vec{B}$). If $\vec{A} \cdot \vec{B} > 0.4$, a right-facing arrow is displayed. If $\vec{A} \cdot \vec{B} < -0.4$, a left-facing arrow is displayed. For all other values of $\vec{A} \cdot \vec{B}$, no arrow is displayed. In other words, the display alerts the user to the direction of the tracked item relative to himself.

TABLE 4

| $\vec{A} \cdot \vec{B}$ | Display |
|---|---|
| −0.4 or Less | Left arrow |
| Between −0.4 and 0.4 | No arrow |
| Greater than 0.4 | Right arrow |

When movement is detected, the signal pools are reset so both the highest and lowest RSSI values are the highest values for that pool.

Figure 28:
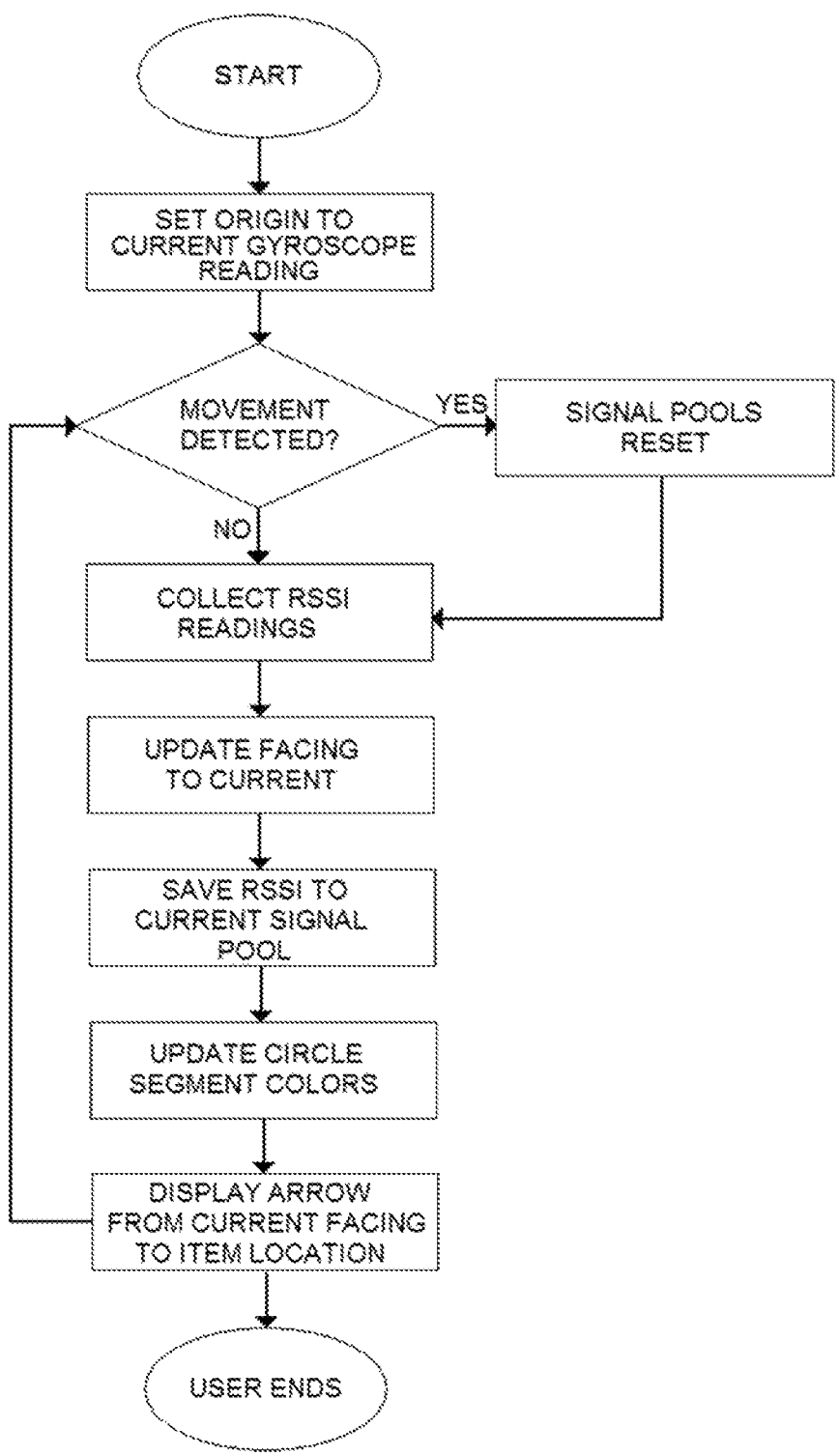
FIG. 28 is a flow chart showing the algorithm for the phone sweeping embodiment.

FIG. 28 shows a flowchart of the algorithm used to determine the location of the object.

The benefits and advantages of the interrogation system, method and device described herein should not be apparent, as well as other features. The system provides a device to ensure that objects and personal items are not inadvertently misplaced or left behind.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the interrogator device can be any device capable of communicating with a plurality of personal items, and the personal items capable of being tracked is also highly variable. The interrogator device can be a device that is pluggable into a vehicle power port or an outlet in a building. The objects being tracked by the interrogator device can include cell phones, other portable devices, wallets, purses, portable computers, and other personal items. Additionally, although Bluetooth is the protocol described herein for illustrative purposes, alternate protocols can be employed and adapted for use with the system, method and device described herein, and still remain within the scope of the invention. Accordingly, this description is meant to be taken only by way of example, and not to otherwise limit the scope of this invention.

What is claimed is:

1. A mobile device comprising:
    a first connection from the mobile device to a thermostat through a wireless network, wherein the first connection is used to transmit data regarding a temperature setting in the thermostat;
    a second connection from the mobile device through a second wireless network to a tag, wherein said tag is attached to a luggage that indicates travel;
    a storage location in the mobile device for storing a first location where the tag is located, said first location loaded with the location on a first time that the tag is located, and compared with a second location on a subsequent time that the tag is located;
    a user interface of the mobile device for prompting a user for parameters regarding temperature settings when the mobile device determines that the first location is different from the second location;
    a message sent from the mobile device through said wireless network to said thermostat containing the temperature settings.

2. The mobile device of claim 1 wherein the first and second networks are the same network.

3. The mobile device of claim 1 wherein the first network is a Bluetooth network.

4. The mobile device claim 1 wherein the second network is a Bluetooth network.

5. A method of setting a household parameter using a mobile device, said method comprising:
    searching a wireless network for a tag, wherein said tag is affixed to a luggage that indicates travel;
    receiving information from said tag regarding a time of a recent movement of said tag;
    storing the time of recent movement of said tag in a memory location if no time of movement information is currently stored for said tag;
    comparing the time of recent movement with said memory location if time of movement information is currently stored for said tag;
    promoting a user via a user interface of the mobile device for said household parameter if the comparison shows that the tag has moved;
    recording the household parameter provided by the user; and
    communicating said household parameter to a third device.

6. The method of setting a household parameter using a mobile device of claim 5 wherein the third device is a thermostat and the household parameter is a temperature.

7. The method of setting a household parameter using a mobile device of claim 5 wherein the third device is an alarm system and the household parameter is a time to set the alarm.

8. The method of setting a household parameter using a mobile device of claim 5 wherein the third device is a light and the household parameter is a time to turn the light on.

9. The method of setting a household parameter using a mobile device of claim 5 further including the steps of sending a message to the tag requesting the time of recent movement of the tag.

\* \* \* \* \*